United States Patent [19]
Fukuda et al.

[11] Patent Number: 5,416,854
[45] Date of Patent: May 16, 1995

[54] IMAGE DATA PROCESSING METHOD AND APPARATUS

[75] Inventors: Masahiro Fukuda; Tsugio Noda, both of Isehara; Hirotaka Chiba; Kimitaka Murashita, both of Atsugi, all of Japan

[73] Assignee: Fujitsu Limited, Kawasaki, Japan

[21] Appl. No.: 738,236

[22] Filed: Jul. 30, 1991

[30] Foreign Application Priority Data

| Jul. 31, 1990 | [JP] | Japan | 2-201260 |
| Aug. 10, 1990 | [JP] | Japan | 2-213378 |
| Sep. 28, 1990 | [JP] | Japan | 2-259484 |
| Nov. 29, 1990 | [JP] | Japan | 2-332919 |

[51] Int. Cl.$^6$ .............................. G06K 9/36
[52] U.S. Cl. .............................. 382/232; 248/403
[58] Field of Search ............... 382/56, 41, 49, 43; 358/133, 437; 364/727, 826

[56] References Cited

U.S. PATENT DOCUMENTS

| 4,908,874 | 3/1990 | Gabriel | 382/41 |
| 5,014,198 | 5/1991 | Umemura | 382/56 |
| 5,054,103 | 10/1991 | Yasuda et al. | 382/56 |
| 5,086,488 | 2/1992 | Kato et al. | 382/56 |
| 5,126,962 | 6/1992 | Chiang | 382/56 |
| 5,150,433 | 9/1992 | Daly | 382/56 |
| 5,163,103 | 11/1992 | Uetani | 358/133 |

FOREIGN PATENT DOCUMENTS

| 0248729 | 6/1987 | European Pat. Off. |
| 88/07725 | 10/1988 | European Pat. Off. |
| 0443114 | 8/1991 | European Pat. Off. |

OTHER PUBLICATIONS

Gonzalez, Rafael, "Digital Image Processing", Second Edition, Chaper 6, Image Coding, pp. 255–311.
Granville, E. Ott, Ph.D., "IEEE 1987 National Aerospace And Electronics Conference Naecon 1987", May 18–22, 1987, pp. 39–43.
Carlach, J. C., et al., "IEEE 1989 International Conference On Acoustics, Speech And Signal Processing", pp. 22–39.
Patent Abstracts of Japan, vol. 13, No. 210 (P–872) May 17, 1989 & JP-A-1026988 (Fujitsu) Jan. 30, 1989, Abstract.

*Primary Examiner*—Joseph Mancuso
*Attorney, Agent, or Firm*—Staas & Halsey

[57] ABSTRACT

The present invention relates to an image data reconstructing apparatus for reconstructing an original image by dividing image data into a plurality of blocks each including N×N picture elements, performing two-dimensional orthogonal transform on each of said blocks, quantizing and encoding the result of said transform, decoding the encoded result, dequantizing and two-dimensional inverse orthogonal transforming the above result, wherein an operation associated with the multiplication is skipped if a multiplication by zero is detected when two-dimensional inverse orthogonal transform is performed. Before performing dequantization, two block volume of buffer is provided before or after performing two-dimensional inverse orthogonal transform for executing a pipeline process. Furthermore, two-dimensional inverse orthogonal transform is performed by repeating two times a process of one-dimensional inverse orthogonal transform and matrix transposition, thus the matrix transposition being performed as the result of one-dimensional inverse orthogonal transform which is stored in buffer.

17 Claims, 39 Drawing Sheets

FIG. 2

| 10 | 13 | 13 | 14 | 14 | 14 | 15 | 27 |
|----|----|----|----|----|----|----|----|
| 15 | 16 | 15 | 14 | 16 | 15 | 17 | 34 |
| 13 | 19 | 16 | 17 | 17 | 22 | 25 | 39 |
| 14 | 18 | 20 | 21 | 21 | 22 | 29 | 43 |
| 14 | 20 | 18 | 21 | 21 | 22 | 29 | 50 |
| 14 | 24 | 21 | 22 | 22 | 25 | 46 | 62 |
| 14 | 22 | 22 | 23 | 24 | 26 | 33 | 45 |
| 14 | 22 | 22 | 19 | 23 | 24 | 35 | 54 |

FIG. 3

| 91 | -17 | -6 | 1 | -2 | 0 | 3 | -2 |
|---|---|---|---|---|---|---|---|
| -28 | 8 | 3 | -2 | 1 | 1 | -4 | 2 |
| 14 | -3 | -1 | 1 | -1 | -3 | 3 | -1 |
| -14 | 4 | 1 | -1 | 0 | 1 | -1 | 2 |
| 9 | 1 | 0 | 1 | 2 | -3 | -2 | 0 |
| -6 | 0 | -1 | 1 | 0 | 1 | 0 | 0 |
| -0 | 2 | 1 | -1 | 1 | 0 | -1 | 0 |
| -1 | 0 | 0 | 0 | 0 | 0 | 0 | -1 |

FIG. 5

| 61 | 55 | 56 | 62 | 77 | 92 | 101 | 99 |
|---|---|---|---|---|---|---|---|
| 51 | 60 | 69 | 80 | 103 | 113 | 120 | 103 |
| 40 | 58 | 57 | 87 | 109 | 104 | 121 | 100 |
| 24 | 26 | 40 | 51 | 68 | 81 | 103 | 112 |
| 16 | 19 | 24 | 29 | 56 | 64 | 87 | 98 |
| 10 | 14 | 16 | 22 | 37 | 55 | 78 | 95 |
| 11 | 12 | 13 | 17 | 22 | 35 | 64 | 92 |
| 16 | 12 | 14 | 14 | 18 | 24 | 49 | 72 |

FIG. 6

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| -2 | 1 | 0 | 0 | 0 | 0 | 0 | 0 |
| 5 | -3 | 1 | -1 | 0 | 0 | 0 | 0 |

FIG. 7

| 1  | 2  | 6  | 7  | 15 | 16 | 28 | 29 |
|----|----|----|----|----|----|----|----|
| 3  | 5  | 8  | 14 | 17 | 27 | 30 | 43 |
| 4  | 9  | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |

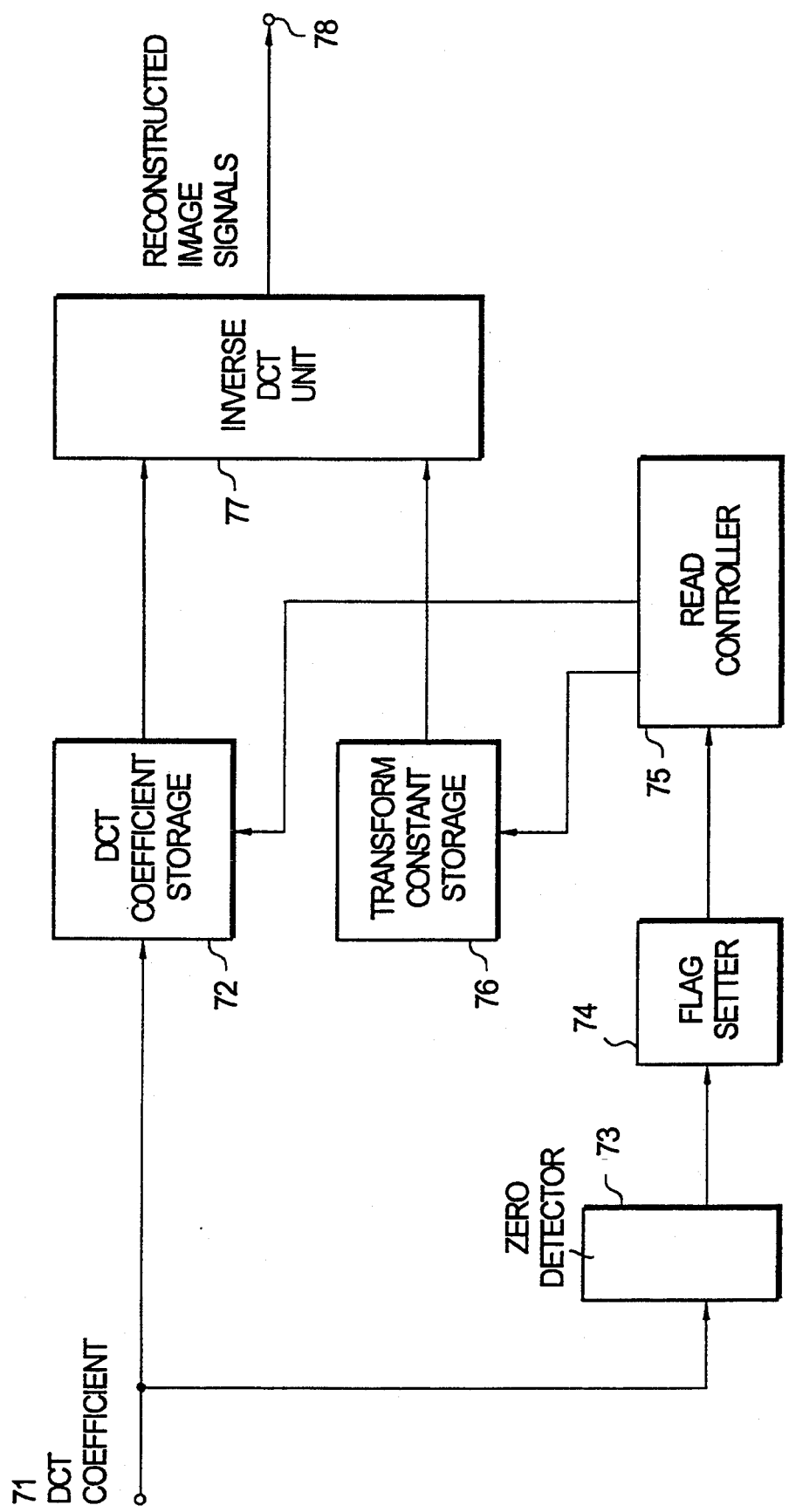

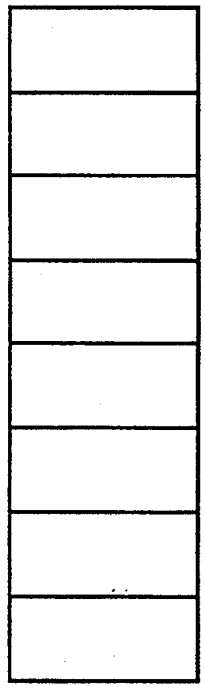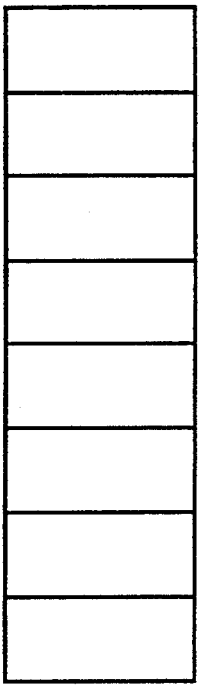

FIG. 15

COLUMN NO. (n)

|   | 1 | 2 | 3 | 4 | 5 | 6 | 7 | 8 |
|---|---|---|---|---|---|---|---|---|
| 1 | 1 | 0 | 1 | 0 | 0 | 1 | 1 | 0 |
| 2 | 1 | 0 | 1 | 0 | 0 | 1 | 1 | 0 |
| 3 | 1 | 0 | 1 | 0 | 0 | 1 | 1 | 0 |
| 4 | 1 | 0 | 1 | 0 | 0 | 1 | 1 | 0 |
| 5 | 1 | 0 | 0 | 0 | 0 | 0 | 1 | 0 |
| 6 | 1 | 0 | 0 | 0 | 0 | 0 | 1 | 0 |
| 7 | 1 | 0 | 0 | 0 | 0 | 0 | 1 | 0 |
| 8 | 1 | 0 | 0 | 0 | 0 | 0 | 1 | 0 |

ROW NO. (m)

FIG. 16A

CONTROL FLAG A :

| FLAG NO. | 1 | 2 | 3 | 4 | 5 | 6 | 7 | 8 |
|---|---|---|---|---|---|---|---|---|
|  | 1 | 0 | 1 | 0 | 0 | 1 | 1 | 0 |

FIG. 16B

CONTROL FLAG B :

| FLAG NO. | 1 | 2 | 3 | 4 | 5 | 6 | 7 | 8 |
|---|---|---|---|---|---|---|---|---|
|  | 0 | 1 | 1 | 1 | 1 | 1 | 0 | 1 |

FIG. 20

| STEPS | BASIC STEPS | SP1 INPUT | | SP2 MULTIPLICATION | SP3 ADDITION | SP4 BUFFER SETTING | SP5 OUTPUT |
|---|---|---|---|---|---|---|---|
| | | DID | CONSTANTS 1~8 | MPD | ALD | OPD | DCD |
| | | L110 | L111 L112 L113 L114 L115 L116 L117 L118 | L131~L138 | L151~L158 | L161~L168 | SELECTOR 170 |
| 1 | 1 | X11 | A11 A21 A31 A41 A51 A61 A71 A81 | | | | |
| 2 | 2 | X21 | A12 A22 A32 A42 A52 A62 A72 A82 | X | | | |
| 3 | 3 | X31 | A13 A23 A33 A43 A53 A63 A73 A83 | X | + | | |
| 4 | 4 | X41 | A14 A24 A34 A44 A54 A64 A74 A84 | X | + | | |
| 5 | 5 | X51 | A15 A25 A35 A45 A55 A65 A75 A85 | X | + | | |
| 6 | 6 | X61 | A16 A26 A36 A46 A56 A66 A76 A86 | X | + | | |
| 7 | 7 | X71 | A17 A27 A37 A47 A57 A67 A77 A87 | X | + | | |
| 8 | 8 | X81 | A18 A28 A38 A48 A58 A68 A78 A88 | X | + | | |
| 9 | 1 | X13 | A11 A21 A31 A41 A51 A61 A71 A81 | X | + | | |
| 10 | 2 | X23 | A12 A22 A32 A42 A52 A62 A72 A82 | X | + | R41~R48 | |
| | 2.5 | | | | | | R41(1-1) |
| 11 | 3 | X33 | A13 A23 A33 A43 A53 A63 A73 A83 | X | + | | R42(1-2) |
| | 3.5 | | | | | | R43(1-3) |
| 12 | 4 | X43 | A14 A24 A34 A44 A54 A64 A74 A84 | X | + | | R44(1-4) |
| | 0.5 | | | | | | R45(1-5) |
| 13 | 1 | X16 | A11 A21 A31 A41 A51 A61 A71 A81 | X | + | | R46(1-6) |
| | 1.5 | | | | | | R47(1-7) |
| 14 | 2 | X26 | A12 A22 A32 A42 A52 A62 A72 A82 | X | + | R41~R48 | R48(1-8) |
| | 2.5 | | | | | | R41(3-1) |
| 15 | 3 | X36 | A13 A23 A33 A43 A53 A63 A73 A83 | X | + | | R42(3-2) |
| | 3.5 | | | | | | R43(3-3) |
| 16 | 4 | X46 | A14 A24 A34 A44 A54 A64 A74 A84 | X | + | | R44(3-4) |
| | 0.5 | | | | | | R45(3-5) |
| 17 | 1 | X17 | A11 A21 A31 A41 A51 A61 A71 A81 | X | + | | R46(3-6) |
| | 1.5 | | | | | | R47(3-7) |
| 18 | 2 | X27 | A12 A22 A32 A42 A52 A62 A72 A82 | X | + | R41~R48 | R48(3-8) |
| 19 | 3 | X37 | A13 A23 A33 A43 A53 A63 A73 A83 | X | + | | R41(6-1) |
| 20 | 4 | X47 | A14 A24 A34 A44 A54 A64 A74 A84 | X | + | | R42(6-2) |
| 21 | 5 | X57 | A15 A25 A35 A45 A55 A65 A75 A85 | X | + | | R43(6-3) |
| 22 | 6 | X67 | A16 A26 A36 A46 A56 A66 A76 A86 | X | + | | R44(6-4) |
| 23 | 7 | X77 | A17 A27 A37 A47 A57 A67 A77 A87 | X | + | | R45(6-5) |
| 24 | 8 | X87 | A18 A26 A38 A48 A58 A68 A78 A88 | X | + | | R46(6-6) |
| 25 | 1' | | | X | + | | R47(6-7) |
| 26 | 2' | | | | + | R41~R48 | R48(6-8) |
| 27 | 3' | | | | | | R41(7-1) |
| 28 | 4' | | | | | | R42(7-2) |
| 29 | 5' | | | | | | R43(7-3) |
| 30 | 6' | | | | | | R44(7-4) |
| 31 | 7' | | | | | | R45(7-5) |
| 32 | 8' | | | | | | R46(7-6) |
| 33 | 9' | | | | | | R47(7-7) |
| 34 | 10' | | | | | | R48(7-8) |

FIG. 29

| COLUMN ADDRESS | $C_1$ | $C_2$ |
|---|---|---|
| FLAG | 0 | 1 |

FIG. 32

| 80 | -22 | 0 | 0 | 0 | 0 | 0 | 0 |
|---|---|---|---|---|---|---|---|
| -36 | 12 | 0 | 0 | 0 | 0 | 0 | 0 |
| 14 | 0 | 0 | 0 | 0 | 0 | 0 | 0 |
| -14 | 0 | 0 | 0 | 0 | 0 | 0 | 0 |
| 18 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 33

| $h_{11}$ | $h_{12}$ | $h_{13}$ | $h_{14}$ | $h_{15}$ | $h_{16}$ | $h_{17}$ | $h_{18}$ |
|---|---|---|---|---|---|---|---|
| $h_{21}$ | $h_{22}$ | $h_{23}$ | $h_{24}$ | $h_{25}$ | $h_{26}$ | $h_{27}$ | $h_{28}$ |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 34

| COLUMN ADDRESS | $C_1$ | $C_2$ | · · · · | $C_8$ |
|---|---|---|---|---|
| FLAGS | 0 | 1 | · · · · | 1 |

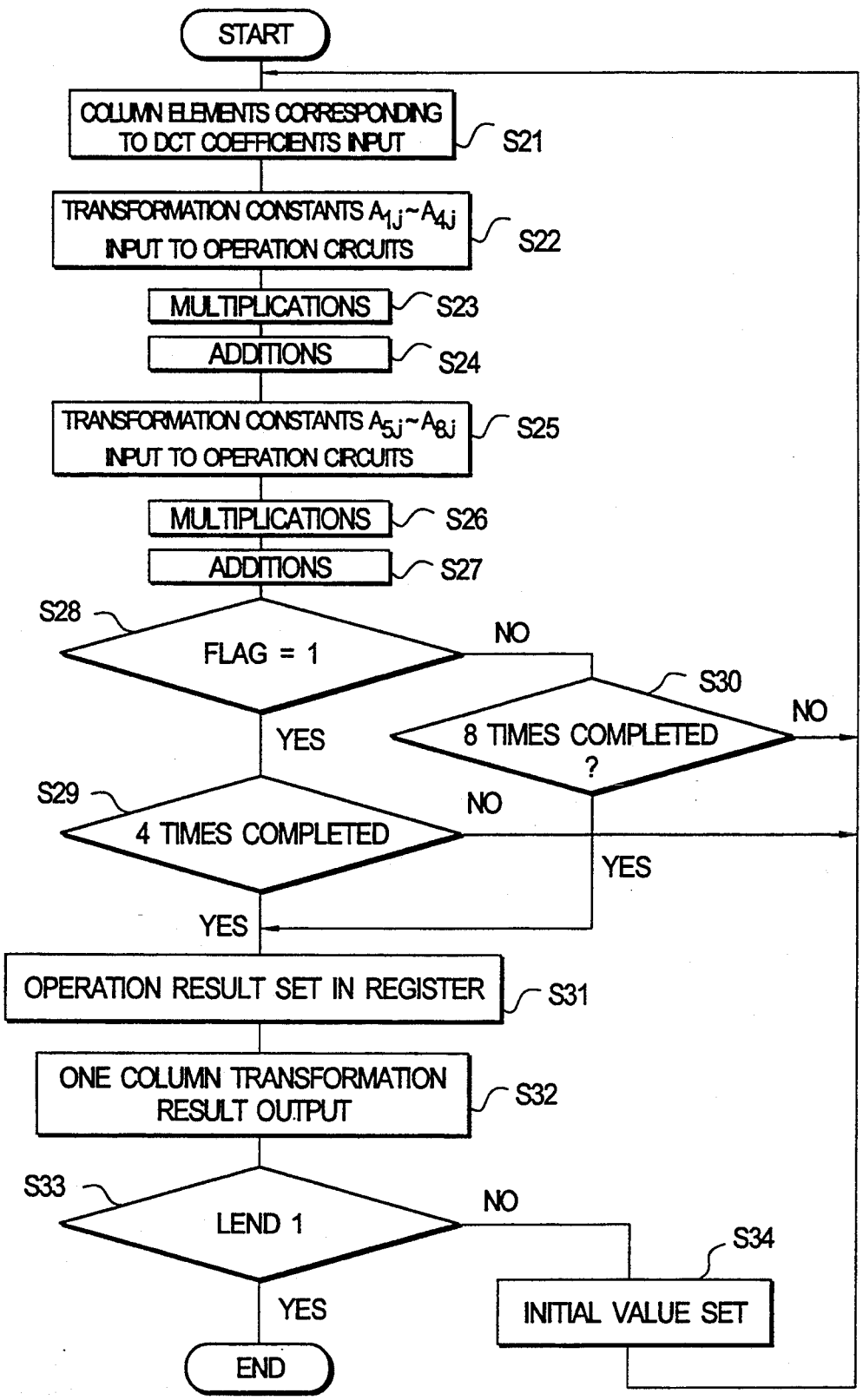

FIG. 31

| STEPS | STAGE ST1 (DATA INPUT) | | | | STAGE ST2 (MULTIPLICATIONS) | | | | STAGE ST3 (ADDITIONS) | | | | STAGE ST4 (REGISTER SET) | STAGE ST5 (DATA OUTPUT) |
|---|---|---|---|---|---|---|---|---|---|---|---|---|---|---|
| | R01 | R11 | R12 | R13 | R14 | R21 | R22 | R23 | R24 | R31 R32 R33 R34 / R35 R36 R37 R38 | | | | R41 ~ R48 | MULTIPLEXER |
| 1 | X11 | A11 A51 | A21 A61 | A31 A71 | A41 A81 | X11*A11 X11*A51 | X11*A21 X11*A61 | X11*A31 X11*A71 | X11*A41 X11*A81 | | | | | | |
| 2 | | A12 A52 | A22 A62 | A32 A72 | A42 A82 | X21*A12 X21*A52 | X21*A22 X21*A62 | X21*A32 X21*A72 | X21*A42 X21*A82 | | | | | | |
| 3 | X21 | A13 A53 | A23 A63 | A33 A73 | A43 A83 | X21*A13 X21*A53 | X21*A23 X21*A63 | X21*A33 X21*A73 | X21*A43 X21*A83 | | | | | | |
| 4 | | A14 A54 | A24 A64 | A34 A74 | A44 A84 | X31*A14 X31*A54 | X31*A24 X31*A64 | X31*A34 X31*A74 | X31*A44 X31*A84 | | | | | | |
| 5 | X31 | A15 A55 | A25 A65 | A35 A75 | A45 A85 | X41*A14 X41*A54 | X41*A24 X41*A64 | X41*A34 X41*A74 | X41*A44 X41*A84 | | | | | | |
| 6 | | A16 A56 | A26 A66 | A36 A76 | A46 A86 | X51*A15 X51*A55 | X51*A25 X51*A65 | X51*A35 X51*A75 | X51*A45 X51*A85 | | | | | | |
| 7 | X41 | A17 A57 | A27 A67 | A37 A77 | A47 A87 | X61*A16 X61*A56 | X61*A26 X61*A66 | X61*A36 X61*A76 | X61*A46 X61*A86 | | | | | | |
| 8 | | A18 A58 | A28 A68 | A38 A78 | A48 A88 | X71*A17 X71*A57 | X71*A27 X71*A67 | X71*A37 X71*A77 | X71*A47 X71*A87 | | | | | | |
| 9 | X51 | A11 A51 | A21 A61 | A31 A71 | A41 A81 | X81*A18 X81*A58 | X81*A28 X81*A68 | X81*A38 X81*A78 | X81*A48 X81*A88 | | | | | | |
| 10 | | A12 A52 | A22 A62 | A32 A72 | A42 A82 | X11*A11 X11*A51 | X11*A21 X11*A61 | X11*A31 X11*A71 | X11*A41 X11*A81 | R21+R31 R21+R35 | R22+R32 R22+R36 | R23+R33 R23+R37 | R24+R34 R24+R38 | | |
| 11 | X61 | A13 A53 | A23 A63 | A33 A73 | A43 A83 | X21*A12 X21*A52 | X21*A22 X21*A62 | X21*A32 X21*A72 | X21*A42 X21*A82 | R21+R31 R21+R35 | R22+R32 R22+R36 | R23+R33 R23+R37 | R24+R34 R24+R38 | | |
| 12 | | A14 A54 | A24 A64 | A34 A74 | A44 A84 | X21*A13 X21*A53 | X21*A23 X21*A63 | X21*A33 X21*A73 | X21*A43 X21*A83 | R21+R31 R21+R35 | R22+R32 R22+R36 | R23+R33 R23+R37 | R24+R34 R24+R38 | | |
| 13 | X71 | | | | | X31*A13 X31*A53 | X31*A23 X31*A63 | X31*A33 X31*A73 | X31*A43 X31*A83 | R21+R31 R21+R35 | R22+R32 R22+R36 | R23+R33 R23+R37 | R24+R34 R24+R38 | | |
| 14 | | | | | | X41*A14 X41*A54 | X41*A24 X41*A64 | X41*A34 X41*A74 | X41*A44 X41*A84 | R21+R31 R21+R35 | R22+R32 R22+R36 | R23+R33 R23+R37 | R24+R34 R24+R38 | | |
| 15 | X81 | | | | | X51*A15 X51*A55 | X51*A25 X51*A65 | X51*A35 X51*A75 | X51*A45 X51*A85 | R21+R31 R21+R35 | R22+R32 R22+R36 | R23+R33 R23+R37 | R24+R34 R24+R38 | | |
| 16 | | | | | | X61*A16 X61*A56 | X61*A26 X61*A66 | X61*A36 X61*A76 | X61*A46 X61*A86 | R21+R31 R21+R35 | R22+R32 R22+R36 | R23+R33 R23+R37 | R24+R34 R24+R38 | | |
| 17 | X11 | | | | | X71*A17 X71*A57 | X71*A27 X71*A67 | X71*A37 X71*A77 | X71*A47 X71*A87 | R21+R31 R21+R35 | R22+R32 R22+R36 | R23+R33 R23+R37 | R24+R34 R24+R38 | | |
| 18 | | | | | | X81*A18 X81*A58 | X81*A28 X81*A68 | X81*A38 X81*A78 | X81*A48 X81*A88 | R21+R31 R21+R35 | R22+R32 R22+R36 | R23+R33 R23+R37 | R24+R34 R24+R38 | | |
| 19 | X21 | | | | | X11*A11 X11*A51 | X11*A21 X11*A61 | X11*A31 X11*A71 | X11*A41 X11*A81 | R21+R31 R21+R35 | R22+R32 R22+R36 | R23+R33 R23+R37 | R24+R34 R24+R38 | | |
| 20 | | | | | | X21*A12 X21*A52 | X21*A22 X21*A62 | X21*A32 X21*A72 | X21*A42 X21*A82 | R21+R31 R21+R35 | R22+R32 R22+R36 | R23+R33 R23+R37 | R24+R34 R24+R38 | | |
| 21 | X31 | | | | | X21*A13 X21*A53 | X21*A23 X21*A63 | X21*A33 X21*A73 | X21*A43 X21*A83 | R21+R31 R21+R35 | R22+R32 R22+R36 | R23+R33 R23+R37 | R24+R34 R24+R38 | | |
| 22 | | | | | | X31*A13 X31*A53 | X31*A23 X31*A63 | X31*A33 X31*A73 | X31*A43 X31*A83 | R21+R31 R21+R35 | R22+R32 R22+R36 | R23+R33 R23+R37 | R24+R34 R24+R38 | | |
| 23 | X41 | | | | | X41*A14 X41*A54 | X41*A24 X41*A64 | X41*A34 X41*A74 | X41*A44 X41*A84 | R21+R31 R21+R35 | R22+R32 R22+R36 | R23+R33 R23+R37 | R24+R34 R24+R38 | | |
| 24 | | | | | | | | | | R21+R31 R21+R35 | R22+R32 R22+R36 | R23+R33 R23+R37 | R24+R34 R24+R38 | | |
| 25 | | | | | | | | | | R21+R31 R21+R35 | R22+R32 R22+R36 | R23+R33 R23+R37 | R24+R34 R24+R38 | R41 R42 R43 R44 R45 R46 R47 R48 | |
| 26 | | | | | | | | | | | | | | | R41 (Y11) |
| 27 | | | | | | | | | | | | | | | R42 (Y12) |
| 28 | | | | | | | | | | | | | | | R43 (Y13) |
| 29 | | | | | | | | | | | | | | | R44 (Y14) |
| 30 | | | | | | | | | | | | | | | R45 (Y15) |
| 31 | | | | | | | | | | | | | | R41 R42 R43 R44 R45 R46 R47 R48 | R46 (Y16) |
| 32 | | | | | | | | | | | | | | | R47 (Y17) |
| 33 | | | | | | | | | | | | | | | R48 (Y18) |
| | | | | | | | | | | | | | | | R41 (Y21) |
| | | | | | | | | | | | | | | | R42 (Y22) |
| | | | | | | | | | | | | | | | R43 (Y23) |
| | | | | | | | | | | | | | | | R44 (Y24) |
| | | | | | | | | | | | | | | | R45 (Y25) |
| | | | | | | | | | | | | | | | R46 (Y26) |
| | | | | | | | | | | | | | | | R47 (Y27) |
| | | | | | | | | | | | | | | | R48 (Y28) |

IMAGE DATA PROCESSING METHOD AND APPARATUS

BACKGROUND OF THE INVENTION

This invention relates to an image data coding apparatus for compressing image data, an image data reconstructing method and an apparatus for reconstructing images from compressed data. More particularly, it relates to a coding apparatus for coding continuous tone images, after dividing them into blocks each comprising a plurality of picture elements, by orthogonally transforming the picture elements in respective blocks, and to an image data reconstructing method and apparatus for reconstructing images from the orthogonally transformed coded data.

Gradient values for respective picture elements need to be coded highly efficiently, for storing or transmitting, at high speed and high quality, image data, especially grayscale image data and color image data, whose information volume is exceedingly greater than that of coded numerical data.

DESCRIPTION OF THE RELATED ART

Conventionally, an adaptive discrete cosine transform coding method is used as a highly efficient method for compressing image data, for example.

The following is a description of the adaptive discrete cosine transform coding method(, or the ADCT method in short).

According to the ADCT method, images are divided into blocks comprising e.g. 8×8 picture elements. DCT coefficients expressing the distribution of space frequencies are determined by performing two-dimensional discrete cosine transform (hereafter abbreviated as DCT) for the image signals from respective divided blocks. The image signals are coded by quantizing the DCT coefficients using thresholds corresponding to visions, according to a Huffman table obtained statistically from the quantized coefficients.

FIG. 1 is a block diagram of a coding circuit per the ADCT method.

FIG. 2 shows exemplary data for an original image received by the two-dimensional DCT unit.

FIG. 3 shows exemplary DCT coefficients representing a space frequency distribution.

The coding operation per the ADCT method is described below.

A two-dimensional DCT unit 24 receives from an input terminal 23 sixty-four (64) image signals, such as those shown in FIG. 2, for a block comprising 8×8 picture elements. By orthogonally transforming the received image signals, the two-dimensional DCT unit 24 transforms them into coefficients having space frequency distributions such as those shown in FIG. 3, thereby calculating DCT coefficients, and outputs them to a linear quantizer 25.

FIG. 4 is a block diagram of the two-dimensional DCT unit 24. A one-dimensional DCT unit 30 performs one-dimensional DCTs for the image signals inputted from the input terminal 23, and a transposer 31 transposes the matrix obtained from the one-dimensional DCT unit 30. Then, a one-dimensional DCT unit 32 performs one dimensional DCTs, as with the one-dimensional DCT unit 30 described earlier. As with the transposer 31 described earlier, a transposer 33 transposes the matrix obtained at the one-dimensional DCT unit 32 and outputs it to a terminal 34. Through similar performances for all of image blocks, the inputted image signals are transformed to the DCT coefficients.

FIG. 5 is a table of thresholds for DCT coefficients in a block.

FIG. 6 is a table of exemplary quantized DCT coefficients.

Further explanation is made by referring back to FIG. 1. The linear quantizer 25 quantizes the inputted DCT coefficients by the quantization matrix comprising the optically determined thresholds shown in FIG. 5. The linear quantization produces quantized coefficients such as those shown in FIG. 6, which indicate that the DCT coefficients smaller than thresholds become 0, thereby forming quantized coefficients in which the quantized DC elements and only a few quantized AC coefficients have non-zero values.

Generally, the higher the visual sensitivities the lower the space frequencies are, and the lower the visual sensitivities the higher the space frequencies are. Therefore, as shown in FIG. 5, the absolute values of the quantization matrix elements, i.e. the thresholds for DCT coefficients corresponding to lower space frequencies, are smaller, and the absolute values corresponding to higher space frequencies are larger. Accordingly, as shown in FIG. 6, of quantized coefficients, only the quantized DC element at the top left end and a very few quantized AC coefficients representing low space frequency elements become significant coefficients having non-zero value values, whereas all others become insignificant coefficients, in most cases.

FIG. 7 shows the order of scanning the generated quantized coefficients (from the lower frequency elements to the higher frequency elements of the space frequencies).

The linear quantizer 25 transforms the two-dimensionally arrayed quantized coefficients into a one-dimensional form according to the zigzag scanning order shown in FIG. 7 and inputs them to a variable length coder 26 in the next stage.

Upon receipt of these quantized coefficients, the variable length coder 26 codes generated quantized coefficients by referring to a coding table 27 composed of a Huffman table created by statistical volumes for the respective images. As for their quantized DC elements, the differences between the current quantized DC coefficients and the previous quantized DC coefficients are coded in variable lengths. As for their quantized AC coefficients, the values of the quantized AC coefficients (hereafter referred to as indices) of significant coefficients (non-zero value coefficients) and the run lengths (hereafter referred to as runs) of the insignificant coefficients (zero value coefficients) are coded in variable lengths. The output terminal 28 sequentially outputs the coded data to the external units.

Meanwhile, the coded data obtained by the coding circuit per the ADCT method are reconstructed as images according to the following method.

FIG. 8 is a block diagram of a decoding circuit per ADCT method.

A variable length decoder 41 receives the coded data inputted from an input terminal 40. The variable length decoder 41 decodes the received coded data into fixed length data of the indices and runs and outputs the decoded data to a dequantizer 43, according to a decoding table 42 formed by a table inverse of the Huffman table composing the coding table 27.

On receiving the decoded data (the decoded quantized coefficients), the dequantizer 43 reconstructs the dequantized DCT coefficients through a dequantization by multiplying the respective decoded data by the thresholds stored at the corresponding positions in a quantization matrix 48. The dequantizer 43 outputs the dequantized DCT coefficients to a two-dimensional inverse DCT unit 44.

The two-dimensional inverse DCT unit 44 orthogonally transforms the received dequantized DCT coefficients indicating the distribution of the space frequencies into image signals.

The two-dimensional inverse DCT unit 44 is explained in further detail. FIG. 9 is a block diagram of a two-dimensional inverse DCT unit of the ADCT decoding circuit.

A one-dimensional inverse DCT unit 51 performs one-dimensional inverse DCTs for the DCT coefficients inputted from a terminal 50 and outputs them to a transposer 52. The transposer 52 transposes the matrix representing the outputs from the one-dimensional inverse DCT unit 51. A one-dimensional inverse DCT unit 53 again performs one-dimensional inverse DCTs on the transposed matrix obtained from the matrix transposition at the transposer 52. As with the transposer 52, a transposer 54 transposes the matrix representing the outputs from the one-dimensional inverse DCT unit 53. A terminal 45 outputs signals obtained by these processes, thereby reconstructing the images.

Per the earlier described ADCT method, the quantized coefficients are obtained by quantizing DCT coefficients by quantization thresholds. FIG. 10 is a block diagram of a conventional linear quantization circuit.

DCT coefficients inputted from a terminal 60 are supplied to a DCT coefficient receptor 64 to be stored. The DCT coefficient receptor 64 sequentially outputs the inputted DCT coefficients to a divider 65 upon receiving respective (RED) signals for reading data supplied from a timing controller 61.

Similarly, a quantization threshold storing unit 62 sequentially outputs the quantization thresholds corresponding to the respective stored data to the divider 65 upon receiving the respective (RED) signals for reading data supplied from a timing controller 61.

The divider 65 quantizes inputted DCT coefficients at the respective positions by the corresponding quantization thresholds, and outputs the results as quantized coefficients (QUD) to a latch 66. The timing controller 61 generates latch signals (LAT) for a latch 66 to latch quantized coefficients, and the latch 66 outputs quantized coefficients to a run/index judge 63, which judges, separates and outputs runs and indices. After one coefficient is quantized, the timing controller 61 instructs the DCT coefficient receptor 64 and the quantization threshold storing unit 62 to read the DCT coefficients and quantization thresholds at the next position for quantizing the DCT coefficient at the next position. By repeating the processes, comprising reading DCT coefficients stored in the DCT coefficient receptor 64 one by one, dividing them by the quantization threshold storing unit 62, and outputting the results as quantized coefficients, for an entire image in block units, all the DCT coefficients for the image are quantized.

A variable length coder receives runs and indices separated from the quantized coefficients at the run/index judge 63. FIG. 11 shows the configuration of a variable length coder. A variable length coder 67 comprises a coding controller 69 and a code bit shifter 70. The coding controller 69 receives runs and indices, obtains coded signals by using a coding table 68, the Huffman table described earlier, and inputs them to the code bit shifter 70, which shifts the coded signals by the number of indicated bits and outputs them as coded data.

The conventional one-dimensional DCT units 51 and 53 shown in FIG. 9 reconstruct images in a column by performing inverse DCT operations represented by the matrix calculations expressed as equations 0 through 8 for the 8 picture elements in a column when a block comprises $8 \times 8$ picture elements. In equations 0 through 8, column matrix elements X11 through X81 represent DCT coefficients in a column, column matrix elements Y11 through Y81 represent reconstructed image signals in a column, and square matrix elements A11 through A88 represent transform constants.

$$\begin{pmatrix} Y11 \\ Y21 \\ Y31 \\ Y41 \\ Y51 \\ Y61 \\ Y71 \\ Y81 \end{pmatrix} = \begin{pmatrix} A11 & A12 & A13 & A14 & A15 & A16 & A17 & A18 \\ A21 & A22 & A23 & A24 & A25 & A26 & A27 & A28 \\ A31 & A32 & A33 & A34 & A35 & A36 & A37 & A38 \\ A41 & A42 & A43 & A44 & A45 & A46 & A47 & A48 \\ A51 & A52 & A53 & A54 & A55 & A56 & A57 & A58 \\ A61 & A62 & A63 & A64 & A65 & A66 & A67 & A68 \\ A71 & A72 & A73 & A74 & A75 & A76 & A77 & A78 \\ A81 & A82 & A83 & A84 & A85 & A86 & A87 & A88 \end{pmatrix} \begin{pmatrix} X11 \\ X21 \\ X31 \\ X41 \\ X51 \\ X61 \\ X71 \\ X81 \end{pmatrix} \quad \text{(equation 0)}$$

$$\begin{aligned} Y11 &= A11^*X11 + A12^*X21 + A13^*X31 + A14^*X41 + \\ & \quad A15^*X51 + A16^*X61 + A17^*X71 + A18^*X81 \\ &= F11 + F12 + F13 + F14 + F15 + F16 + F17 + F18 \end{aligned} \quad \text{(equation 1)}$$

$$\begin{aligned} Y21 &= A21^*X11 + A22^*X21 + A23^*X31 + A24^*X41 + \\ & \quad A25^*X51 + A26^*X61 + A27^*X71 + A28^*X81 \\ &= F21 + F22 + F23 + F24 + F25 + F26 + F27 + F28 \end{aligned} \quad \text{(equation 2)}$$

$$\begin{aligned} Y31 &= A31^*X11 + A32^*X21 + A33^*X31 + A34^*X41 + \\ & \quad A35^*X51 + A36^*X61 + A37^*X71 + A38^*X81 \\ &= F31 + F32 + F33 + F34 + F35 + F36 + F37 + F38 \end{aligned} \quad \text{(equation 3)}$$

$$\begin{aligned} Y41 &= A41^*X11 + A42^*X21 + A43^*X31 + A44^*X41 + \\ & \quad A45^*X51 + A46^*X61 + A47^*X71 + A48^*X81 \\ &= F41 + F42 + F43 + F44 + F45 + F46 + F47 + F48 \end{aligned} \quad \text{(equation 4)}$$

$$\begin{aligned} Y51 &= A51^*X11 + A52^*X21 + A53^*X31 + A54^*X41 + \\ & \quad A55^*X51 + A56^*X61 + A57^*X71 + A58^*X81 \\ &= F51 + F52 + F53 + F54 + F55 + F56 + F57 + F58 \end{aligned} \quad \text{(equation 5)}$$

$$\begin{aligned} Y61 &= A61^*X11 + A62^*X21 + A63^*X31 + A64^*X41 + \\ & \quad A65^*X51 + A66^*X61 + A67^*X71 + A68^*X81 \\ &= F61 + F62 + F63 + F64 + F65 + F66 + F67 + F68 \end{aligned} \quad \text{(equation 6)}$$

$$\begin{aligned} Y71 &= A71^*X11 + A72^*X21 + A73^*X31 + A74^*X41 + \\ & \quad A75^*X51 + A76^*X61 + A77^*X71 + A78^*X81 \\ &= F71 + F72 + F73 + F74 + F75 + F76 + F77 + F78 \end{aligned} \quad \text{(equation 7)}$$

$$\begin{aligned} Y81 &= A81^*X11 + A82^*X21 + A83^*X31 + A84^*X41 + \\ & \quad A85^*X51 + A86^*X61 + A87^*X71 + A88^*X81 \\ &= F81 + F82 + F83 + F84 + F85 + F86 + F87 + F88 \end{aligned} \quad \text{(equation 8)}$$

A CPU conventionally codes and decodes image data as described earlier. That is, a CPU serially processes inputted image data and sequentially performs e.g. two-dimensional DCTs, linear quantizations, and coding or decoding in variable lengths in block units or image units. Hence, there are inherent problems of taking too much time in coding and decoding and of failing to process on a real time basis.

The problem of taking too much time is aggravated, since inverse DCTs are performed on DCT coefficients in all blocks when DCT coefficients are reconstructed as images.

Thus, the inverse DCTs for a block comprising 8×8 picture elements are an 8×8 matrix multiplication. Since each set of operations for a picture element comprises eight (8) multiplications between corresponding matrix elements and seven (7) additions of the eight (8) products, the calculations of product matrix for all 8×8 picture elements in a block takes a total of 512 multiplications and 448 additions. This causes a problem that the inverse DCTs for all blocks in an image makes an image reconstruction hard to expedite.

Although it is possible to expedite the processing by forming the inverse DCT units 51 and 53 with eight sets of operation circuits, this makes the circuits of the inverse DCT units 51 and 53 larger, and hence the image reconstructing apparatus, too large.

SUMMARY OF THE INVENTION

This invention aims at realizing an image data coding and decoding apparatus which operates at high speed and an orthogonally transforming apparatus which enables small circuits to perform high speed processing.

This invention pertains to an image data reconstructing apparatus that decodes, dequantizes and performs two-dimensional inverse DCTs on the input codes obtained by coding after quantizing the results obtained by performing two-dimensional DCTs on image data for respective blocks each comprising N×N picture elements. When there is a column whose elements are multiplied by 0, such an image data reconstructing apparatus skips the operations, thereby enabling small circuits to perform high speed processing. Before dequantizations, by respectively providing buffers for memorizing picture elements of two blocks before and after two-dimensional inverse DCTs, inputs and outputs are switched in block units to expedite the processes in pipeline operations.

Further, the circuit is made compact by forming a two-dimensional inverse DCT with two repetitions of a one-dimensional inverse DCT and of a matrix transposition. This is realized by storing the result of the one-dimensional inverse DCT in the buffer, thereby eliminating a matrix transposing circuit.

BRIEF DESCRIPTION OF THE DRAWINGS

FIG. 2 shows exemplary data for an original image received by the two-dimensional DCT unit;

FIG. 3 shows exemplary DCT coefficients representing a space frequency distribution;

FIG. 5 is a table of thresholds for DCT coefficients;

FIG. 6 is a table of quantized DCT coefficients;

FIG. 7 shows the order of zigzag scanning the generated quantized coefficients;

FIG. 12 illustrates the principle of an inverse DCT unit in a first embodiment of this invention;

FIGS. 13A and 13B illustrate control flags indicating distributions of zero value decoded dequantized DCT coefficients;

FIG. 15 shows exemplary distributions of zero value decoded dequantized DCT coefficients in a block;

FIGS. 16A and 16B illustrate control flags obtained from the example shown in FIG. 15;

FIG. 20 shows the operational steps in the one-dimensional inverse DCT unit shown in FIG. 19;

FIG. 29 illustrates relations between column addresses and flags;

FIG. 30 is a flowchart of operations of the operation processor shown in the fourth embodiment;

FIG. 31 illustrates a pipeline performance of one-dimensional inverse DCTs on DCT coefficients shown in FIG. 32;

FIG. 32 shows dequantized DCT coefficients;

FIG. 33 shows an example of a transform result;

FIG. 34 illustrates relations between column addresses and flags;

DESCRIPTION OF THE PREFERRED EMBODIMENTS

Figure 1:
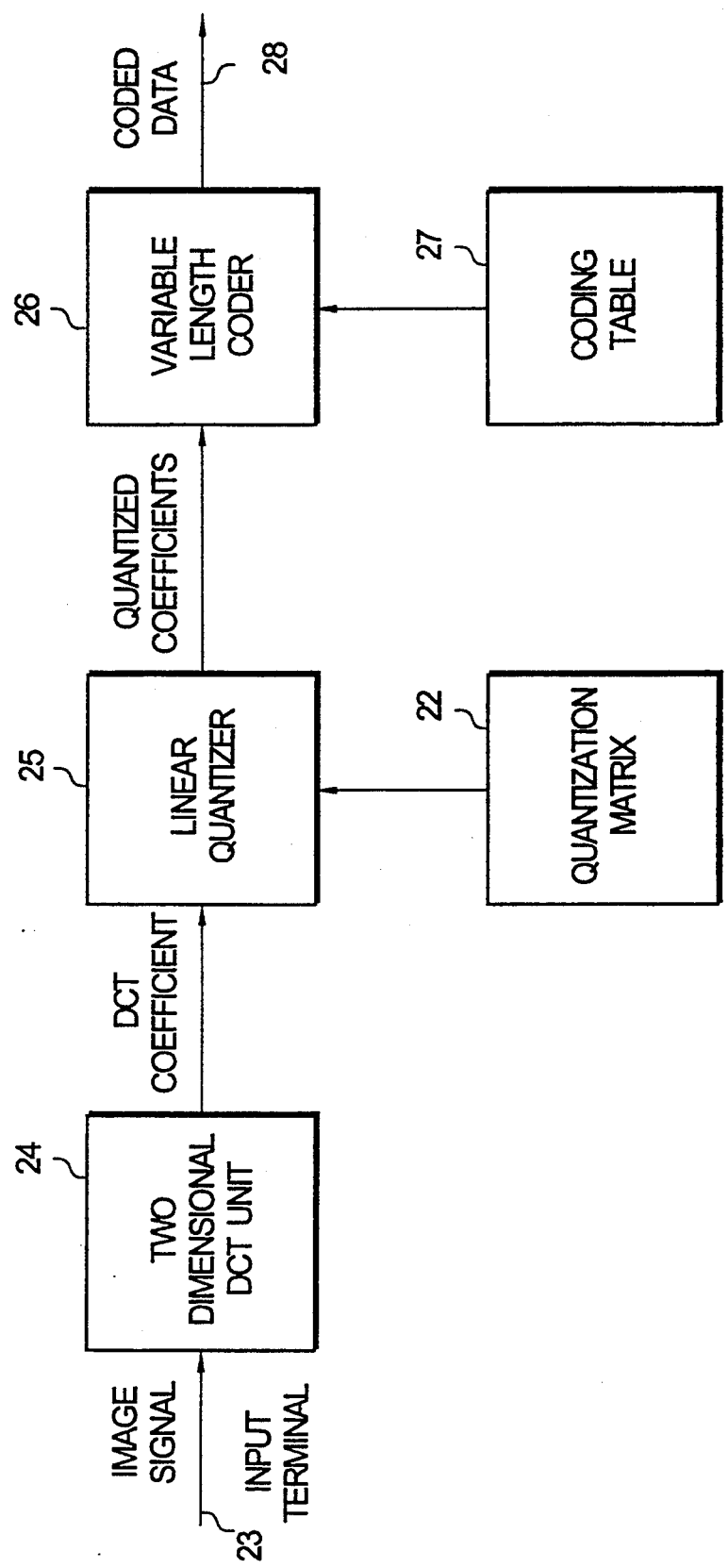
FIG. 1 is a block diagram of a coding circuit per the ADCT method.

FIG. 12 illustrates the principle of an inverse DCT unit in a first embodiment of this invention.

The first embodiment relates to an image data reconstructing apparatus for reconstructing an image from coded data obtained by coding quantized coefficients, which are obtained by quantizing transform coefficients obtained by performing two-dimensional discrete cosine transforms on the gradient values of plural picture elements in the respective blocks each comprising a plurality ($N \times N$; where N is a positive integer) of picture elements divided from an original image.

Such an image data reconstructing apparatus in the first embodiment comprises a DCT coefficient storing unit 72 for storing decoded dequantized DCT coefficients, a zero detector 73 for judging whether or not the decoded dequantized DCT coefficients are zero, a flag setter 74 for setting flags indicating the distributions of zero value coefficients and non-zero value coefficients among the $N \times N$ dequantized DCT coefficients based on the judging results of the zero detector 73, a transform constant storing unit 76 for storing transform constants for performing an inverse DCT for inputted dequantized DCT coefficients, an inverse DCT unit 77 for reconstructing an image signal by performing an inverse DCT on a dequantized DCT coefficient read from the DCT coefficient storing unit 72, a read controller 75 for controlling reading signals from the transform constant storing unit 76 and the DCT coefficient storing unit 72.

Here, the zero detector 73 operates in parallel with the DCT coefficient storing unit 72. Since the DCT coefficient storing unit 72 also operates in parallel with the inverse DCT unit 77, the DCT coefficient storing unit 72 has DCT coefficient storing regions for two blocks, so that dequantized DCT coefficients representing a block are written into one DCT coefficient storing region, while dequantized DCT coefficients already written in the other DCT coefficient storing region are read concurrently.

The read controller 75 operates according to the results set by the flag setter 74, which comprises a first flag creator for creating a first flag indicating whether or not the entire N dequantized DCT coefficients in a column are all zero, a second flag creator for creating a second flag indicating whether or not the last N/2 dequantized DCT coefficients in a column are all zero, and a third flag creator for creating a third flag using the first and second flags.

As a result, the read controller 75 skips reading N dequantized DCT coefficients in a column stored in the DCT coefficient storing unit 72 when the N dequantized DCT coefficients are all zero, or N/2 dequantized DCT coefficients in a column stored in the DCT coefficient storing unit 72 when the N/2 dequantized DCT coefficients are all zero, and simultaneously controls reading transform constants stored in the transform constant storing unit 76.

To summarize, the above described apparatus operates per the following image data reconstructing method for reconstructing an image from coded data obtained by coding quantized coefficients, which are obtained by quantizing transform coefficients obtained by performing two-dimensional DCTs on the gradient values of the plural picture elements in the respective blocks each comprising a plurality ($N \times N$; where N is a positive integer) of picture elements divided from an original image.

Such an image data reconstructing method in the first embodiment basically comprises a first step of storing $N \times N$ decoded dequantized DCT coefficients, a second step of setting flags indicating the distributions of zero value coefficients and non-zero value coefficients among the $N \times N$ dequantized DCT coefficients, and a third step of reconstructing image signals by performing inverse DCTs on inputted dequantized DCT coefficients, and controls the reading of dequantized DCT coefficients stored in the first step according to the flags set in the second step. It further comprises a fourth step of judging whether or not dequantized DCT coefficients are zero in parallel with storing the dequantized DCT coefficients decoded in the first step. Based on the judging result in the fourth step, the second step sets flags indicating the distributions of zero value coefficients and non-zero value coefficients among the $N \times N$ dequantized DCT coefficients. The third step performs the inverse DCT per the read control based on the flags. When the flags indicate that all dequantized DCT coefficients in a column or a half thereof are 0, their inverse DCTs are skipped.

When an image data reconstructing apparatus performs inverse DCTs on decoded dequantized DCT coefficients whose values are zero, the results are also zero. Therefore, by taking advantage of the fact that no operation is necessary for zero value coefficients, by judging whether or not the decoded dequantized DCT coefficients are zero, by setting flags indicating distributions of zero value coefficients and non-zero value coefficients, and by controlling the number of dequantized DCT coefficients for performing inverse DCTs per the values set in the flags, an image data reconstructing apparatus with a configuration such as that described above can greatly reduce the number of inverse DCTs, thereby improving the image reconstruction speed.

The actions are explained below in further detail, by using FIG. 12.

Figure 4:
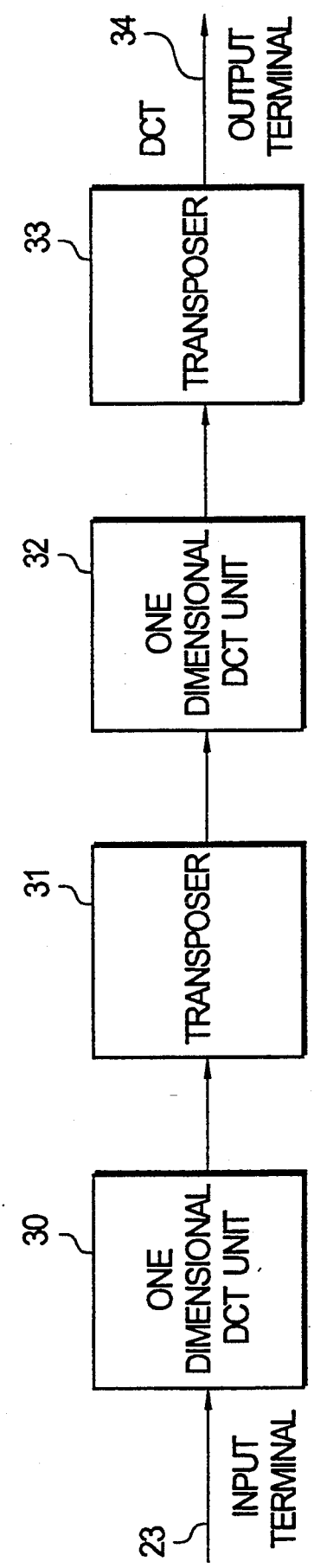
FIG. 4 is a block diagram of the two-dimensional DCT unit 24.

The image data reconstructing apparatus in the first embodiment of this invention is a reconstructing circuit for reconstructing coded data obtained by the coding device per the ADCT method shown in FIGS. 1 and 4, and relates particularly to a two-dimensional inverse DCT unit. This invention configures to reconstruct blocks of $8 \times 8$ picture elements.

Figure 8:
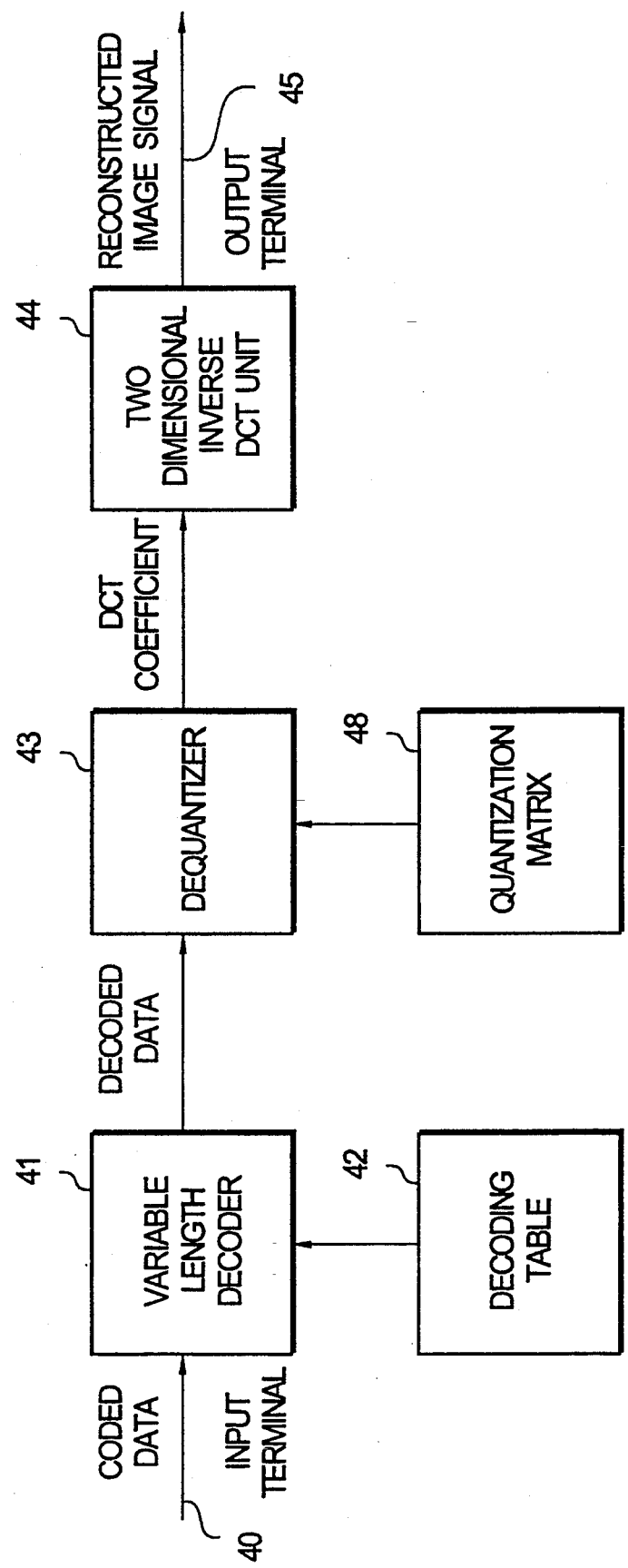
FIG. 8 is a block diagram of a decoding circuit per the ADCT method.

DCT coefficients for a block comprising $8 \times 8$ picture elements such as those shown in FIG. 3 dequantized by the dequantizer 43 after being decoded by the variable length decoder 41 shown in. FIG. 8. The decoded dequantized DCT coefficients are sequentially inputted from a terminal 71 and supplied simultaneously to the DCT coefficient storing unit 72 and the zero detector 73.

The zero detector 73 detects whether or not the decoded dequantized DCT coefficients are zero, and outputs the detected results to the flag setter 74.

The flag setter 74 has two kinds of control flags A and B shown in FIGS. 13A and 13B, indicating distributions of zero value decoded dequantized DCT coefficients.

FIGS. 13A and 13B illustrate control flags indicating distributions of zero value decoded dequantized DCT coefficients.

Control flag A (a first flag) shown in FIG. 13A indicates whether or not eight (8) decoded dequantized DCT coefficients in the n-th column of a block are all zero. Here, n (=1 through 8) represents a column number. That is, flag data respectively comprising one (1) bit are set for flags No. 1 through 8 indicating columns. Flag data indicate the following.

Bit 0: The decoded dequantized DCT coefficients in the column are all zero.
Bit 1: At least one of the decoded dequantized DCT coefficients in the column is not zero.

Control flag B (a second flag) shown in FIG. 13B indicates whether or not the latter half four (4) of the eight (8) decoded dequantized DCT coefficients in the n-th column of a block are all zero. That is, flag data respectively comprising one (1) bit are set for flags No. 1 through 8 indicating columns. Flag data indicate the following.

Bit 0: At least one of the decoded dequantized DCT coefficients in the latter half of the column is not zero.
Bit 1: The decoded dequantized DCT coefficients in the later half of the column are all zero.

Figure 14:
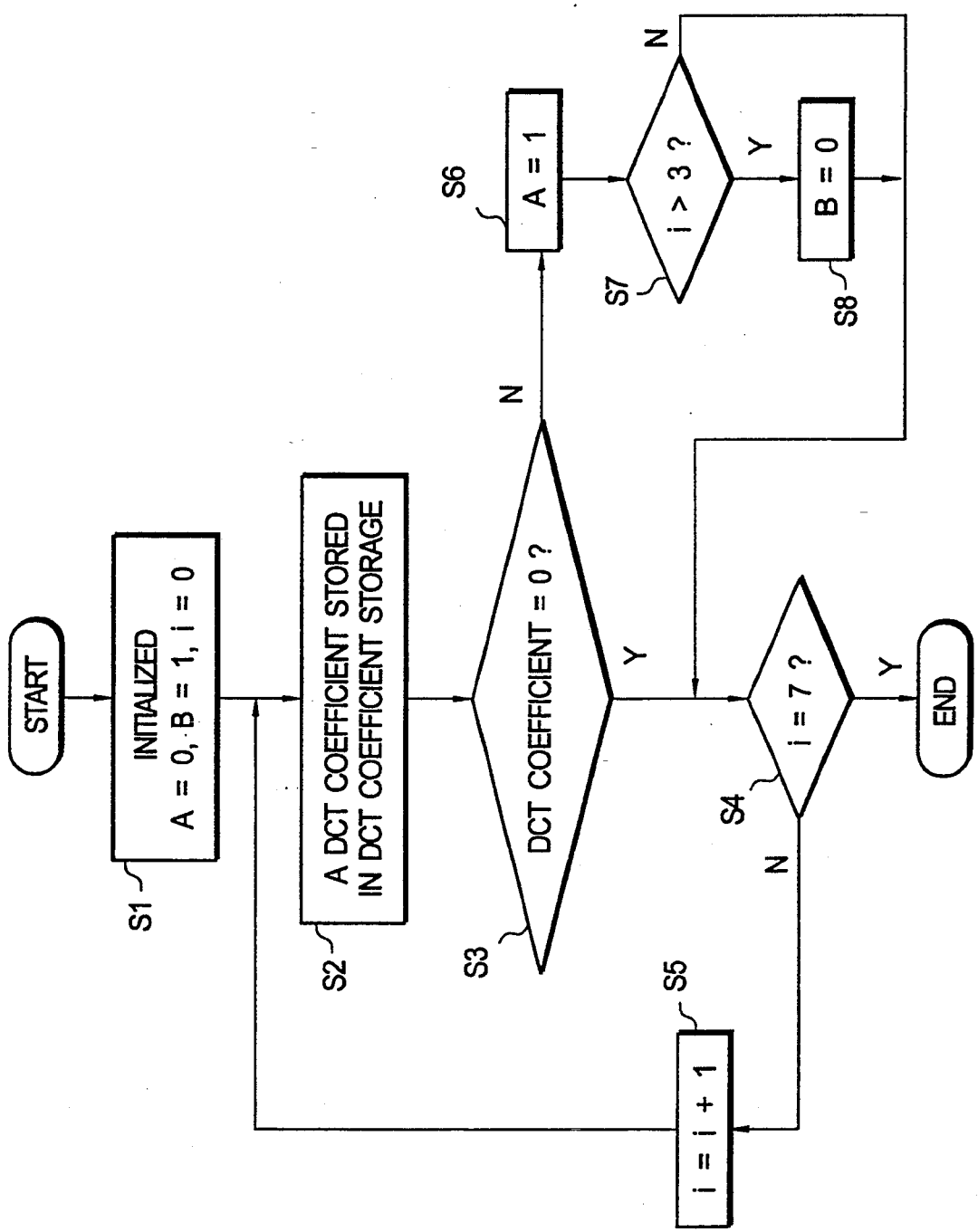
FIG. 14 shows the flow of flag setting operations.

FIG. 14 shows the flow of flag setting operations.

The operational flow shown in FIG. 14 govern the flag setting operations of the flag setter 74.

In step S1, control flags are initialized to the condition in which A=0 and B=1, indicating that the dequantized DCT coefficients in a column are all zero.

In step S2, the DCT coefficient storing unit 72 stores the head end dequantized DCT coefficient of the first column, which is read first.

In step S3, it is judged whether or not the detection result of the zero detector is zero. If the dequantized DCT coefficient is zero, the process proceeds to step S4. If not, the process skips to step S6.

In step S4, it is judged whether or not the counter i indicating the number of dequantized DCT coefficients in a column has reached the last 8. If it has, the process ends. If it has not, the process proceeds to step S5.

In step S5, the counter i is incremented by 1, and the process reverts to step S2, where the second dequantized DCT coefficient being i=1 is read next. As long as the dequantized DCT coefficient is zero, the same process is repeated. In this case, the control flags A and B are set with initial values A=0, B=1 "as is".

In step S6, control flag A is changed to A=1, indicating that not all dequantized DCT coefficients are zero.

In step S7, it is judged whether or not the counter value i exceeds 3, which indicates one of the four (4) dequantized DCT coefficients in the latter half. If it does not, the process skips step S8 and reverts to step S2 through steps S4 and S5 without changing control flag B, and the next dequantized DCT coefficient is read. This is because at least one of the four (4) dequantized DCT coefficients in the first half is not zero. If counter value i exceeds 3, which indicates one of the four (4) dequantized DCT coefficients in the latter half, the process proceeds to step S8.

In step S8, control flag B, set at B=1 indicating that the four (4) dequantized DCT coefficients in the latter half are all zero in the initial condition, is changed to B=0. Then, the process proceeds to step S4.

By repeating the above processes for all the columns (each comprising eight (8) dequantized DCT coefficients) in the entire block, flags for one block (comprising eight (8) columns) are set, and the flag setting result is outputted to the read controller 75.

The flag setting result for the respective columns outputted from the read controller 75 is one of the following.

(1) A=0, B=1; dequantized DCT coefficients in one column are all zero.
(2) A=1, B=1; dequantized DCT coefficients in the latter half of a column are all zero.
(3) A=1, B=0; Other than (1) or (2).

FIG. 15 shows exemplary distributions of zero value decoded dequantized DCT coefficients in a block;

FIGS. 16A and 16B illustrate control flags obtained from the example shown in FIG. 15;

When the dequantized DCT coefficients of a block stored in the DCT coefficient storing unit 72 are in the state shown in FIG. 15, for instance, the flag setting operations shown in FIG. 14 set control flags A and B for the first through eighth columns, as shown in FIG. 16.

The read controller 75 reads the dequantized DCT coefficients from the DCT coefficient storing unit 72 corresponding to the values set in the inputted flags, and outputs them to the inverse DCT unit 77. At the same time, the read controller 75 outputs the transform constants from the transform constant storing unit 76 necessary for calculation to the inverse DCT unit 77.

Figure 9:
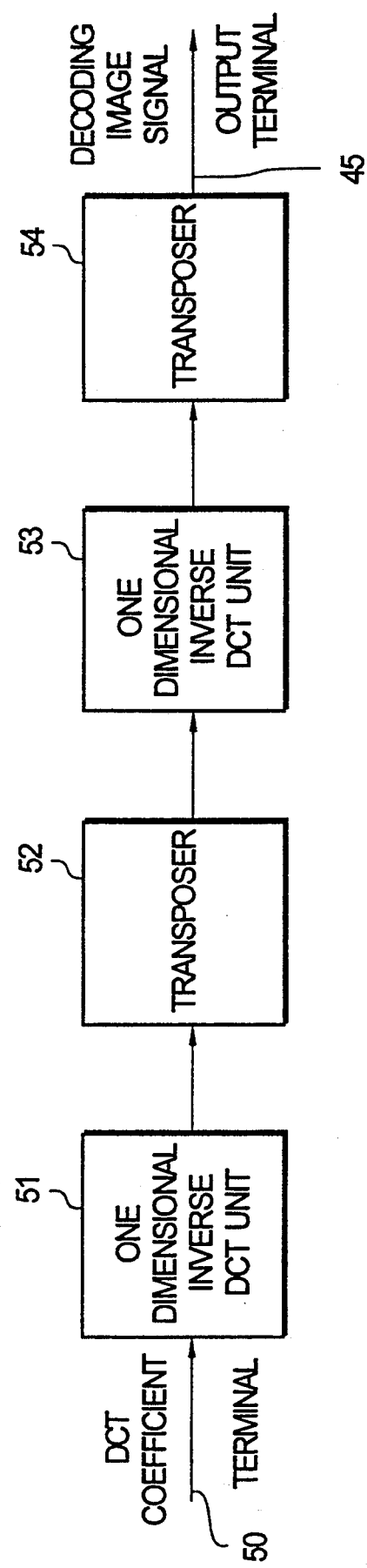
FIG. 9 is a block diagram of a two-dimensional inverse DCT unit of the ADCT decoding circuit.
Figure 10:
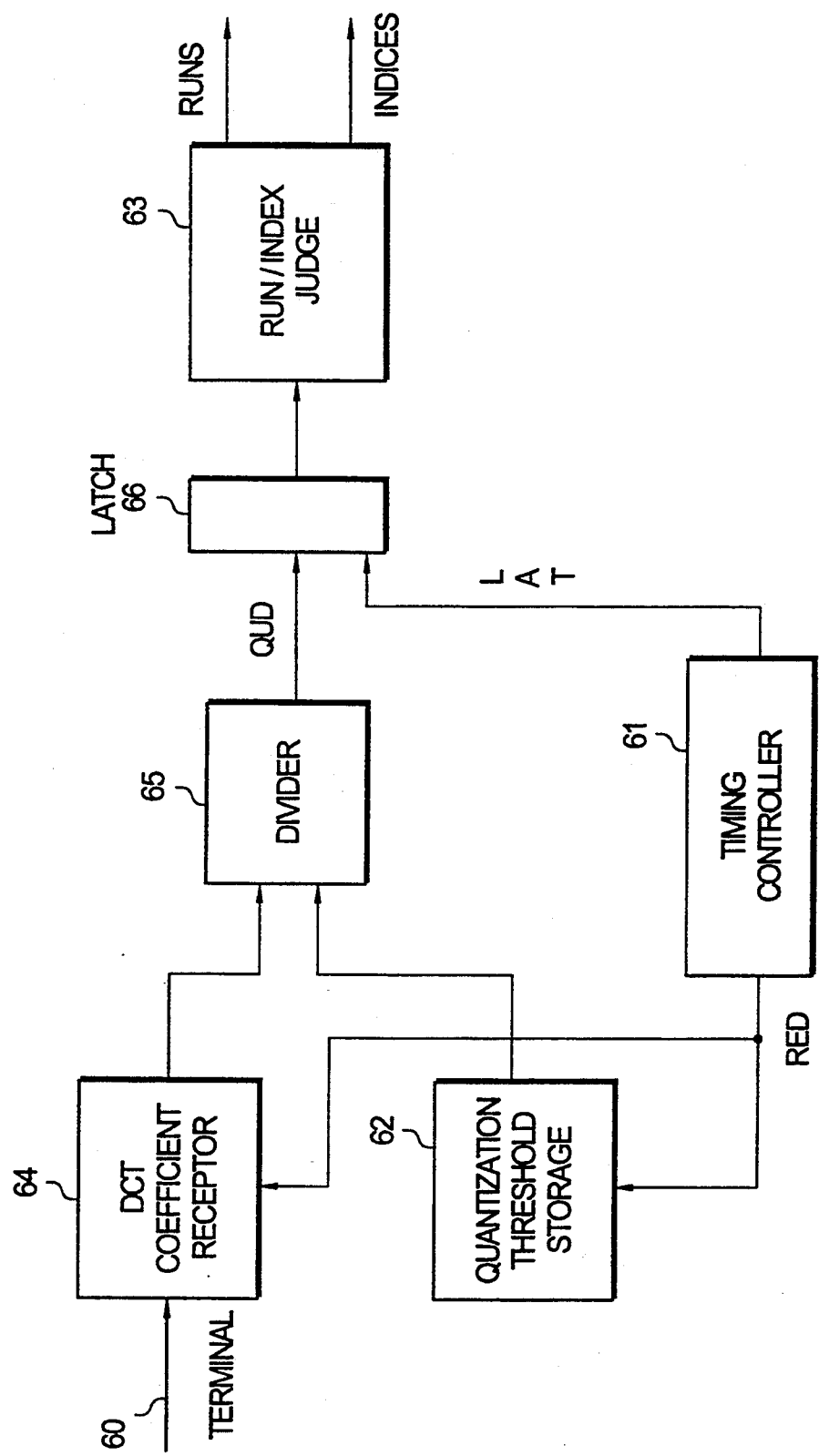
FIG. 10 is a block diagram of a conventional linear quantization circuit.
Figure 11:
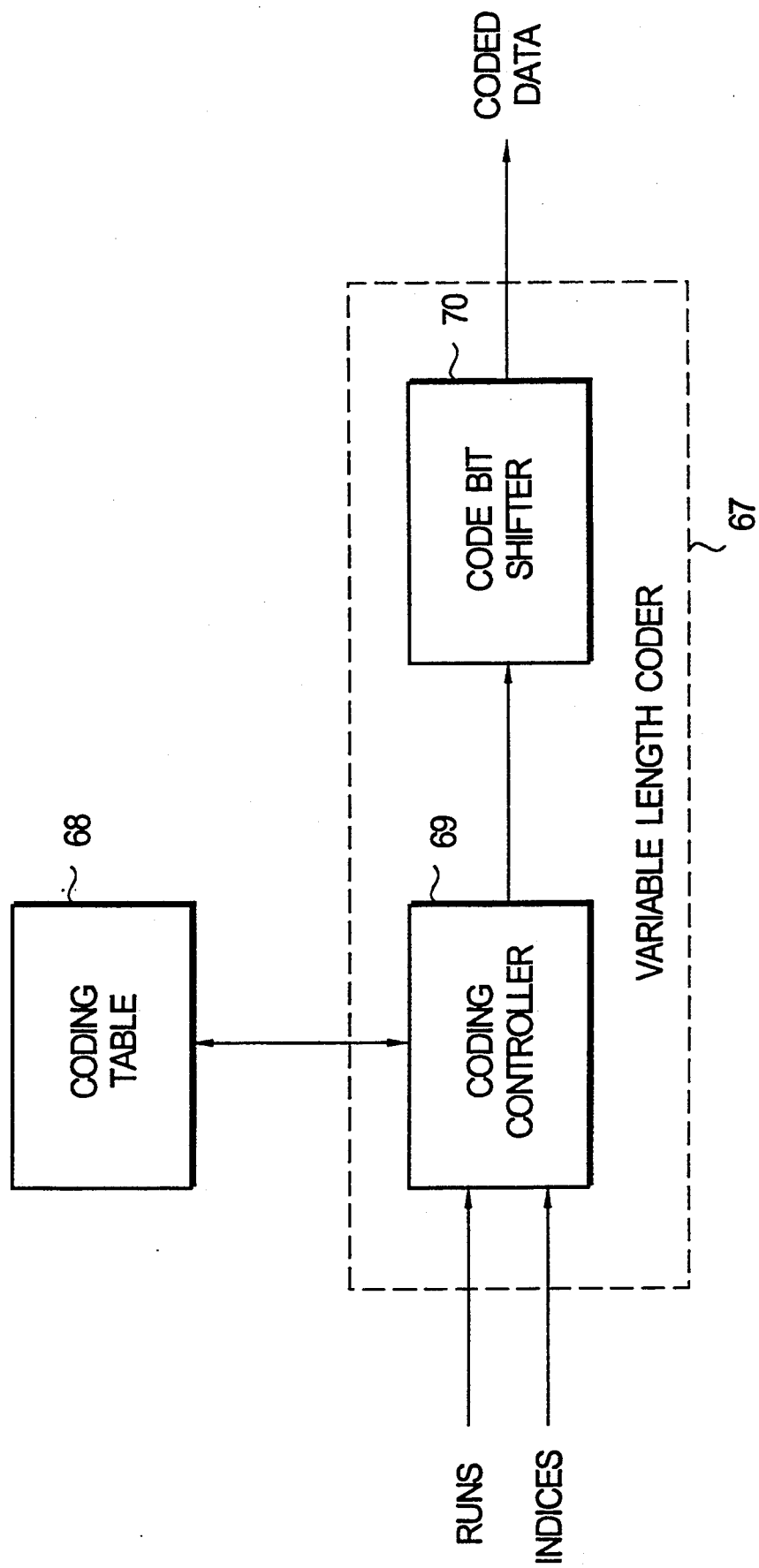
FIG. 11 shows the configuration of a variable length coder.

Here, as shown in FIG. 9, the inverse DCT unit 77 comprises the one-dimensional inverse DCT unit 51, the transposer 52, the one-dimensional inverse DCT unit 53 and the transposer 54.

Also, the DCT coefficient storing unit 72 comprises storage regions for two blocks, thereby enabling dequantized DCT coefficients to be stored in one region at the same time as the dequantized DCT coefficients for one block stored in the last time from the other region are read. Thus, so that the processing of the inverse DCT unit 77 is performed in parallel.

More specifically, based on the control flags A and B shown in FIG. 16, the read controller 75 reads the eight (8) dequantized DCT coefficients, shown in FIG. 15, in the columns where control flag indications are (A B)=(1 0)

i.e. the first and seventh columns, and has the inverse DCT unit 77 perform operations. The read controller 75 reads the four (4) dequantized DCT coefficients in the first halves of the columns where control flag indications are (A B)=(1 1)

i.e. the third and sixth columns, and has the inverse DCT unit 77 perform operations. It goes without saying that the first through eighth columns are read sequentially.

As a result, in the exemplary case shown in FIG. 15, image signals for one block are reconstructed by outputting the result of operations by reading only a total of twenty-four (24) dequantized DCT coefficients, i.e. eight (8) in the first column, four (4) in the third column, four (4) in the sixth column, and eight (8) in the seventh column, among sixty-four (64) dequantized DCT coefficients in one block from the terminal 78.

By repeating the above processing for respective blocks in an image, the image is reconstructed.

Although in the first embodiment of this invention described earlier, flags are set according to whether all dequantized DCT coefficients in a column or its latter half are zero, they can be set by making further subdivisions.

Figure 17:
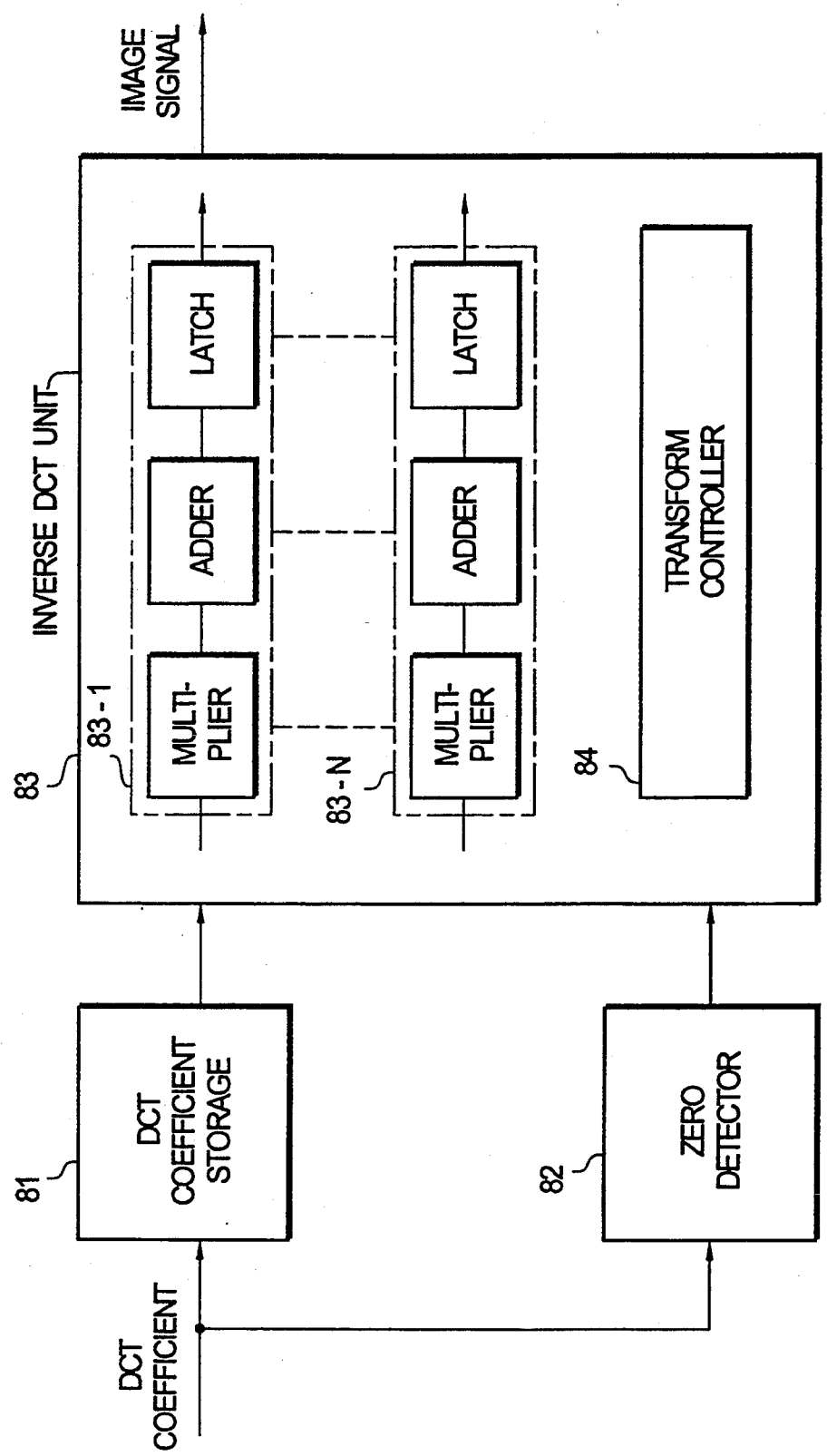
FIG. 17 illustrates a principle of an inverse DCT unit in a second embodiment of this invention.

FIG. 17 illustrates the principle of an inverse DCT unit in a second embodiment of this invention.

The second embodiment relates to an image data reconstructing apparatus for reconstructing an image from coded data obtained by coding quantized coefficients, which are obtained by quantizing transform coefficients obtained by performing two-dimensional DCTs on the gradient values of the plural picture elements in the respective blocks each comprising a plurality (N×N; where N is a positive integer) of picture elements divided from an original image.

Such an image data reconstructing apparatus in the second embodiment comprises a DCT coefficient storing unit 81 for storing decoded dequantized DCT coefficients, a zero detector 82 for judging whether or not the counter value is zero in every predetermined M units of N×N dequantized DCT coefficients, N multipliers and adders and N latches for storing N accumulation results, and an inverse DCT unit 83 for reconstructing image signals by performing inverse DCT on the inputted dequantized DCT coefficients.

Here, the inverse DCT unit 83 comprises a transform controller 84 for controlling the contemporaneous processing of data input, multiplication, addition, and output of transform results.

Based on the result detected by the zero detector 82, the inverse DCT unit 83 performs inverse DCTs on the columns, of the dequantized DCT coefficients stored in the dequantized DCT coefficient storing unit 81, in which N dequantized DCT coefficients or N/2 dequantized DCT coefficients in the latter half are all non-zero.

Further, the inverse DCT unit 83 operates at a predetermined operation cycle L for the columns from which N dequantized DCT coefficients are read, and at the operation cycle L/2 for the columns from which N/2 dequantized DCT coefficients in the first half are read.

When N dequantized DCT coefficients in a column are read from the DCT coefficient storing unit 81, the transform controller 84 outputs N inverse DCT results in one operation cycle. When N/2 dequantized DCT coefficients in the first half of a column are read from the DCT coefficient storing unit 81, the transform controller 84 outputs N inverse DCT results in a ½ operation cycle.

According to the second embodiment of this invention, the inverse DCT unit 83 is configured by N one-dimensional inverse DCT units 83-1 through 83-N each comprising a multiplier, an adder and a latch. When respective operations are connected in a pipeline processing, it is judged whether or not the decoded dequantized DCT coefficients are zero in N units. Only when N dequantized DCT coefficients are all zero, by skipping the inverse DCTs for N dequantized DCT coefficients, the number of inverse DCT operations is greatly reduced without damaging pipeline processing in the inverse DCT unit 83.

Also, by similarly judging whether or not the decoded dequantized DCT coefficients are zero in N/2 units, by skipping the inverse DCTs for N/2 dequantized DCT coefficients and by controlling output clocks for the N decoded dequantized DCT coefficients when the N/2 dequantized DCT coefficients are all zero, the number of inverse DCT operations are greatly reduced without damaging pipeline processing in the inverse DCT unit 83, thus enabling a simple circuit to improve image reconstruction speeds.

Figure 18A:
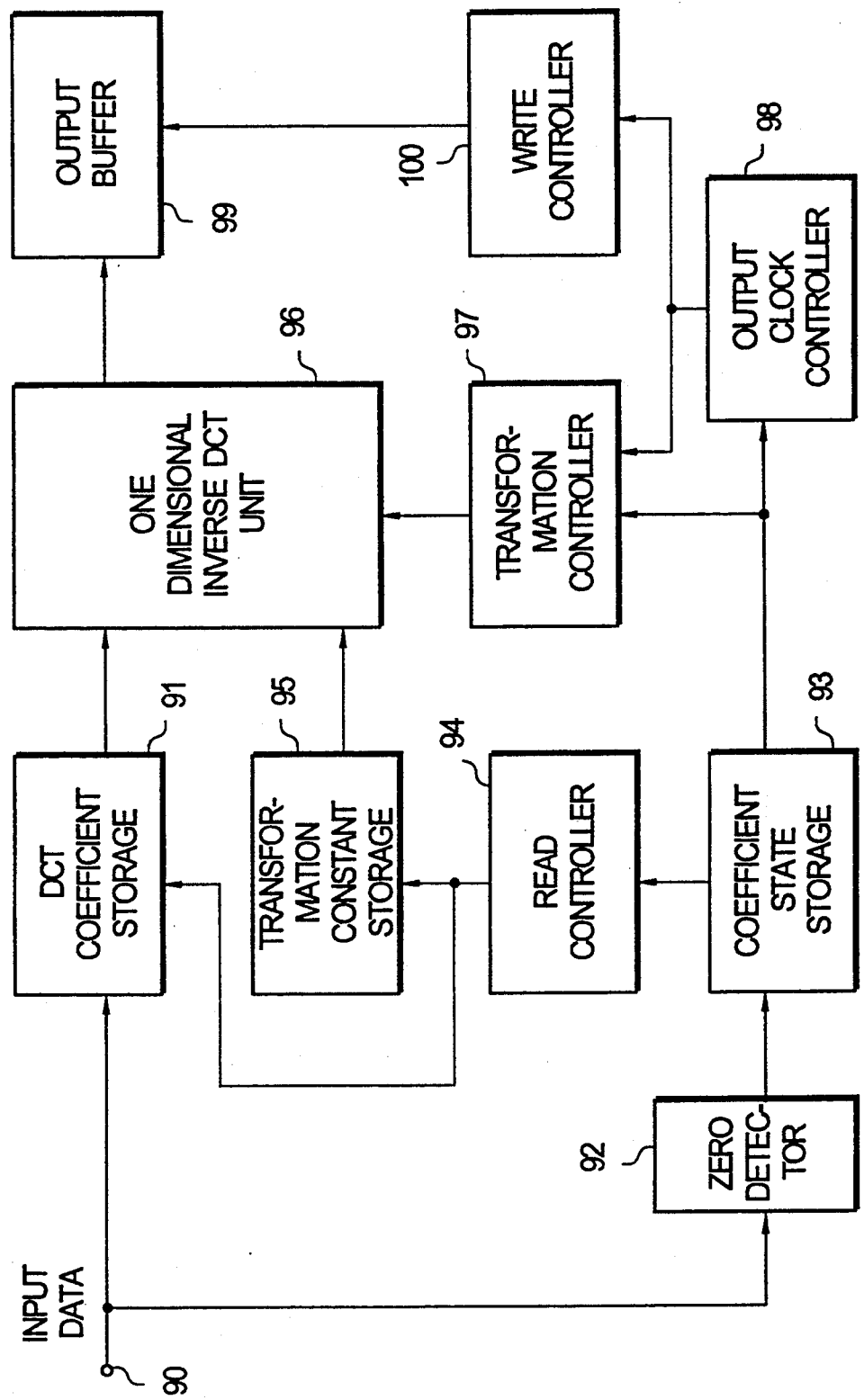
FIGS. 18A and 18B show, in further detail, the configuration of the inverse DCT unit in the second embodiment, with the latter (a flowchart) summarizing the actions shown in the former (a block diagram)
Figure 18B:
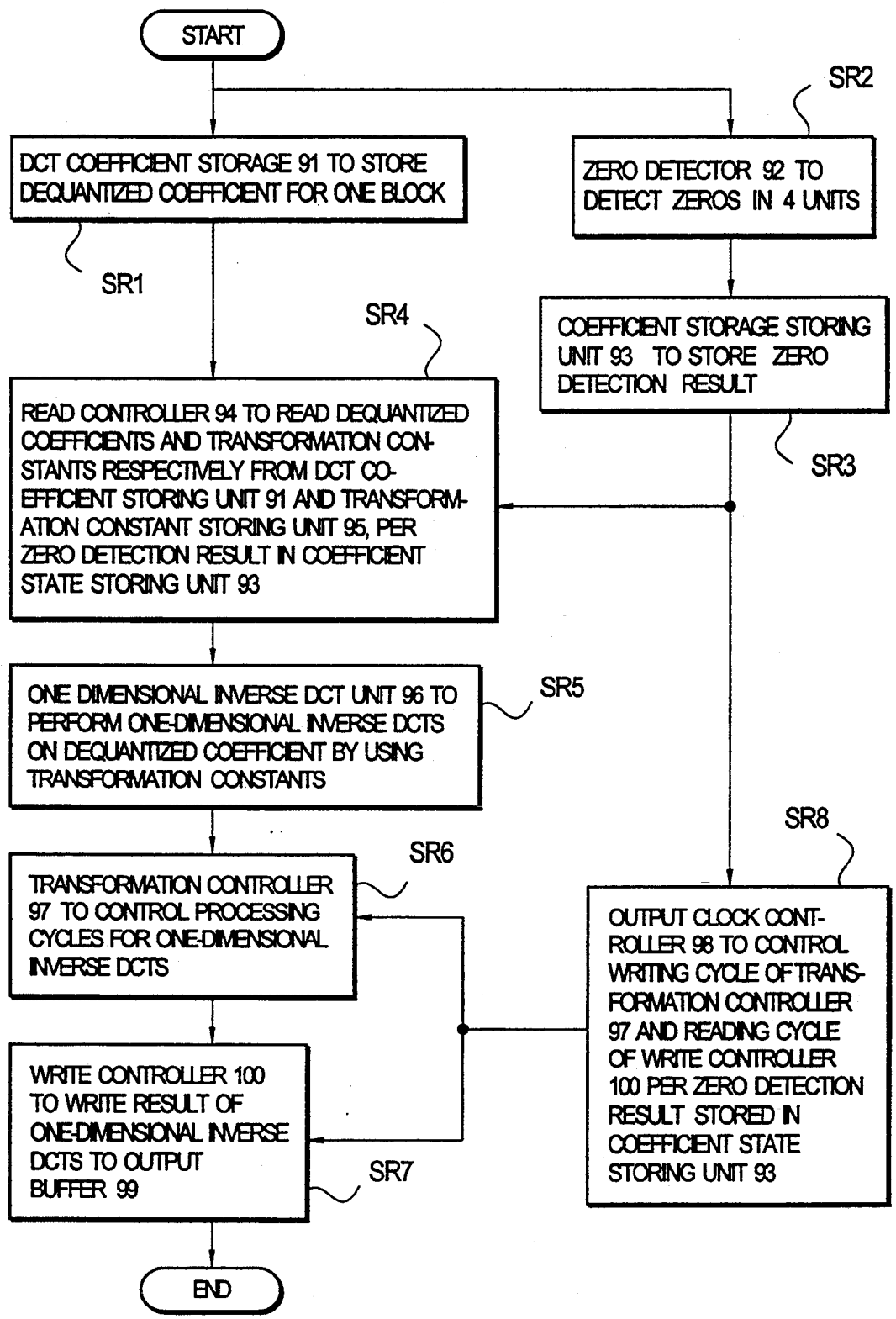

FIGS. 18A and 18B show, in further detail, the configuration of the inverse DCT unit 83 in the second embodiment, with the latter (a flowchart) summarizing the actions shown in the former (a block diagram).

FIGS. 18A is a block diagram of the N one-dimensional inverse DCT units 83-1 through 83-N shown in FIG. 17. The following explanation assumes a case in which an N×N block comprises eight (8)×eight (8) picture elements.

In FIG. 18A, dequantized DCT coefficients for one block reconstructed from coded data are inputted from a terminal 90 and written into a DCT coefficient storing unit 91. More specifically, the dequantized DCT coefficients for one block, e.g. as shown in FIG. 15, are written into DCT coefficient storing unit 91.

A zero detector 92 detects zero from input data stored in the DCT coefficient storing unit 91 in four (4) units, when the data are inputted. The following is a zero detecting results of the dequantized DCT coefficients shown in FIG. 15.

|                | First Half | Latter Half |
|----------------|------------|-------------|
| First Column   | non-zero   | non-zero    |
| Second Column  | zero       | zero        |
| Third Column   | non-zero   | zero        |
| Fourth Column  | zero       | zero        |
| Fifth Column   | zero       | zero        |
| Sixth Column   | non-zero   | zero        |
| Seventh Column | non-zero   | non-zero    |
| Eighth Column  | zero       | zero        |

Then, the result detected in the zero detector 92 is stored in the coefficient state storing unit 93, which is realized by flags as with the first embodiment described earlier.

When writing dequantized DCT coefficients of a block for a DCT coefficient storing unit 91 has completed, the read controller 94 outputs to a one-dimensional inverse DCT unit 96 non-zero value dequantized DCT coefficients from the DCT coefficient storing unit 91 and transform constants corresponding to the non-zero value dequantized DCT coefficients from a transform constant storing unit 95, according to the contents of the coefficient state storing unit 93.

FIG. 18B is a flowchart summarizing steps in which the above described actions shown in FIG. 18A are performed.

Step SR1: The DCT coefficient storing unit 91 stores dequantized DCT coefficients for one block, when the terminal 90 receives input data.

Step SR2: Concurrently with the storing action in step SR1, the zero detector 92 detects zeros in four (4) units.

Step SR3: The coefficient state storing unit 93 stores the result detected by the zero detector 92.

Step SR4: The read controller 94 reads dequantized DCT coefficients and transform constants respectively from the DCT coefficient storing unit 91 and the transform constant storing unit 95, per the result of detecting zeros in four (4) units stored in the coefficient state storing unit 93, after the dequantized DCT coefficients for a block are stored.

Step SR5: The one-dimensional inverse DCT unit 96 performs one-dimensional inverse DCTs on the dequantized DCT coefficients by using the transform constants.

Step SR6: A transform controller 97 controls executing the one-dimensional inverse DCTs.

Step SR7: A write controller 100 controls writing the result of one-dimensional inverse DCTs to an output buffer 99.

Step SR8: An output clock controller 98 controls the cycles for writing the transform results and reading dequantized DCT coefficients and transform constants, per the state signals indicating the zero detection results stored in the coefficient state storing unit 93. That is, the output clock controller 98 controls processing cycles governing the actions of the transform controller 97 and the write controller 100 respectively in states SR6 and SR7.

Figure 19:
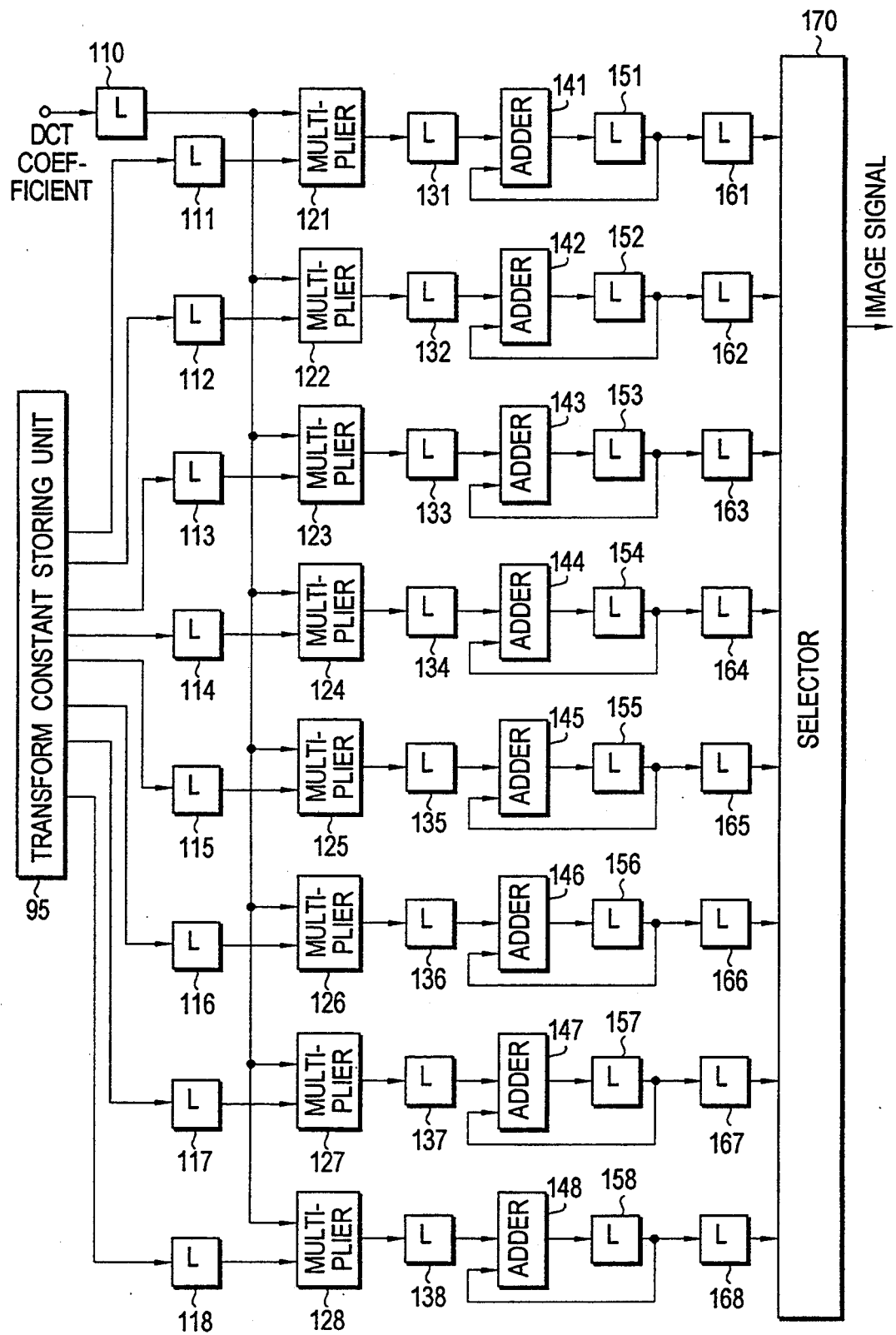
FIG. 19 is a detailed block diagram of a one-dimensional inverse DCT unit shown in FIG. 18.

FIG. 19 is a detailed block diagram of the one-dimensional inverse DCT unit shown in FIG. 18.

The one-dimensional inverse DCT unit 96 comprises a latch circuit 110 for sequentially latching inputted dequantized DCT coefficients, eight (8) latch circuits 111 through 118 for parallelly latching the eight (8) transform constants read from the transform constant storing unit 95, eight (8) multipliers 121 through 128 and eight (8) latch circuits 131 through 138 paired to form eight (8) multiplying parts, eight (8) adders 141 through 148 and eight (8) latch circuits 151 through 158 paired to form eight (8) adding parts, eight (8) latches 161 through 168 for latching the results of accumulations, and a selector 170 for reading the values in the latch circuits 161 through 168 and outputting them to the output buffer 99.

Here, the multipliers 121 through 128 multiply the dequantized DCT coefficients latched in the latch circuit 110 by transform constants latched in the latch circuits 111 through 118 and output the products to the latch circuits 131 through 138.

Further, the adders 141 through 148 accumulate the above products. More specifically, the adders 141 through 148 add the current accumulation of the products latched in the latch circuits 151 through 158 to the products being latched in the latch circuits 131 through 138, and latch the updated accumulation of products in the latch circuits 151 through 158.

To reiterate the processes, the multipliers 121 through 128 perform multiplications in respective product terms on the right side of equations 1 through 8, and the adders 141 through 148 add these product terms together.

FIG. 20 shows the operational steps in the one-dimensional inverse DCT unit shown in FIG. 19.

As shown in FIG. 20, the one-dimensional inverse DCT unit 96 performs inverse DCTs on the dequantized DCT coefficients shown in FIG. 15 in five-stage pipeline operational steps SP1 through SP5. They are:

SP1: input
SP2: multiplication
SP3: addition
SP4: buffering
SP5: output

More concretely, eight (8) dequantized DCT coefficients X11 through X81 in the first column are sequentially read from the DCT coefficient storing unit 91 and undergo inverse DCTs through the internal five-stage pipeline processings. The transform controller 97 has the one-dimensional inverse DCT unit 96 sequentially output the results [R41(1-1) through R48(1-8)] to the output buffer 99. At this time, the write controller 100 writes the transform results into the output buffer 99 per control signals from the output clock controller 98.

The output clock controller 98 controls the cycle for writing the transform results per the state signals indicating the zero detection results stored in the coefficient state storing unit 93.

Accordingly, upon completing the input of the eight (8) dequantized DCT coefficients (X11 through X81) in the first column, the four (4) non-zero value dequantized DCT coefficients (X13 through X43) in the first half of the third column are sequentially read from the DCT coefficient storing unit 91 and inputted to the one-dimensional inverse DCT unit 96 at the next timing, by skipping the input of the eight (8) dequantized DCT coefficients (X12 through X82) in the second column, which are all zero.

In this case, since the output clock controller 98 comes to know that only four dequantized DCT coefficients are inputted by the state control signal from the coefficient state storing unit 93, the output clock controller 98 controls the cycles for outputting the transform results R41(1-1) through R48(1-8) to be a half of the regular cycles governing the pipeline processings. Therefore, the eight (8) transform results [R41(1-1) through R48(1-8)] which have already undergone their operations are written into the output buffer 99 in four (4) cycles, a half of the regular eight (8) cycles.

Similar processings are repeated afterwards to perform one-dimensional inverse DCT operations without damaging the pipeline processings. That is, the numbers of dequantized DCT coefficients read from the DCT coefficient storing unit 91 are controlled per the state signals from the coefficient state storing unit 93, and the number of cycles for outputting transform results are controlled to be a half that of the regular cycles governing the pipeline processings when only four (4) dequantized DCT coefficients, a half of the regular eight (8), are inputted to the one-dimensional inverse DCT unit 96.

A two-time repetition of the above processes for a block results in a two-dimensional inverse DCT. By continuing two-dimensional inverse DCTs for all blocks in an image, its image is reconstructed.

Although the operational steps shown in FIG. 20 contain 0.5 cycle dummies to set the output timings in line with those for eight (8) inputs when four (4) dequantized DCT coefficients are inputted, these 0.5 cycle dummies are not necessary if the speed for reading outputs is doubled.

Figure 21:
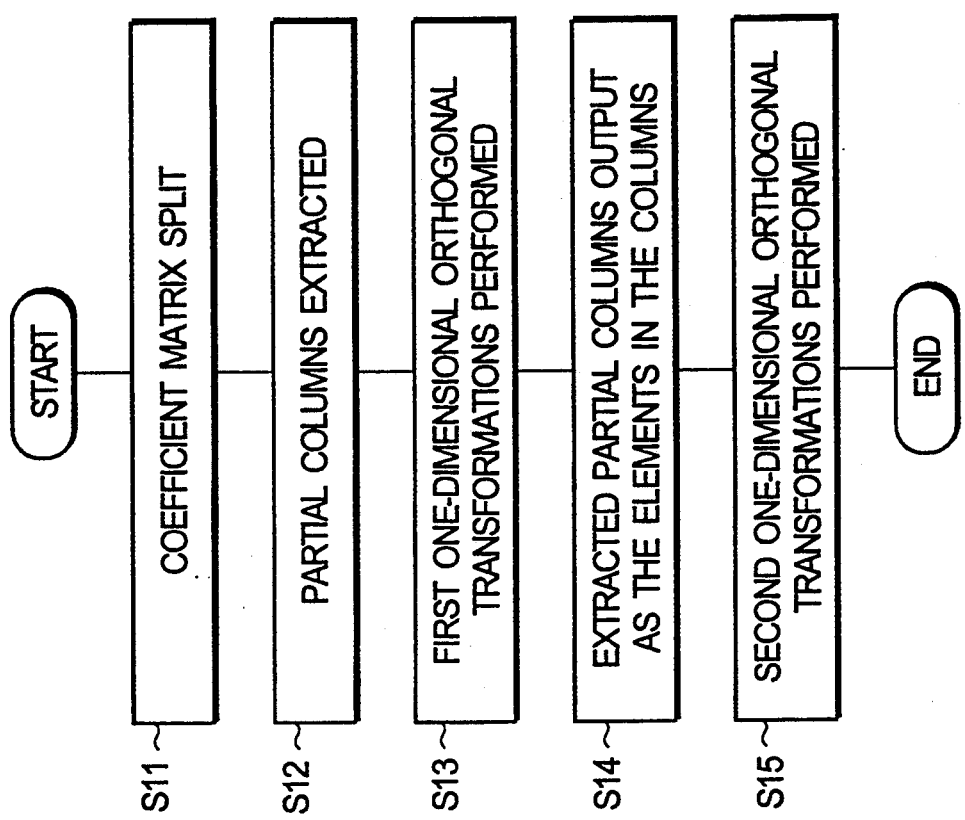
FIG. 21 illustrates the principle of an inverse DCT unit in a third embodiment of this invention.

FIG. 21 illustrates the principle of an inverse DCT unit in a third embodiment of this invention.

The third embodiment of this invention shown in FIG. 21 relates to an inverse orthogonal transform method for use in an image data reconstructing apparatus for reconstructing image data, where the results of performing two-dimensional orthogonal transforms on image data in the respective blocks each comprising a plurality of ($N \times N$; where N is a positive integer) picture elements divided from an original image are quantized and then coded, and the obtained input codes are decoded, dequantized and undergone two-dimensional inverse orthogonal transforms.

Columns in an $N \times N$ coefficient matrix are split into partial columns each containing a predetermined number of elements in step S11. Of those partial columns, those including a significant coefficient having a non-zero value are extracted in step S12. An operation equivalent to a one-dimensional orthogonal transform is performed for the respective elements in the extracted partial columns in step S13. The results of performing the operation for the extracted partial columns are outputted as the elements in the columns corresponding to the results of one-dimensional inverse transforms in step S14. The results of the first one-dimensional inverse transforms go through the second one-dimensional orthogonal transforms to obtain image data in step S15.

For instance, the results of the first one-dimensional inverse transforms in the respective columns are outputted as the corresponding row elements of the transposed matrix.

To summarize, partial columns including significant coefficients are extracted from among partial columns obtained by splitting whole columns of the dequantized coefficient matrix, operations are performed only for the respective elements in the extracted partial columns, and the results of the operations are outputted as the results of the first one-dimensional inverse orthogonal transforms corresponding to the columns to which these partial columns belong.

When the respective columns in the coefficient matrix are orthogonally transformed, the results of operations on insignificant coefficients having zero values contained in the columns do not affect the result of the orthogonal transform. Consequently, the results of the operation for the significant partial column included in the respective columns are equivalent to the results of orthogonally transforming the corresponding columns in the coefficient matrix. This enables the computing volume necessary for obtaining the results of one-dimensional inverse orthogonal transforms to be reduced.

The results of operations on the extracted partial columns are outputted as the elements of the transposed matrix obtained as a result of transposing the rows and columns of the matrix representing the result of the first one-dimensional inverse orthogonal transform. Hence, it becomes possible to eliminate the process for transposing the result of the first one-dimensional inverse orthogonal transform in performing the second one-dimensional inverse orthogonal transform.

Figure 22:
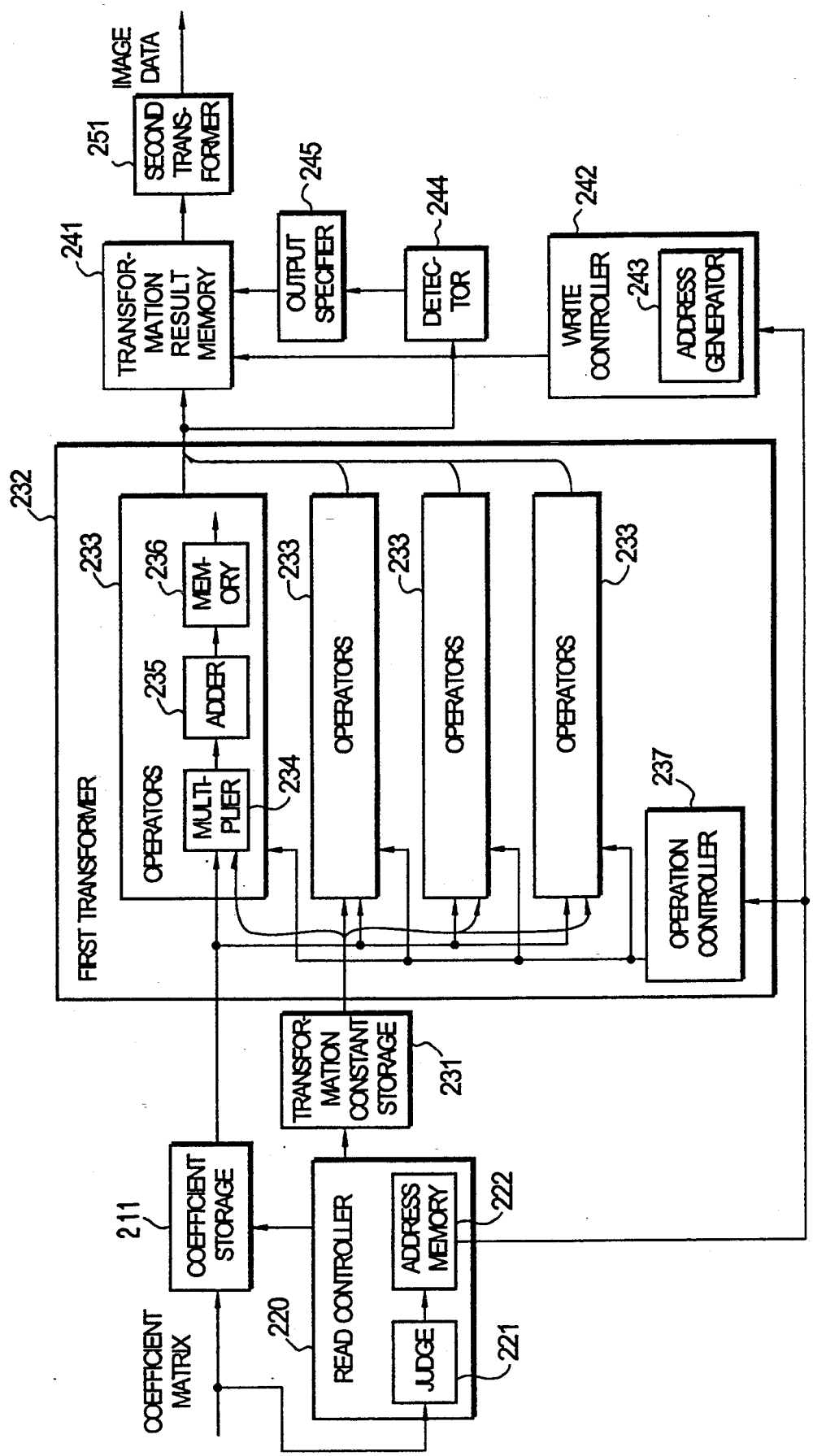
FIG. 22 shows, in further detail, the configuration of the inverse DCT unit in the third embodiment.

FIG. 22 shows, in further detail, the configuration of the inverse DCT unit in the third embodiment.

The third embodiment of this invention, shown in FIG. 22, relates to an inverse orthogonal transform circuit for use in an image data reconstructing apparatus for reconstructing image data, where the results of two-dimensional orthogonal transforms on image data in the respective blocks each comprising a plurality (N×N; where N is a positive integer) of picture elements divided from an original image are quantized and then coded, and the obtained input codes are decoded and dequantized, and undergo two-dimensional inverse orthogonal transforms.

A coefficient storing unit 211 stores the elements of the inputted coefficient matrix as an N×N matrix.

A read controller 220 comprises a judge 221 for judging whether or not respective partial columns split from the whole columns of the dequantized coefficient matrix inputted into the coefficient storing unit 211 are significant partial columns including significant coefficients and an address storing unit 222 for retaining the addresses of the coefficient storing unit 211 corresponding to the partial columns judged to be significant by the judge 221. The read controller 220 instructs the coefficient storing unit 211 to output the respective elements contained in the significant partial columns, based on the addresses retained in the address storing unit 222.

A transform constant storing unit 231 stores an N×N constant matrix corresponding to the respective elements of the coefficient matrix, and outputs transform constants included in the columns of the constant matrix corresponding to the elements of the dequantized coefficient matrix outputted from the coefficient storing unit 211.

A first transformer 232 performs operations equivalent to orthogonal transforms for the transform constants outputted from the transform constant storing unit 231 and respective elements of the inputted dequantized coefficient matrix. The first transformer 232 outputs the results of the operations as the results of the one-dimensional inverse transforms for the corresponding columns, when the corresponding operations are completed for all the significant partial columns included in the respective columns of the dequantized coefficient matrix.

A transform result storing unit 241 retains the outputs from the first transformer 232.

A write controller 242 specifies the storage space for the one-dimensional inverse transform result corresponding to the appropriate columns of the dequantized coefficient matrix in the transform result storing unit 241 per the addresses retained in the address storing unit 222.

A second transformer 251 performs the second one-dimensional inverse orthogonal transform based on the result of the first one-dimensional inverse orthogonal transform retained in the transform result storing unit 241.

The read controller 220, comprising the judge 221 and the address storing unit 222, extracts the significant partial columns in the dequantized coefficient matrix stored in the coefficient storing unit 211. The first transformer 232 performs operations equivalent to one-dimensional orthogonal transforms for the transform constants of a column outputted from the transform constant storing unit 231 and respective elements in the significant partial columns. Per the instruction from the write controller 242, the transform result storing unit 241 retains the outputs from the first transformer 232 as the one-dimensional inverse transform results corresponding to the columns of the dequantized coefficient matrix to which the appropriate significant partial columns belong. Then, the transform result storing unit 241 outputs its content to the second transformer 251.

Thus, by having the first transformer 232 perform operations only for the significant partial columns extracted by the read controller 220, one-dimensional inverse transform results, equivalent to those obtained by performing operations for all columns in the dequantized coefficient matrix, can be obtained. This enables the calculation volume to be reduced, thereby shortening the time required for performing one-dimensional inverse orthogonal transforms.

For instance, the coefficient storing unit 211 has a memory capacity for storing dequantized coefficient matrices corresponding to two blocks, and the first transformer 232 performs one-dimensional inverse transforms in parallel with inputting a dequantized coefficient matrix to the coefficient storing unit 211.

That is, in parallel with inputting a new dequantized coefficient matrix to the coefficient storing unit 211, the first transformer 232 can execute a one-dimensional orthogonal transform for another dequantized coefficient matrix already stored in the coefficient storing unit 211. As a result, the total processing time necessary for one-dimensional inverse transforms of dequantized coefficient matrices corresponding to a plurality of blocks can be reduced.

The judge 221 is configured to judge whether or not partial columns, e.g. comprising N/2 elements, are significant partial columns.

The transform constant storing unit 231 is configured to alternately output the N/2 transform constants in the first half of the corresponding column and the N/2 transform constants in the latter half of the corresponding column per the outputs of the respective elements in dequantized coefficient matrices.

The first transformer 232 is configured to have N/2 operators 233 corresponding to the N/2 transform constants simultaneously outputted from the transform constant storing unit 231.

Each of the N/2 operators 233 is configured to have a multiplier 234 for multiplying the inputted dequantized coefficient matrix elements by the respective transform constants alternately outputted from the transform constant storing unit 231 corresponding to the elements, an adder 235 for accumulating the respective products obtained by the multiplier 234, and a storing unit 236 for retaining the accumulation obtained by the adder 235.

The first transformer 232 is also configured to have an operation controller 237 for controlling the numbers of operations executed by the N/2 multipliers 234 and the N/2 adders 235, per the addresses, of the significant partial columns contained in the respective columns of the dequantized coefficient matrix, stored in the address storing unit 222.

As in this example where partial columns have N/2 elements, the transform constant storing unit 231 separately outputs the first N/2 elements and the second elements in the appropriate column of the constant matrix and inputs them to the N/2 operators 233 in the first transformer 232. The operations of an operator 233 are divided into multiplications by its multiplier 234, accumulations by its adder 235, and storage by its storing unit 236.

Here, since an operator 233 can independently perform each of the above divided operations, receipt of the transform constants and the elements in the dequantized coefficient matrix, and output of the operation result, these actions can be performed in pipelines to expedite the process. Also, the circuit is made smaller, because the first transformer 232 is configured by the N/2 operators 233.

The operation controller 237 controls the number of operations executed by the multipliers 234 and the adders 235, thereby producing the one-dimensional inverse transform results by the number of operations corresponding to the number of significant partial columns in respective columns of the coefficient matrix.

The write controller 242 is configured to have an address generator 243 for generating addresses in the transform result storing unit 241 corresponding to the appropriate rows of the transposed matrix obtained by transposing a matrix formed as a one-dimensional inverse transform result, in correspondence with the operation results obtained by the first transformer 232.

By specifying the addresses generated by the address generator 243 as the storage space in the first transformer 232, the transform result storing unit 241 stores the transposed matrix obtained by transposing a matrix representing the one-dimensional inverse transform result. Hence, the second transformer 251 does not require a processing to transpose the one-dimensional inverse transform result.

A detector 244 detects significant coefficients having non-zero values from respective elements of the one-dimensional inverse transform result inputted to the transform result storing unit 241.

An output specifier 245 specifies the output of the partial columns including significant coefficients from the respective columns of the matrix representing the one-dimensional inverse transform result.

The second transformer 251 performs the second one-dimensional orthogonal transforms for the partial columns outputted from the transform result storing unit 241.

Inputs to the second transformer 251 of significant partial columns including significant coefficients extracted from one dimensional inverse transform results retained in the transform result storing unit 241 by the detector 244 and the output specifier 245 enable the second transformer 251 to reduce its calculation volume.

Figure 23:
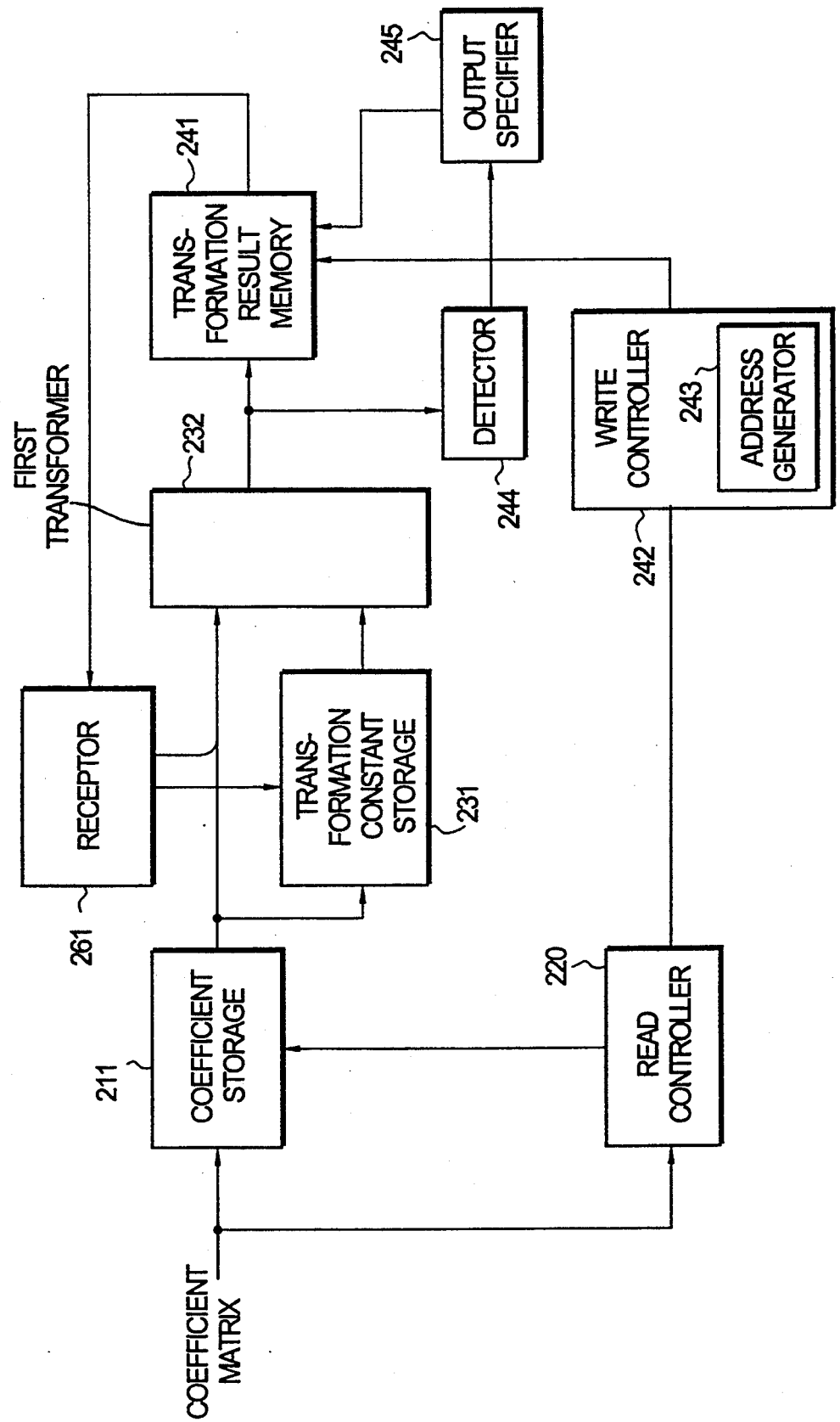
FIG. 23 illustrates the principle of an inverse DCT unit in a fourth embodiment of this invention.

FIG. 23 illustrates the principle of an inverse DCT unit in a fourth embodiment of this invention.

The configuration of the fourth embodiment of this invention shown in FIG. 23 includes a receptor 261 for inputting the one-dimensional inverse transform result stored in the transform result storing unit 241 to the first transformer 232 and for instructing the transform constant storing unit 231 to output corresponding transform constants, in lieu of the second transformer 251 used in the third embodiment shown in FIG. 22.

By having the receptor 261 input to the first transformer 232 the one-dimensional inverse transform result stored in the transform result storing unit 241, and by having the first transformer 232 again perform operations equivalent to an orthogonal transform, the second transformer 251 is done away with, thereby making the circuit more compact.

In addition, the configuration of the fifth embodiment shown in FIG. 23 further includes the detector 244 and the output specifier 245, as with the third embodiment shown in FIG. 22.

The detector 244 detects significant coefficients having non-zero values from respective elements of the one-dimensional inverse transform result inputted to the transform result storing unit 241.

The output specifier 245 specifies the output of the partial columns, including significant coefficients, from respective columns of the matrix representing the one-dimensional inverse transform result.

The receptor 261 re-inputs the partial columns outputted from the transform result storing unit 241 to the first transformer 232.

Inputs to the first transformer 232 of significant partial columns including significant coefficients extracted from one-dimensional inverse transform results retained in the transform result storing unit 241 by the detector 244 and the output specifier 245 enable the entire circuit to be made smaller and the first transformer 232 to reduce its calculation volume for the second one-dimensional orthogonal transforms.

The third and fourth embodiments of this invention are explained below in further detail.

Figure 24:
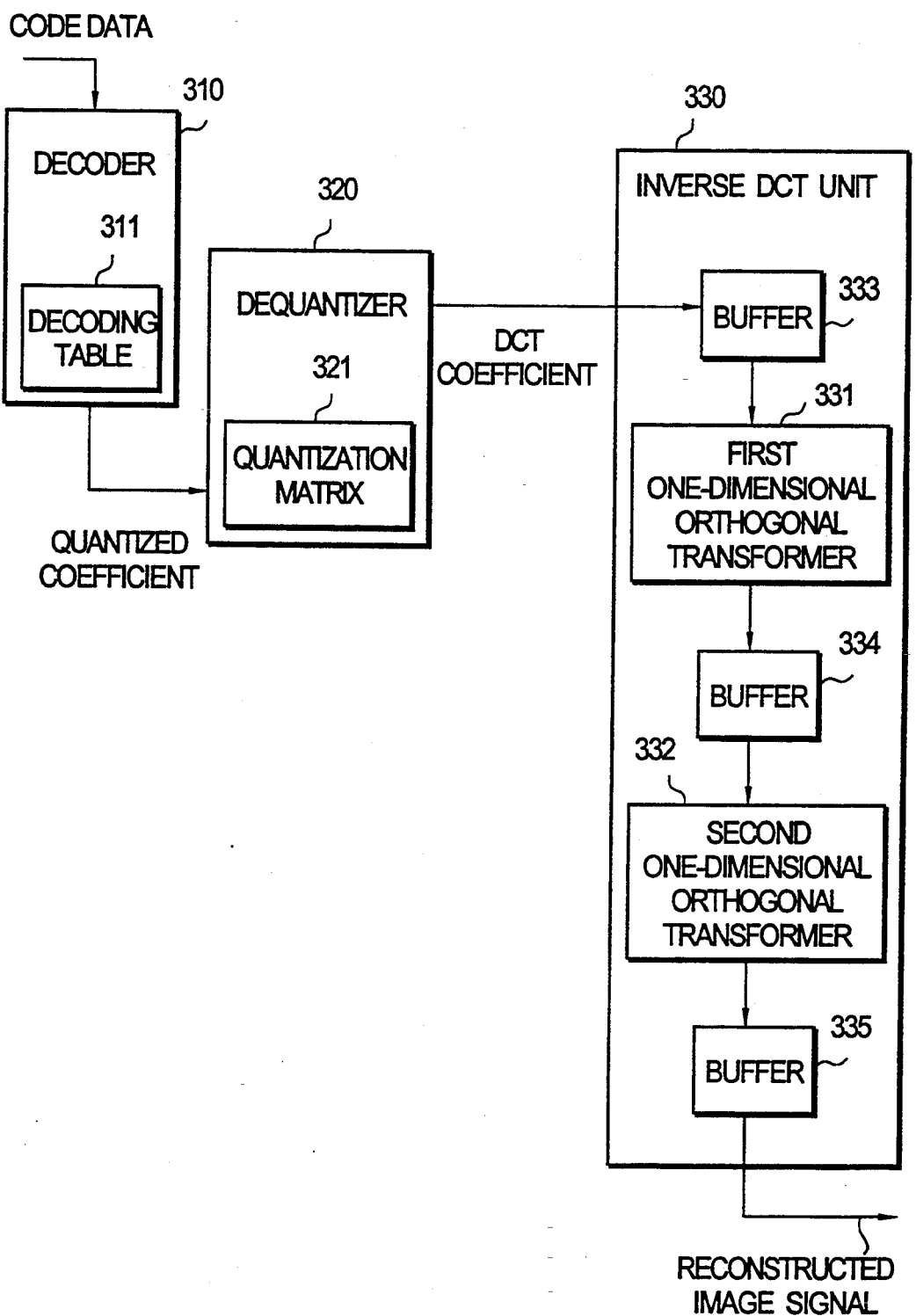
FIG. 24 shows the configuration of an embodiment of an image data reconstructing apparatus using an inverse DCT unit.

FIG. 24 shows the configuration of an embodiment of an image data reconstructing apparatus using an inverse DCT unit.

Figure 25:
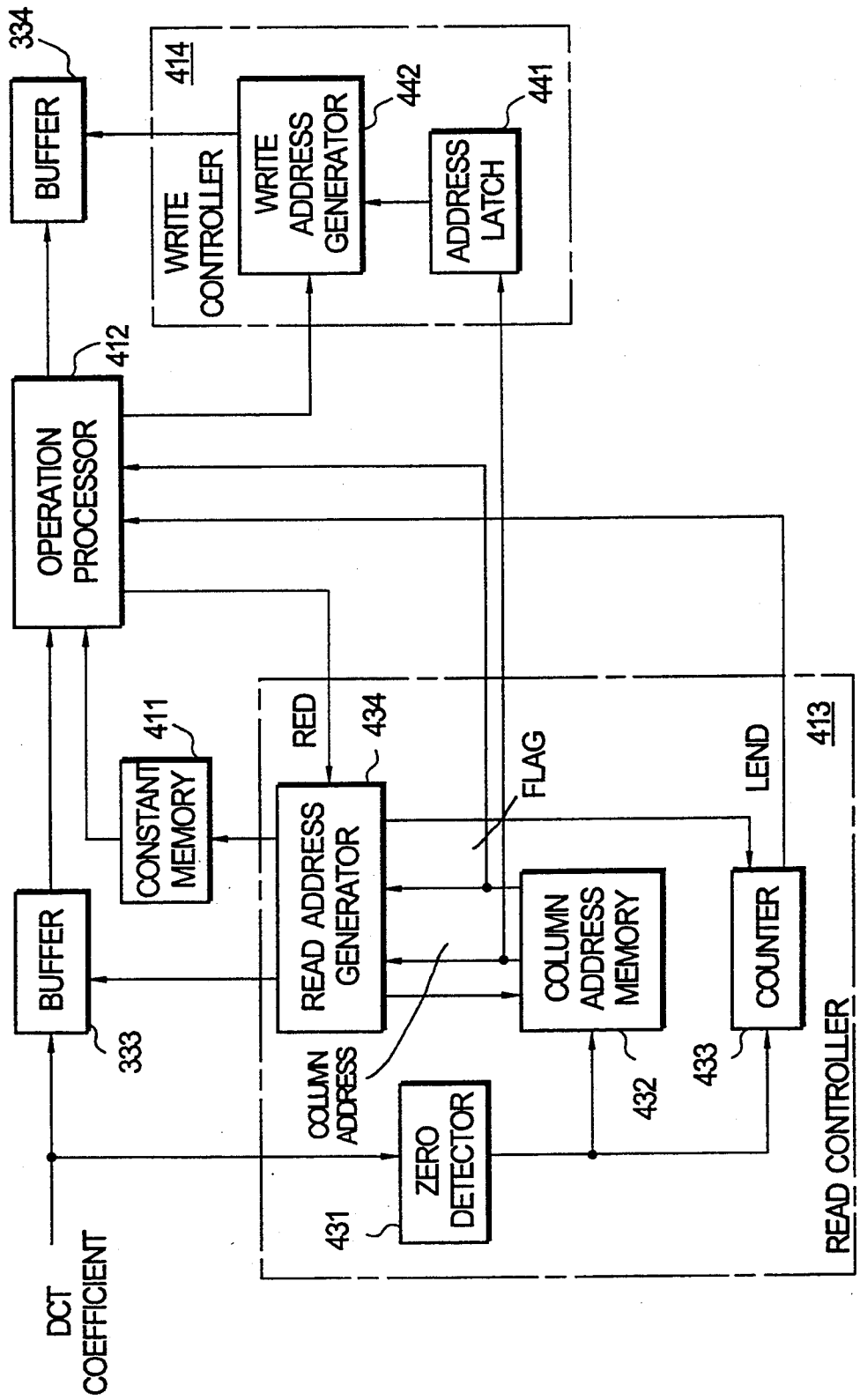
FIG. 25 shows the configuration of an embodiment of a first one-dimensional orthogonal transform part in an embodiment of an inverse DCT unit.

FIG. 25 shows the configuration of an embodiment of a first one-dimensional orthogonal transform part in an embodiment of an inverse DCT unit.

Figure 26:
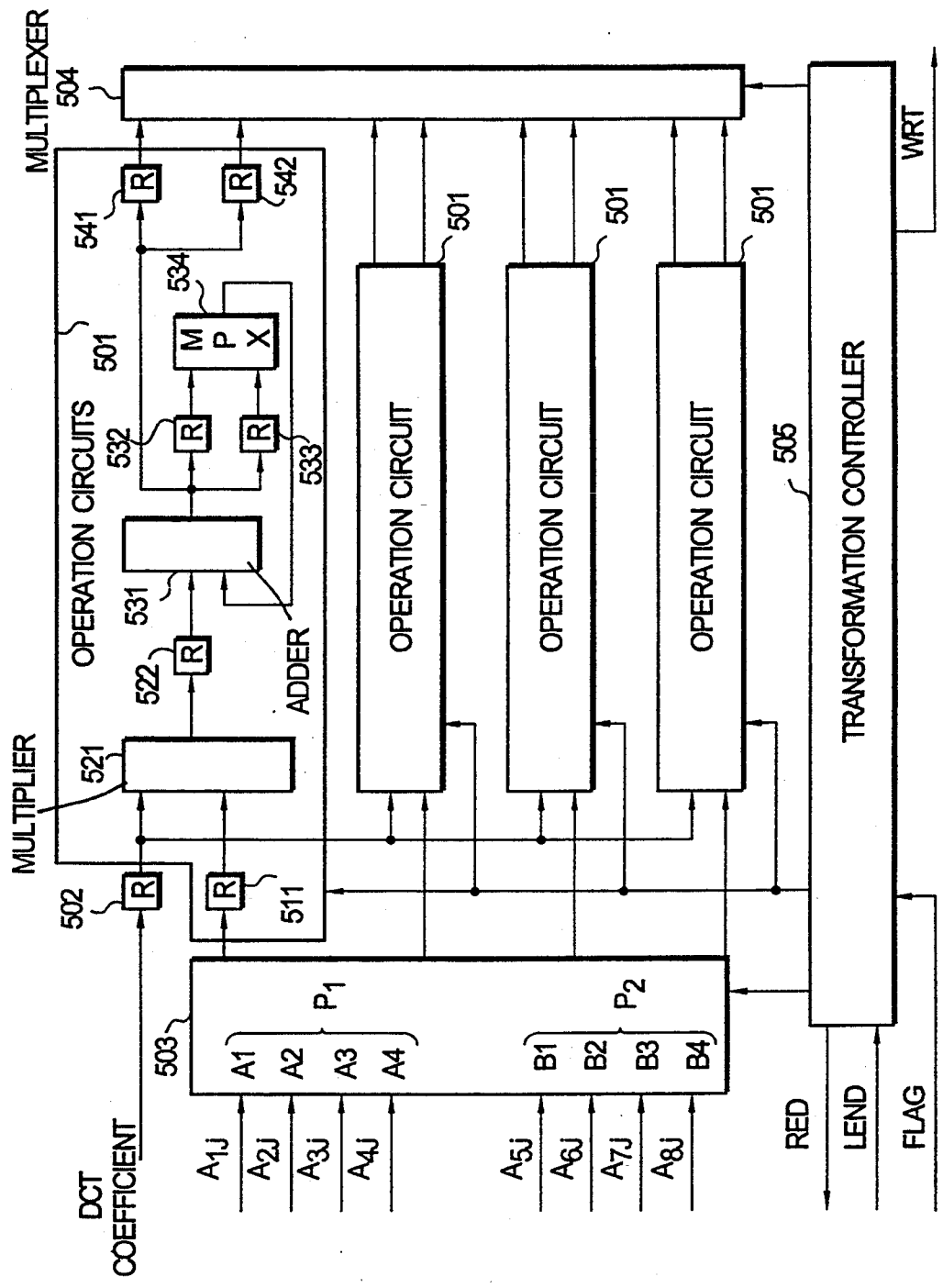
FIG. 26 shows in detail the configuration of the operation processor illustrated in FIG. 25.

FIG. 26 shows in detail the configuration of the operation processor illustrated in FIG. 25.

Figure 27:
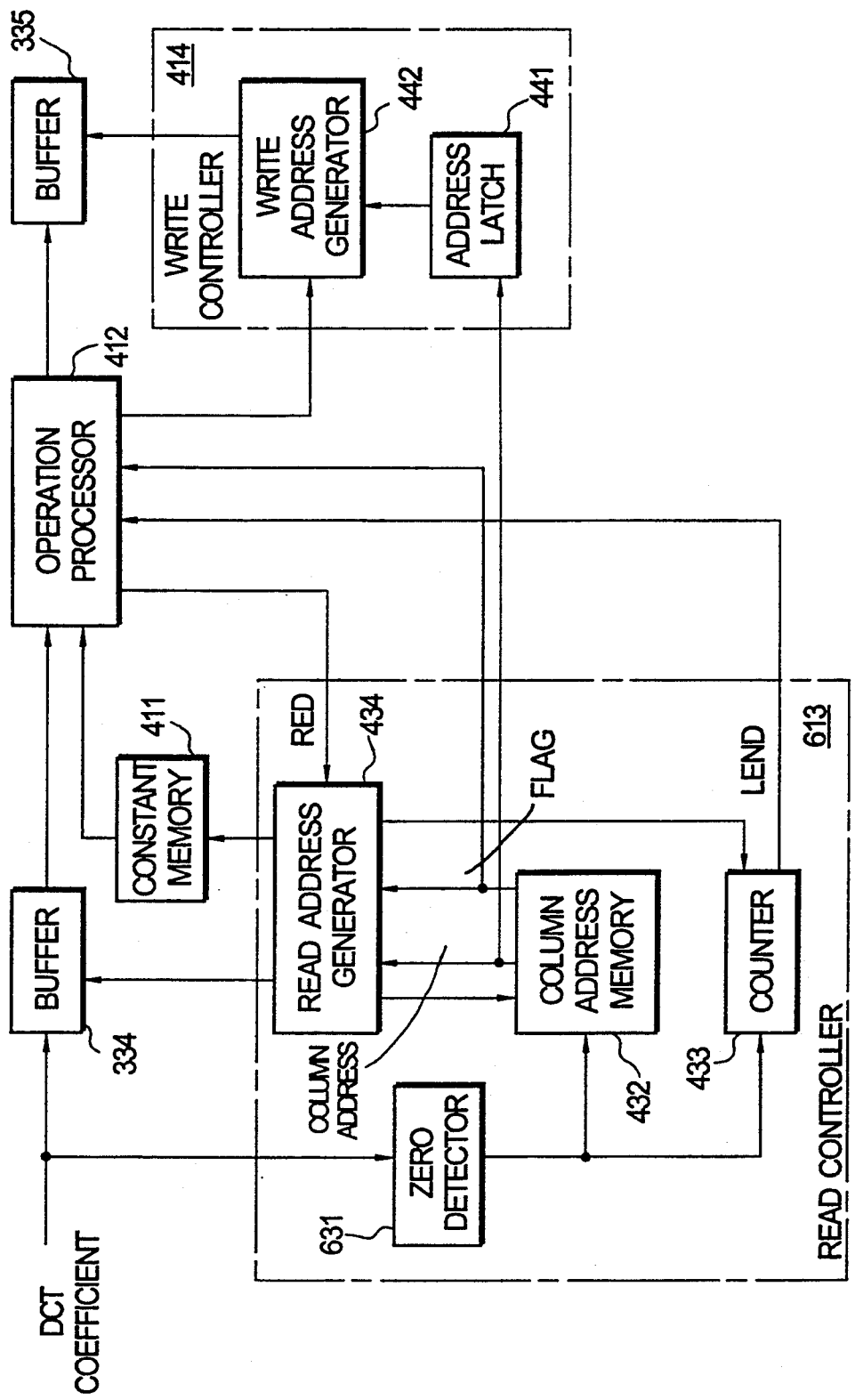
FIG. 27 shows the configuration of an embodiment of a second one-dimensional orthogonal transform part in an embodiment of an inverse DCT unit.

FIG. 27 shows the configuration of an embodiment of a second one-dimensional orthogonal transform part in an embodiment of an inverse DCT unit.

Figure 28:
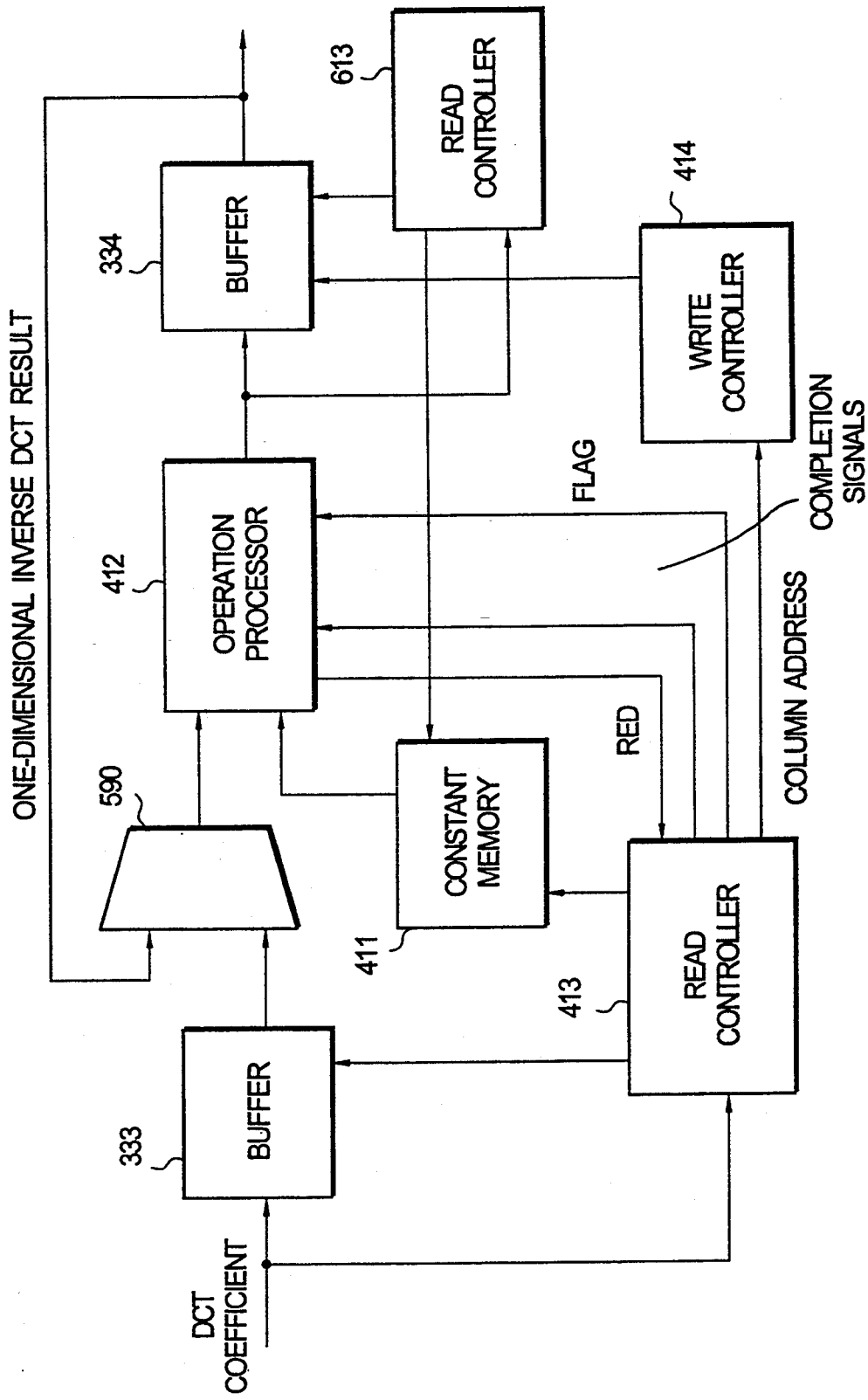
FIG. 28 shows the configuration of another embodiment of an inverse DCT unit.

FIG. 28 shows the configuration of another embodiment of an inverse DCT unit.

Here, the relations between FIGS. 21, 22 and 23 and FIGS. 24, 25, 26, 27 and 28 are explained, first.

The coefficient storing unit 211 corresponds to a buffer 333.

The read controller 220 corresponds to a read controller 413.

The judge 221 corresponds to a zero detector 431.

The address storing unit 222 corresponds to a column address storing unit 432.

The transform constant storing unit 231 corresponds to a constant storing unit 411.

The first transformer 232 corresponds to an operation processor 412.

The operators 233 correspond to operation circuits 501.

The multipliers 234 correspond to multipliers 521.

The adders 235 correspond to adders 531, registers 532 and 533 and multiplexers 534.

The memories 236 correspond to registers 541 and 542.

The operation controller 237 corresponds to a transform controller 505.

The transform result storing unit 241 corresponds to a buffer 334.

The write controller 242 corresponds to a write controller 414.

The address generator 243 corresponds to an address latch 441 and a write address generator 442.

The detector 244 corresponds to a zero detector 631 in a read controller 613.

The output specifier 245 corresponds to the read controller 613.

The second transformer 251 corresponds to an orthogonal transformer 332.

The receptor 261 corresponds to a selector 590 and the read controller 613.

Assuming these interrelations, the configurations and actions of the third and fourth embodiments are explained in further detail.

The image data reconstructing apparatus shown in FIG. 24 comprises a decoder 310 equipped with a decoding table 311, a dequantizer 320 equipped with a quantization matrix 321, an inverse DCT unit equipped with a first one-dimensional orthogonal transformer 331 and a second one-dimensional orthogonal transformer 332. This image data reconstructing apparatus reconstructs image data for respective blocks, each block comprising 8×8 picture elements, based on inputted coded data.

The decoder 310 decodes coded data based on the interrelations between coded data and decoded data stored in the decoding table 311, reconstructs quantized coefficients in an 8×8 matrix and inputs them to an dequantizer 320.

The dequantizer 320 reconstructs DCT coefficients by dequantizing respective elements in the quantized coefficients and sequentially inputs the respective elements of the DCT coefficients into the inverse DCT unit 330. Then, the dequantizer 320 sequentially outputs elements in columns of the dequantized DCT coefficients it reconstructs to the inverse DCT unit 330, starting from the first column and the first row.

The first one-dimensional orthogonal transformer 331 in the inverse DCT unit 330 receives the above dequantized DCT coefficients. Also, the transform results obtained by the first one-dimensional orthogonal transformer 331 are inputted into the second one-dimensional orthogonal transformer 332 through the buffer 334. The transform results obtained by the second one-dimensional orthogonal transformer 332 are outputted as image data of a block through the buffer 335.

The above described buffer 333 is configured to store respective elements of the dequantized DCT coefficients in the addresses specified by the column numbers and the row numbers.

Hereafter, an address indicating the region storing elements in a column of a matrix is referred to as a column address, and an address indicating the region storing elements in a row of a matrix is referred to as a row address.

FIG. 25 shows the configuration of the first one-dimensional orthogonal transformer 331.

As shown in FIG. 25, the constant storing unit 411 stores the above described transform constant, and the operation processor 412 receives respective elements of the dequantized DCT coefficients read from the buffer 333 and the corresponding elements of the transform constants read from the constant storing unit 411. The zero detector 431, the column address storing unit 432, the counter 433 and the read address generator 434 configure the read controller 413, which controls reading data from the buffer 333 and the constant storing unit 411. The address latch 441 and the write address generator 442 configure a write controller 414, which controls the writing of outputs from the operation processor 412 to the buffer 334. The read controller 413 and the write controller 414 are configured to operate per the instructions from the operation processor 412.

The read controller 413 and the zero detector 431 operate in parallel with the inputs of the respective elements of the dequantized DCT coefficients into the buffer 333. The dequantized DCT coefficients in the respective columns are split into the first half corresponding to those in the first through fourth rows and the latter half corresponding to those in the fifth through eighth rows, so that zero detections are performed separately for the first half and the latter half. The zero detector 431 outputs one bit of information indicating whether or not at least one significant coefficient is detected to be included in a column and another bit of information indicating whether or not a significant coefficient is included in the latter half of a column. This is similar to the process shown in FIG. 16, where flags A and B are indicated by two bits. For instance, when all elements both in the first half and the latter half of a column are insignificant coefficients, "01" is outputted as the detection result. When all elements in the latter half of a column are insignificant coefficients, "11" is outputted as the detection result. In all other cases, "10" is outputted.

The result detected by the zero detector 431 is inputted to the column address storing unit 432. The column address storing unit 432 retains the column addresses in the buffer 333 corresponding to dequantized DCT coefficient columns having at least one significant coefficient and the flag indicating whether or not all elements in the latter halves of the columns corresponding to the column addresses in the buffer 333 are insignificant coefficients. For instance, the column address storing unit 432 retains the column address indicating the region of the buffer 333 which stores the corresponding dequantized DCT coefficient column and the second bit of the detection result is retained as the flag, upon receipt of a logical "1" for the first bit of the detection result.

The counter 433 receives the above described outputs from the zero detector 431 and counts the number of dequantized DCT coefficient columns having at least one significant coefficient. For instance, the counter 433 adds the counter value per the first bit of the above described detection results.

Thus, in parallel with inputting dequantized DCT coefficients of a block to the buffer 333, the number of the columns including significant coefficients are counted, and the column addresses and flags corresponding to the columns are retained.

FIG. 32 shows dequantized DCT coefficients.

For instance, by having the decoder 310 decode the coded data corresponding to the quantized coefficients shown in FIG. 6A and having the dequantizer 320 dequantize them, dequantized DCT coefficients such as those shown in FIG. 32 are reconstructed.

When the buffer 333 sequentially receives respective elements of the dequantized DCT coefficients, the zero detector 431 described above outputs detection results "10" for the first column, "11" for the second column, and "01" for the third through eighth columns. In this case, as shown in FIG. 29, the column address storing unit 432 retains column address $C_1$ corresponding to the first column and column address $C_2$ corresponding to the second column, and the counter 433 has a counter value 2.

When the buffer 333 completes storing the dequantized DCT coefficients of a block, the operation processor 412 starts its operation, outputs a data request signal RED and instructs the read controller 413 to begin reading.

In response, the read address generator 434 in the read controller 413 reads the first column address and its flag retained in the column address storing unit 432, and inputs the flag to the above described operation processor 412.

Upon receiving the data request signal RED, the read address generator 434 sequentially generates row addresses for specifying respective rows in the buffer 333, and outputs the column addresses read from the column address storing unit 432 by adding these row addresses, which the buffer 333 receives. In response, the buffer 333 sequentially outputs respective elements in the corresponding dequantized DCT coefficient column stored in the buffer 333 and inputs them to the operation processor 412.

At this time, the read address generator 434 sequentially generates column addresses for specifying respective columns of the transform constants stored in the constant storing unit 411, and inputs them to the constant storing unit 411 in synchronization with the data request signal RED. This causes respective columns of the transform constants stored in the constant storing unit 411 to be read sequentially and vectors comprising elements of the column (hereafter referred to as column elements) to be inputted to the operation processor 412.

Thus, per the data request signal RED, elements of the dequantized DCT coefficient columns corresponding to the column addresses are read one by one from the buffer 333, and respective columns of the transform constants are read from the constant storing unit 411 sequentially from the first column.

When the flag read from the column address storing unit 432 is a logical "1", the read address generator 434 ceases to generate read addresses for the corresponding dequantized DCT coefficient columns after repeating the above processes four (4) times. Therefore, in this case, only four (4) elements in the first half of the corresponding dequantized DCT coefficient column are read from the buffer 333 and are inputted to the operation processor 412 together with the corresponding column elements of the transform constants.

Meanwhile, when the flag indicates a logical "0", the read address generator 434 ceases reading the corresponding dequantized DCT coefficient columns after repeating the above processes eight (8) times. Accordingly, in this case, all eight (8) elements in the corresponding dequantized DCT coefficient column are read from the buffer 333 and inputted to the operation processor 412 together with the corresponding column elements of the transform constants.

Thus, after the corresponding dequantized DCT coefficient columns are read, the read address generator 434 reads the next column address and its flag from the column address storing unit 432 and similarly generates read addresses for the buffer 333 and the constant storing unit 311.

The counter 433 decreases the counter value each time a column address is read, and outputs a completion signal LEND when the counter value is 0, thereby notifying the operation processor 412 of the completion of reading one block.

Therefore, the operation processor 412 receives only the elements of the columns including significant coefficients among dequantized DCT coefficients for a block.

FIG. 26 shows in detail a configuration of the operation processor 412 described earlier.

In FIG. 26, each of four (4) operation circuits 501 comprises a register 511, a multiplier 521, a register 522, an adder 531, registers 532 and 533, a multiplexer 534, and registers 541 and 542. The registers 511, 522, 532, 532, 541 and 542 are indicated by R signs.

Respective dequantized DCT coefficient elements read from the buffer 333 are supplied to the four (4) operation circuits 501 through a register 502. The four (4) elements $A_{1j}$ through $A_{4j}$ in the first half of the column elements comprising elements of a transform constant column read from the constant storing unit 411 are inputted to port P1 (A1 through A4) of the selector 503, while the four (4) elements $A_{5j}$ through $A_{8j}$ in the latter half are inputted to port P2 (B1 through B4). The selector 503 selects input to either port P1 or port P2. The selected elements are inputted to the respective registers 511 of the four (4) operation circuits 501.

The outputs from the respective registers 541 and 542 of the operation circuits 501 are supplied to the multiplexer 504, whose output is inputted to the buffer 334 as the output from the operation processor 412.

The respective ones of the operation circuits 501, the selector 503 and the multiplexer 504 are configured to operate per the instructions from the transform controller 505.

Hereafter, actions are referred to by their stages.

Stage ST1: Inputting corresponding elements of the transform constants into the four (4) registers 511 in the four (4) operation circuits 501.

Stage ST2: Multiplications by the four (4) multipliers 521 in the four (4) operation circuits 501.

Stage ST3: Accumulations by the four (4) adders 531, the four (4) registers 532 and the four registers 533 in the four (4) operation circuits 501.

Stage ST4: Storages of the results of the accumulations in the four (4) registers 541 and the four (4) registers 542 in the four (4) operation circuits 501.

Stage ST5: Outputting from the multiplexer 504 by selecting either the four (4) registers 541 or the four (4) registers 542 in the four (4) operation circuits 501.

FIG. 30 is a flowchart of operations of the operation processor shown in the fourth embodiment.

Here, when the operation processor 412 starts its operation, the contents of the four (4) registers 532 and the four (4) registers 533 in the four (4) operation circuits 501 as well as the content of the buffer 334 are all cleared.

Step S21: The transform controller 505 outputs the data request signal RED and receives dequantized DCT coefficient elements and column elements of transform constants corresponding to the dequantized DCT coefficient elements.

Step S22: The transform controller 505 instructs the selector 503 to select port P1 in parallel with Step S21, which causes the four (4) transform constants in the first half of the column elements to be inputted to the respective operation circuits 501.

Step S23: The multipliers 521 in the operation circuits 501 multiply the four transform constants retained in the corresponding registers 511 by the dequantized DCT coefficients retained in the register 502, and store the products in the corresponding registers 522.

In the above manner, the j-th element $d_{ji}$ in the i-th column of the dequantized DCT coefficient matrix is multiplied respectively by the four (4) elements $A_{1j}$ through $A_{4j}$ in the first half of the j-th column of the transform constant matrix. Thus, the j-th terms of equations (1) through (4) are calculated.

Step S24: The transform controller 505 instructs the four (4) multiplexers 534 in the respective four (4) operation circuits 501 to select the registers 532. This causes the four (4) adders 531 in the respective operation circuits 501 to add the products stored in the registers 522 to the contents of the registers 532 and the registers 532 to store the sums.

Step S25: The transform controller 505 instructs the selector 503 to select port P2. This causes the four transform constants in the latter half of the column elements to be inputted to the operation circuits 501.

Step S26: The multipliers 521 in the respective operation circuits 501 perform multiplications similar to those in step S23.

In the above manner, the j-th element $d_{ji}$ in the i-th column of the dequantized DCT coefficient matrix is multiplied respectively by the four (4) elements $A_{5j}$ through $A_{8j}$ in the latter half of the j-th column of the transform constant matrix. Thus, the j-th terms of equations (5) through (8) are calculated.

Step S27: The transform controller 505 instructs the four (4) multiplexers 534 in the respective four (4) operation circuits 501 to select the registers 533. This causes the four (4) adders 531 in the respective operation circuits 501 to add the products stored in the registers 522 to the contents of the registers 533 and the registers 533 to store the sums.

Step S28: The transform controller 505 judges whether or not the flag inputted from the read controller 413 is a logical "1". The process proceeds to step S29 if the judgment in step S28 is affirmative (YES).

Step S29: The transform controller 505 judges whether or not steps S21 through S28 described above are performed four (4) times, i.e. for a half of the number of rows in a block.

Meanwhile, the process proceeds to step S30 if the judgment in step S28 is negative (NO).

Step S30: The transform controller 505 judges whether or not steps S21 through S28 described above are performed eight (8) times, i.e. for the number of rows in a block.

If either step S29 or S30 makes a negative judgment, the process reverts to step S21. Thus, the next dequantized DCT coefficient elements and the corresponding column elements of the transform constants corresponding to the next dequantized DCT coefficient elements are read, so that the above processes are repeated.

Thus, the terms in equations (1) through (4) and the terms in equations (5) through (8) are alternately calculated, which are then alternately accumulated.

Meanwhile, the process proceeds to step S31 if the judgment in step S29 or S30 is affirmative (YES).

Step S31: The transform controller 505 stores the contents of the registers 532 and 533 in the corresponding registers 541 and 542.

Step S32: The transform controller 505 instructs the registers 541 in the operation circuits 501 to sequentially output their contents. This causes the multiplexer 504 to output operation results corresponding to equations (1) through (4). The transform controller 505 then instructs the registers 542 in the operation circuits 501 to sequentially output their contents similarly. This causes the multiplexer 504 to output operation results corresponding to equations (5) through (8).

When the flag indicates logical "1", the dequantized DCT coefficients in the latter half of the corresponding column are all insignificant coefficients. Hence, by repeating the above steps S21 through S27 four (4) times and by performing operations only for the elements in the first half of the column, the result of performing a one-dimensional inverse DCT on the dequantized DCT coefficient column is obtained.

Meanwhile, if the flag is logical "0", by repeating steps S21 through S27 eight (8) times, operations equivalent to equations 1 through 8 are performed.

Consequently, in case of affirmative judgments in the above steps S29 and S30, the contents of the registers 532 and 533 represent the values of equations (1) through (8), and the results of performing one-dimensional inverse DCTs on the i-th dequantized DCT coefficient column are sequentially outputted in step S32. Also at this time, the transform controller 505 instructs a write controller 414 to write the transform result in the buffer 334 by outputting a write control signal WRT in synchronization with outputting the above transform results.

Step S33: Next, the transform controller 505 judges whether or not the completion signal LEND is logical "1".

If the transform controller 505 judges negatively (NO) in step S33, the process proceeds to step S34.

Step S34: The transform controller 505 sets the initial value "0" in the registers 532 and 533 in the respective operation circuits 501. Then, the process reverts to step S21 to start the transforms for the next column.

If the transform controller 505 judges affirmatively (YES) in step S33, the transforms for one block are considered to be completed and the processes end.

Here, the respective operations in stages ST1 through ST5 can be executed mutually independently. Therefore, the processes in steps S22, S23 and S24, the processes in steps S25, S26 and S27 and the processes in steps S31 and S32 are controlled in a pipeline.

FIG. 31 illustrates a pipeline performance of stages ST1 through ST5 of one-dimensional inverse DCTs on dequantized DCT coefficients shown in FIG. 32.

In FIG. 31, the figures in the left end column indicates the pipeline step number. A sign R01 indicates a register 501. Signs R11 through R14 indicate the four (4) registers 511 in the respective four (4) operation circuits 501. Signs R21 through R24 indicate the four (4) registers 522 in the respective four (4) operation circuits 501. Similarly, signs R31 through R34 indicate the four (4) registers 532 in the respective four (4) operation circuits 501, signs R35 through R38 indicate the four (4) registers 533 in the respective four (4) operation circuits 501, signs R41 through R44 indicate the four (4) registers 541 in the respective four (4) operation circuits 501, and signs R45 through R48 indicate the four (4) registers 542 in the respective four (4) operation circuits 501.

As shown in the column corresponding to stage ST1 in FIG. 31, respective elements of the dequantized DCT coefficients are inputted and respective elements of the first half of the column corresponding to the transform constants are inputted in odd-numbered steps, while respective elements in the latter half of the same column corresponding to the transform constants are inputted in even-numbered steps.

In and after the second step, as shown in the column corresponding to stage ST2, in parallel with the actions in stage ST1, the multiplications in step S23 and the multiplications in step S26 are performed alternately.

In and after the third step, as shown in the column corresponding to stage ST3, in parallel with the actions in stages ST1 and ST2, additions in step S24 are performed in odd-numbered steps and additions in step S27 are performed in even-numbered steps.

FIG. 29 illustrates relations between column addresses and flags.

As shown in FIG. 29, since the flag corresponding to the first column of the dequantized DCT coefficients indicates a logical "0", steps S21 through S27 described above are repeated for the number of rows in a block, thereby inputting all eight (8) elements in the first column.

In this case, the multiplication and addition for the eighth dequantized DCT coefficient element in the first column are performed in parallel with the inputs of transform constants and dequantized DCT coefficient elements in the second column. In the seventeenth and eighteenth steps, one-dimensional inverse transform results are inputted and set in the registers 541 and 542 in the respective operation circuits 501. (Step S31: Refer to stage ST4 in FIG. 31.)

In the eighteenth through twenty-fifth steps, outputs in step S32 are processed, and the one-dimensional inverse DCT results ($Y_{11}$ through $Y_{18}$) are sequentially outputted. (Refer to stage ST5 in FIG. 31.)

Similarly, the one-dimensional inverse DCTs are performed on the second column of the dequantized DCT coefficients by performing actions in stage ST4 in the twenty-fifth and twenty-sixth steps and actions in stage ST5 in the twenty-sixth through thirty-third steps.

The following is a description of a method for storing in the buffer 334 the transposed matrix obtained by transposing the rows and columns of the transform results thus calculated.

Column addresses read from the column address storing unit 432 by the read address generator 434 shown in FIG. 25 are retained in the address latch 441 in the write controller 414. The write address generator 442 generates write addresses per the column addresses retained in the address latch 441.

The write address generator 442 transforms the above described column addresses to the row addresses, such that the row numbers corresponding to the row addresses are the same as the column numbers corresponding to the column addresses. The write address generator 442 generates column addresses for specifying the respective columns synchronized with the write control signal WRT. The buffer 334 receives the write addresses generated by combining the column addresses with the row addresses.

Therefore, the transform results corresponding to the i-th column of the dequantized DCT coefficients outputted from the operation processor 412 are sequentially stored in the corresponding space in the i-th row of the buffer 334.

When the buffer 333 stores column addresses in three (3) most significant bits and row addresses in three (3) least significant bits, for example, the write address generator 442 generates addresses to be stored in the buffer 334 by swapping the column addresses with the row addresses. This causes the buffer 334 to store the transposition of a matrix representing transform results. The transposed matrix is then outputted to the second one-dimensional orthogonal transformer 332.

FIG. 33 shows an example of a transform result. More specifically, FIG. 33 shows the transposed matrix corresponding to the dequantized DCT coefficients shown in FIG. 32.

The rows in the transposed matrix shown in FIG. 33, which correspond to the columns of the dequantized DCT coefficient matrix shown in FIG. 32 including significant dequantized DCT coefficients, include significant coefficients, and elements in such rows have letters h with suffixes indicating row numbers and column numbers.

As illustrated in FIG. 27, the second one-dimensional orthogonal transformer 332 shown in FIG. 24 comprises a read controller 613 having a separate zero detector 631 in lieu of the zero detector 431 of the first one-dimensional orthogonal transformer 331 shown in FIG. 25.

As with the zero detector 431, the zero detector 631 detects zeros in parallel with inputting respective columns of the transform results into the buffer 334, and outputs the detection results for the respective columns in the matrix obtained by transposing a matrix representing the transform results.

Since the buffer 333 in the first one-dimensional orthogonal transformer 331 stores the dequantized DCT coefficients in column units, processing logics similar to those illustrated in the flowchart shown in FIG. 14 can be used to determine whether or not all the eight (8) DCT coefficients or the last four (4) DCT coefficients in a column are significant. However, the buffer 334 does not store dequantized DCT coefficients for the second one-dimensional orthogonal transformer 332 in the columnar direction. This is because, although the first one-dimensional orthogonal transformer 331 sequentially obtains the eight (8) dequantized DCT coefficients in the columnar direction, the eight (8) dequantized DCT coefficients are arrayed in the row direction due to the transposition.

Therefore, the zero detection for the second one-dimensional orthogonal transformer 332 must be performed in a manner different from that for the first one-dimensional orthogonal transformer 331.

For instance, a bit map indicating whether or not the elements in the respective columns of the transform result are 0 is created first. The logical sums of the bit map are obtained sequentially, which results are outputted as the detection results indicating whether or not the respective columns in the transposed matrix contain significant coefficients.

Similarly, the logical sums of the bit map corresponding to the fifth through eighth columns of the transform results are obtained, and the logical complements of the results are outputted as the detection results showing whether or not the latter halves of the respective columns of the transposed matrix contain significant coefficients.

That is, the processes shown in FIG. 14 are operated in eight (8) pairs corresponding to the respective column positions and the process corresponding to each element in a row is executed each time an individual element in a row is inputted, so that eight (8) dequantized DCT coefficients are obtained.

In this case, as with the zero detector 431 described above, the zero detector 631 outputs detection result "01" when all elements in both the first half and the latter half are insignificant coefficients. The zero detector 631 outputs detection result "11" when all elements in the latter half are insignificant coefficients but at least one element in the first half is a significant coefficient. The zero detector 631 outputs detection result "10" in all other cases.

FIG. 34 illustrates relations between column addresses and flags.

For instance, when the zero detector 631 performs a zero detection for the transposed matrix shown in FIG. 33, as shown in FIG. 34, the column address storing unit 432 retains column addresses $C_1$ through $C_8$ corresponding to the first through eighth columns and flag "1" indicating that all the elements in the latter halves of the respective columns are insignificant coefficients, and the counter value of the counter 433 becomes "8".

The read address generator 434 generates read addresses based on the column addresses retained in the column address storing unit 432. As with the first one-dimensional orthogonal transform, the operation processor 412 performs the second one-dimensional orthogonal transform. Also as the write controller 414 controls writing the operation results obtained by the operation processor 412 to the buffer 335, the buffer 335 stores the transposed matrix representing the two-dimensional inverse DCT result and outputs it as the reconstructed data.

As described above, the four sets of operation circuits 501 each comprising a multiplier, an adder and registers connecting them are used to configure the operation processor 412 for performing one-dimensional inverse DCTs. The zero detector 431 detects zeros in units of a half of a dequantized DCT coefficient column. The operation processor 412 controls the reading of dequantized DCT coefficients from the buffer 333 and transform constants from the constant storing unit 411 per the detection result.

Accordingly, the operation processor 412 receives only the block's dequantized DCT coefficient columns containing significant coefficients in units of a half of a dequantized DCT coefficient column, and efficiently processes the actions in stages ST1 through ST5 in pipelines without causing an interstage wait. For instance, by performing a one-dimensional inverse DCT for the dequantized DCT coefficients shown in FIG. 32, the total number of steps necessary for pipeline processing by the operation processor 412 is thirty-three (33), as shown in FIG. 31, and the calculation volume is reduced significantly.

Thus, a small sized orthogonally transforming circuit can be used for high speed orthogonal transform processing, which enables an image data reconstructing apparatus to be made smaller and to operate faster.

If the buffer 333 shown in FIG. 24 is made to have a capacity for storing two blocks of dequantized DCT coefficients, first one-dimensional orthogonal transforms can be performed for the already inputted dequantized DCT coefficients, in parallel with inputting dequantized DCT coefficients for the next block, which further shortens the time necessary for an image reconstruction.

Similarly, if the buffer 334 is made to have a capacity for storing two blocks of dequantized DCT coefficients for two blocks, second one-dimensional orthogonal transforms can be performed, in parallel with inputting the transform results to the buffer 334, which further shortens the time necessary for an image reconstruction.

Also, the inverse DCT unit 330 can have a configuration such that one operation processor 412 performs both the first one-dimensional orthogonal transform and the second one-dimensional orthogonal transform by re-inputting the results of first one-dimensional orthogonal transforms stored in the buffer 334 to the operation processor 412.

FIG. 28 shows another exemplary configuration of an inverse DCT unit. In FIG. 28, the read controller 613 of the second one-dimensional orthogonal transformer 332 shown in FIG. 27 is added to the first one-dimensional orthogonal transformer 331 shown in FIG. 25, and the operation processor 412 receives either of the outputs from the buffers 333 and 334 selected by the selector 590.

In this case, the first one-dimensional orthogonal transform is performed, while the selector 590 connects the buffer 333 and the operation processor 412. Upon completion, the selector is switched to connect the buffer 334 with the operation processor 412. Also, by having the read controller 613 control reading dequantized DCT coefficients from the buffer 334 and transform constants from the constant storing unit 411, respective elements of the transform results and the corresponding transform constants are inputted to the operation processor 412 to perform the second one-dimensional orthogonal transform, so that the dequantized DCT coefficients of the next block are processed after the second one-dimensional orthogonal transforms are processed completely.

Thus, by using a configuration that makes one operation processor 412 perform both the first and second one-dimensional orthogonal transforms, the circuit size of the inverse DCT unit 330 can be further reduced.

Figure 35:
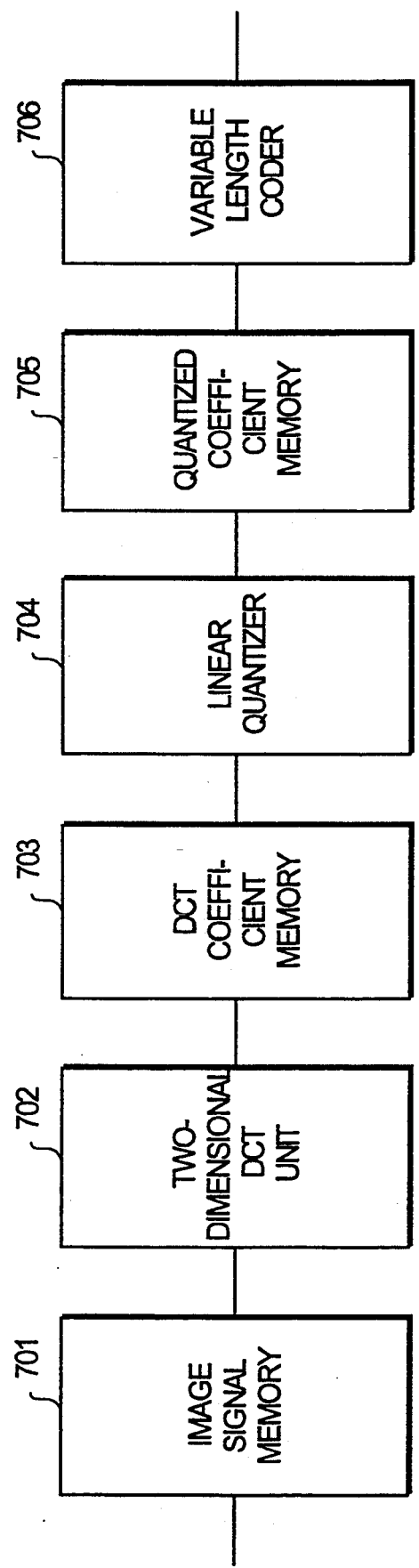
FIG. 35 illustrates the principle of an apparatus for coding quantized transform coefficients in a fifth embodiment of this invention.

FIG. 35 illustrates the principle of an apparatus for coding quantized transform coefficients in a fifth embodiment of this invention.

The fifth embodiment of this invention shown in FIG. 35 relates to a coding apparatus, where the result of performing two-dimensional DCTs on image data in the respective blocks each comprising a plurality (N×N; where N is a positive integer) of picture elements divided from an original image are quantized and then coded.

An image signal storing unit 701 receives image signals of an original image and retains image signals for at least one block of the original image.

A two-dimensional DCT unit 702 performs two-dimensional DCTs on the image signals retained in the image signal storing unit 701 in block units.

A DCT coefficient storing unit 703 retains DCT coefficients for at least one block.

A linear quantizer 704 linearly quantizes the DCT coefficients retained in the DCT coefficient storing unit 703 and outputs quantized coefficients.

A quantized coefficient storing unit 705 retains quantized coefficients for at least one block.

A variable length coder 706 codes the quantized coefficients retained in the quantized coefficient storing unit 705.

Each of the image signal storing unit 701, the DCT coefficient storing unit 703 and the quantized coefficient storing unit 705 may comprise first and second memories for retaining input data, a first selector for selectively outputting the supplied input data to the first and second memories, a second selector for selecting the outputs from the first and second memories, and a controller for having the second selector select the output from the second memory when the first selector outputs input data to the first memory and for having the second selector select the output from the first memory when the first selector outputs input data to the second memory.

In the fifth embodiment of this invention, after the two-dimensional DCT unit 702, the linear quantizer 704 and the variable length coder 706 sequentially performs DCTs on the image signals, they are linearly quantized and coded in variable lengths, so that the image signals are transformed to coded data. During the coding, the image signal storing unit 701 stores image signals for one block of the original image and supplies them to the two-dimensional DCT unit 702 in block units.

The DCT coefficient storing unit 703 receives the DCT coefficients obtained by the two-dimensional DCT unit 702 and retains them similarly in block units. The DCT coefficient storing unit 703 has a memory capacity of twice that necessary for one block of the original image, for storing two blocks. When one part of the DCT coefficient storing unit 703 stores DCT coefficients outputted from the two-dimensional DCT unit 702, the other part of the DCT coefficient storing unit 703 outputs its stored data to the linear quantizer 704.

The linear quantizer 704 linearly quantizes DCT coefficients and stores them in the quantized coefficient storing unit 705. The quantized coefficient storing unit 705 also has a memory capacity for two blocks of the original image. A part of the quantized coefficient storing unit 705 stores the quantized coefficients supplied from the linear quantizer 704. The variable length coder 706 selects the quantized coefficients stored in the other part of the quantized coefficient storing unit 705 and supplies them to variable length coder 706 for coding.

When the image signals e.g. for one block of an original image are completely transformed, the image signal storing unit 701, the DCT coefficient storing unit 703 and the quantized coefficient storing unit 705 switch their respective information parts to concurrently perform two-dimensional DCT, linear quantization, and variable length coding. That is, each controller has its first and second selectors select the one of the first and second memories not currently selected. For instance, when the first selector changes to output input data from the first memory to the second memory or vice versa, the second selector changes to select the output from the second memory to the first memory or vice versa. Since two memories are provided for intermediate storage of respective transform data, the transform steps can be made in parallel and the processing can be expedited.

Figure 37:
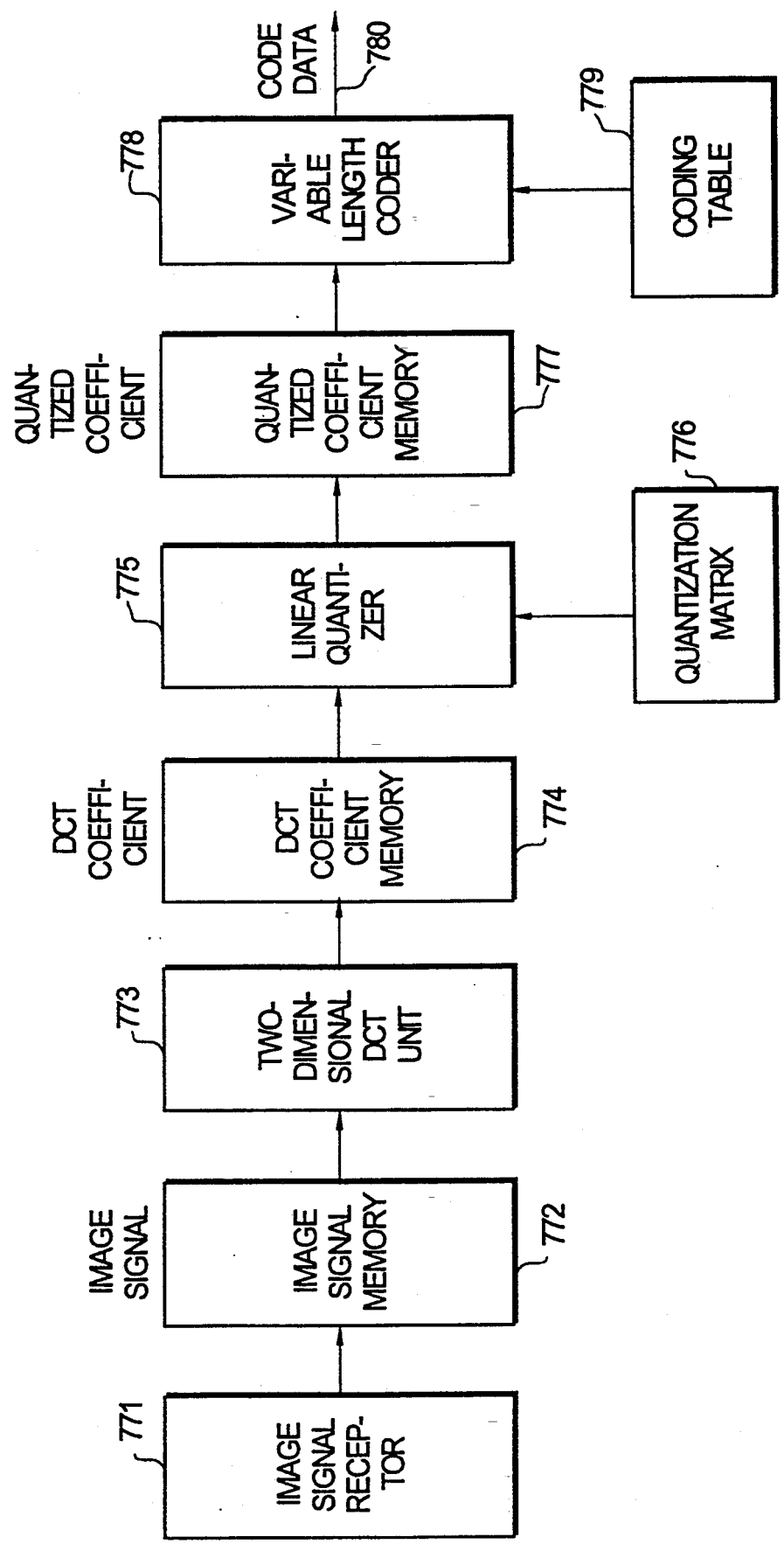
FIG. 37 shows the configuration of a coding circuit per the ADCT method in the fifth embodiment of this invention.

FIG. 37 shows the configuration of a coding circuit per the ADCT method in the fifth embodiment of this invention.

Image signals representing a block comprising 8×8 picture elements supplied from the image signal receptor 771 are temporarily memorized in an image signal storing unit 772.

A two-dimensional DCT unit 773 outputs image signals supplied from the image signal storing unit 772 to a DCT coefficient storing unit 774 by orthogonally transforming them through DCTs.

The DCT coefficient storing unit 774 temporarily memorizes the DCT coefficients.

A linear quantizer 775 linearly quantizes DCT coefficients inputted from the DCT coefficient storing unit 774 by a quantization matrix 776 having thresholds determined by optical experiments and outputs them to a quantized coefficient storing unit 777.

The quantized coefficient storing unit 777 temporarily memorizes the quantized coefficients.

A variable length coder 778 codes in variable lengths the quantized coefficients supplied from the quantized coefficient storing unit 777 by a coding table 779. With respect to quantized DC elements, the variable length coder 778 codes in variable lengths the differences between the quantized DC elements at the head ends of blocks and the quantized DC elements in the preceding blocks. With respect to quantized AC coefficients, the variable length coder 778 codes indices and runs for respective blocks in variable lengths. The coding table 779 is used to code the quantized DC and AC coefficients. A terminal 780 sequentially outputs the obtained coded data.

Figure 38A:
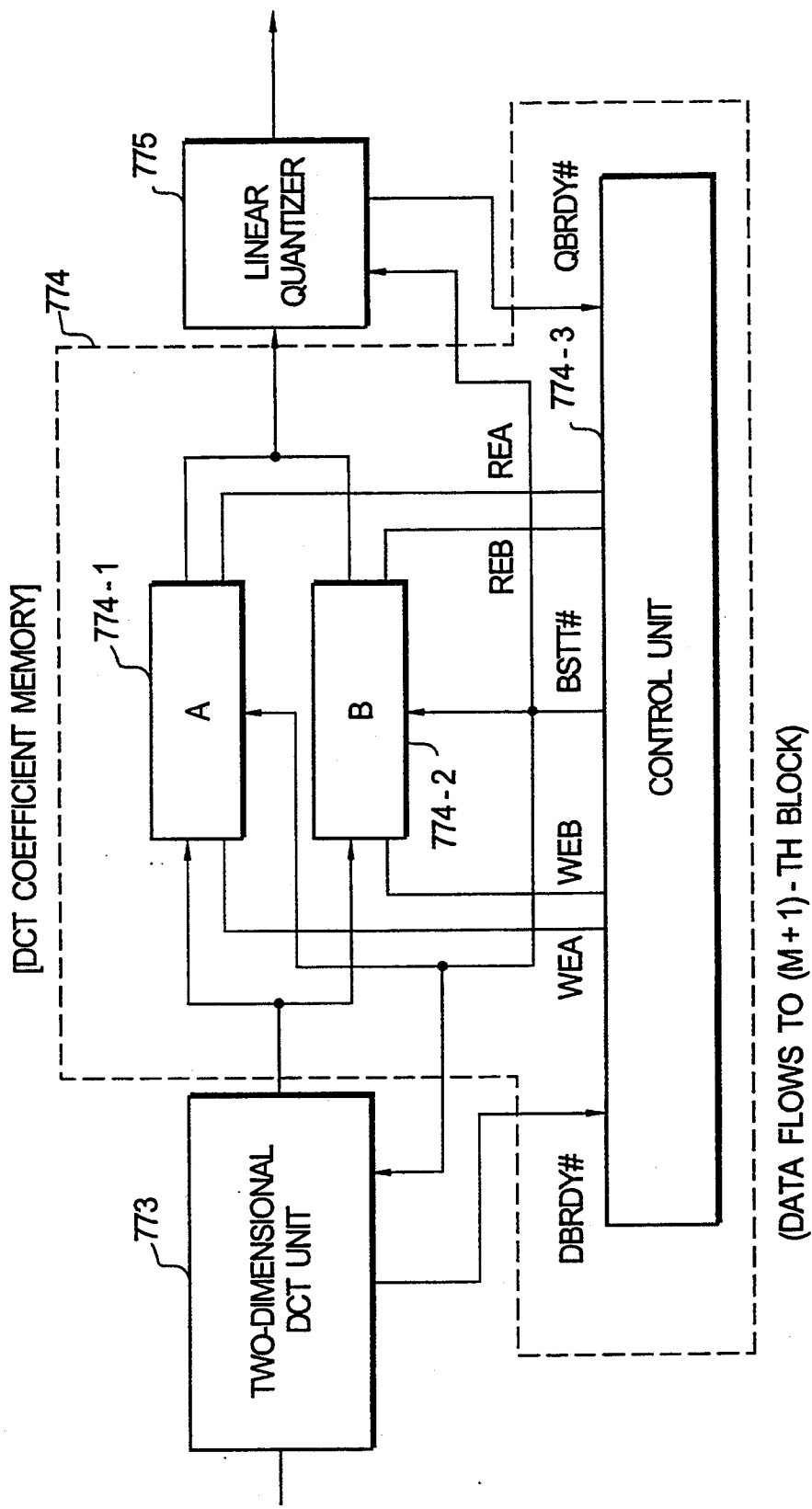
FIGS. 38A, 38B and 38C illustrate the configuration and data flows of a DCT coefficient storing unit in the fifth embodiment of this invention.
Figure 38B:
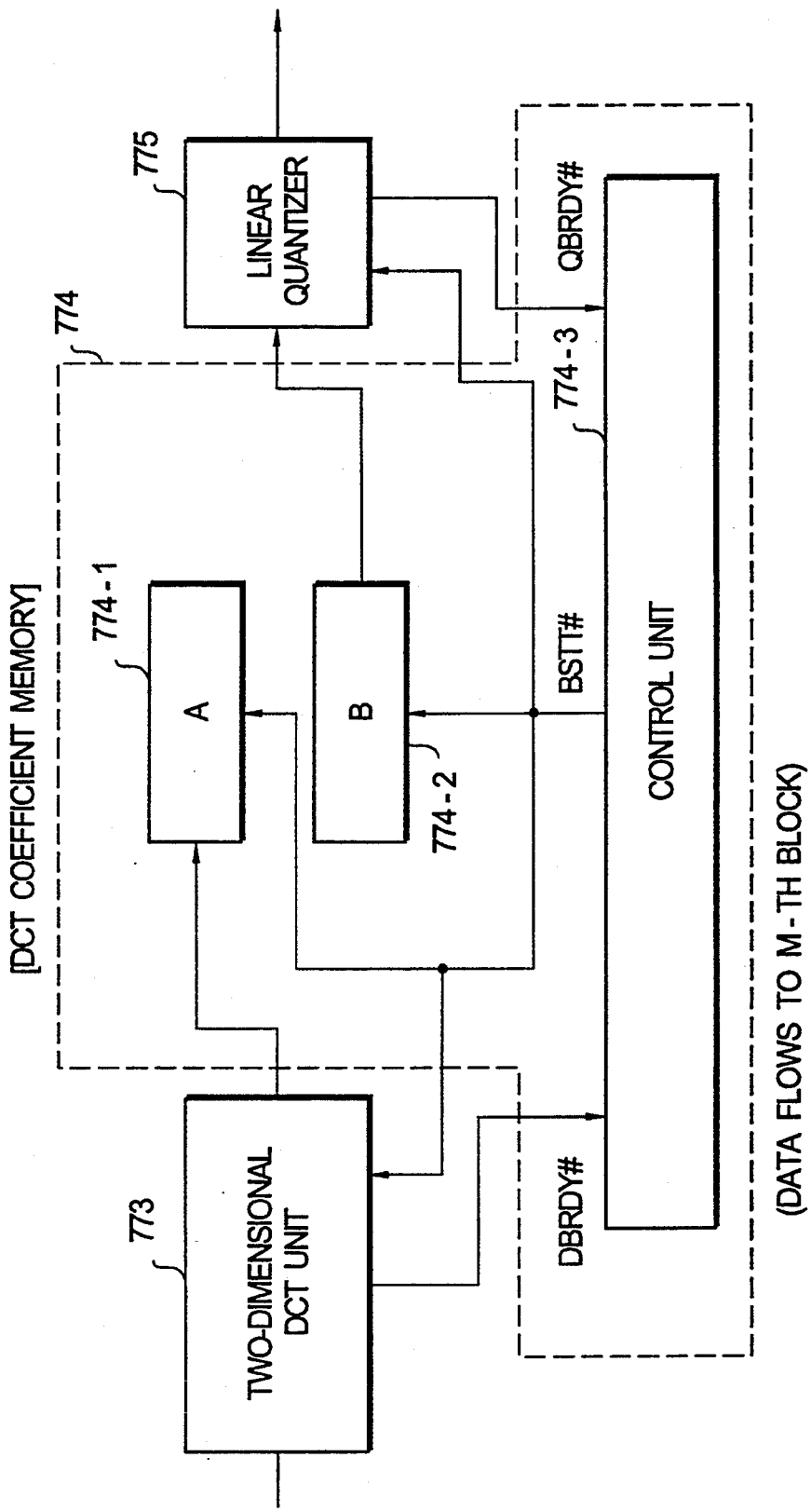
Figure 38C:
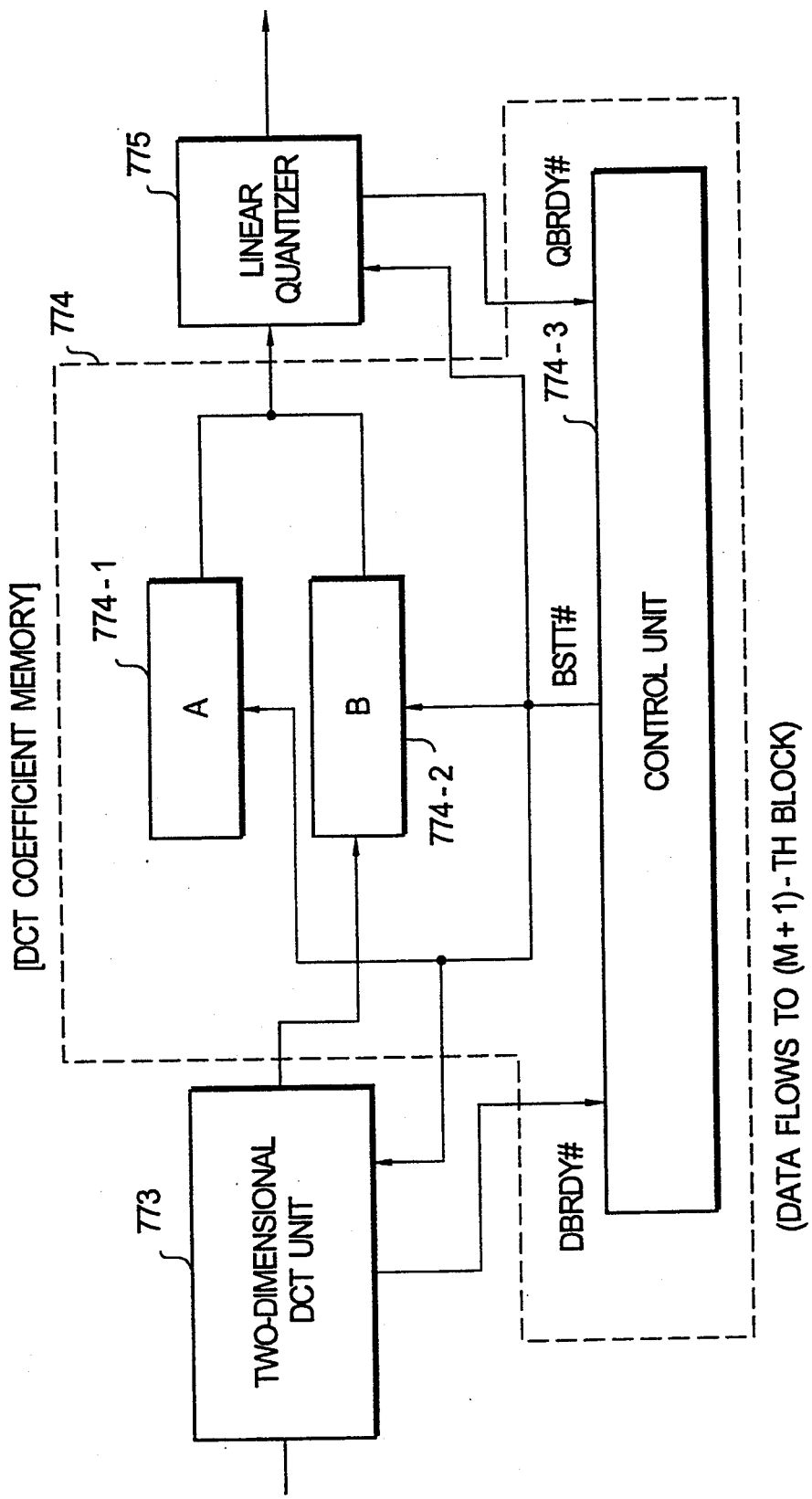

FIGS. 38A, 38B and 38C illustrate a configuration and data flows of a DCT coefficient storing unit in the fifth embodiment of this invention. More specifically, FIG. 38A shows the signal interchanges among the components, FIG. 38B shows data flows for the m-th block, and FIG. 38C shows data flows for the (m+1)-th block.

Outputs from the two-dimensional DCT unit 773 are supplied to an A sub-storing unit 774-1 and a B sub-storing unit 774-2 in the DCT coefficient storing unit 774. The outputs from the A sub-storing unit 774-1 and the B sub-storing unit 774-2 are supplied to the linear quantizer 775. A controller 774-3 performs write controls (by write enable signals WEA and WEB) and read controls (by read enable signals REA and REB) on the A sub-storing unit 774-1 and the B sub-storing unit 774-2.

When the A sub-storing unit 774-1 stores an output from the two-dimensional DCT unit 773, the controller 774-3 supplies a write enable signal WEA to the A sub-storing unit 774-1 to enable the A sub-storing unit 774-1 to be written on. When the B sub-storing unit 774-2 stores an output from the two-dimensional DCT unit 773, the controller 774-3 supplies a write enable signal WEB to the B sub-storing unit 774-2 to enable the B sub-storing unit 774-2 to be written on.

Similarly, when the DCT coefficient storing unit 774 outputs its stored data to the linear quantizer 775, the controller 774-3 supplies a read enable signal REA or REB to the A sub-storing unit 774-1 or the B sub-storing unit 774-2 to enable either one to output its stored DCT coefficients.

The controller 774-3 receives a preparation completion signal DBRDY# from the two-dimensional DCT unit 773 and a preparation completion signal QBRDY# from the linear quantizer 775. The controller 774-3 outputs a processing commencement signal BSTT# to the two-dimensional DCT unit 773, the linear quantizer 775, the A sub-storing unit 774-1 and the B sub-storing unit 774-2.

The actions of the DCT coefficient storing unit 74 shown in FIG. 38A are explained in further detail by referring to FIGS. 38B and 38C, which illustrate data flows in the m-th and (m+1)-th blocks.

In the m-th block, the two-dimensional DCT unit 773 writes DCT coefficients obtained through DCTs by the two-dimensional DCT unit 773 to the A sub-storing unit 774-1 of the DCT coefficient storing unit 774, while the B sub-storing unit 774-2 of the DCT coefficient storing unit 774 contemporaneously reads and outputs DCT coefficients of the (m−1)-th block to the linear quantizer 775 to be quantized. When DCTs for the (m−1)-th block are completed, the two-dimensional DCT unit 773 outputs preparation completion signal (DBRDY#) for processing the next block to the controller 774-3. Similarly, when the linear quantizer 775 completes quantization, it outputs the preparation completion signal (QBRDY#) to the controller 774-3.

Although it is not drawn in FIGS. 38A, 38B and 38C, the variable length coder 778 similarly outputs preparation completion signal (VBRDY#) to the controller 774-3.

The controller 774-3 outputs the processing commencement signal (BSTT#) for the next block to the two-dimensional DCT unit 773, the linear quantizer 775 and the variable length coder 778, upon detecting all "ON" for the three kinds of the preparation completion signals.

The processing commencement signal (BSTT#) invokes processing for the (m+1)-th block. At this moment, the controller 774-3 switches the A sub-storing unit 774-1 with the B sub-storing unit 774-2. That is, the DCT coefficients for the (m+1)-th block obtained through DCTs by the two-dimensional DCT unit 773 are written into the B sub-storing unit 774-2 of the DCT coefficient storing unit 774. At the same moment, the just-written DCT coefficients of the m-th block are read from the A sub-storing unit 774-1 of the DCT coefficient storing unit 774. They are then outputted to the linear quantizer 775 to be quantized.

The actions of the image signal storing unit 772 and the quantized coefficient storing unit 777 are similar to those of the DCT coefficient storing unit 774, which have already been explained.

The whole original image is coded by repeating for its respective blocks the processes comprising a step of configuring the respective memories, i.e. the image signal storing unit 772, the DCT coefficient storing unit 774 and the quantized coefficient storing unit 777, with memories for two blocks, a step of writing data for one block to a part of the memories simultaneously with reading data for another one block from another part of the memories, and a step of having a controller generate a processing commencement signal for switching the part of the memories for reading data of one block with the other part of the memories for writing data of another block upon detecting the preparation completion signals for the three kinds of processings.

Although the fifth embodiment shown in FIG. 38A configures the A sub-storing unit 774-1 and the B sub-storing unit 774-2 to have memory capacity in block units and to be switched with each other when the processing for a block is completed, it is possible to configure them similarly in units of one whole original image, i.e. in units of one entire page image.

Furthermore, other configurations can be used, although the fifth embodiment shown in FIG. 38A configures write enable signals WEA and WEB and read enable signals REA and REB to switch the inputs to and outputs from the A sub-storing unit 774-1 and the B sub-storing unit 774-2 with each other. This may be made possible by providing a selector for selectively supplying the outputs from the two-dimensional DCT unit 773 to the A sub-storing unit 774-1 or the B sub-storing unit 774-2 on the input side of the A sub-storing unit 774-1 and the B sub-storing unit 774-2, by further providing another selector for selectively supplying outputs from the A sub-storing unit 774-1 or the B sub-storing unit 774-2 to the linear quantizer 775, and by configuring the selectors to select opposite memories.

Similar actions are realized, e.g. by selectively supplying outputs from the B sub-storing unit 774-2 to the linear quantizer 775 when the A sub-storing unit 774-1 receives outputs from the two-dimensional DCT unit 773, and by selectively supplying outputs from the A sub-storing unit 774-1 to the linear quantizer 775 when the B sub-storing unit 774-2 receives outputs from the two-dimensional DCT unit 773.

By combining the fifth embodiment with any one of the first through fourth embodiments described earlier, the process can be further expedited.

For instance, a pipeline processor for processing N×N blocks configures a variable length decoder 782, a dequantizer 785, and a two-dimensional DCT unit 788 to receive a processing commencement signal, thereby causing them to start processing a block, and to output preparation completion signals, thereby causing them to be switched to process the next block.

In a reconstructing circuit for obtaining image signals from coded data, a case may occur in which zeros continue in the product terms of the operations related to inverse DCTs. Conventionally much time is required for the inverse DCTs, and even pipeline processing cannot eliminate the bottleneck. However, since this embodiment skips unnecessary zero value calculations by detecting zero value successions, pipeline processing can be expedited further.

Figure 36:
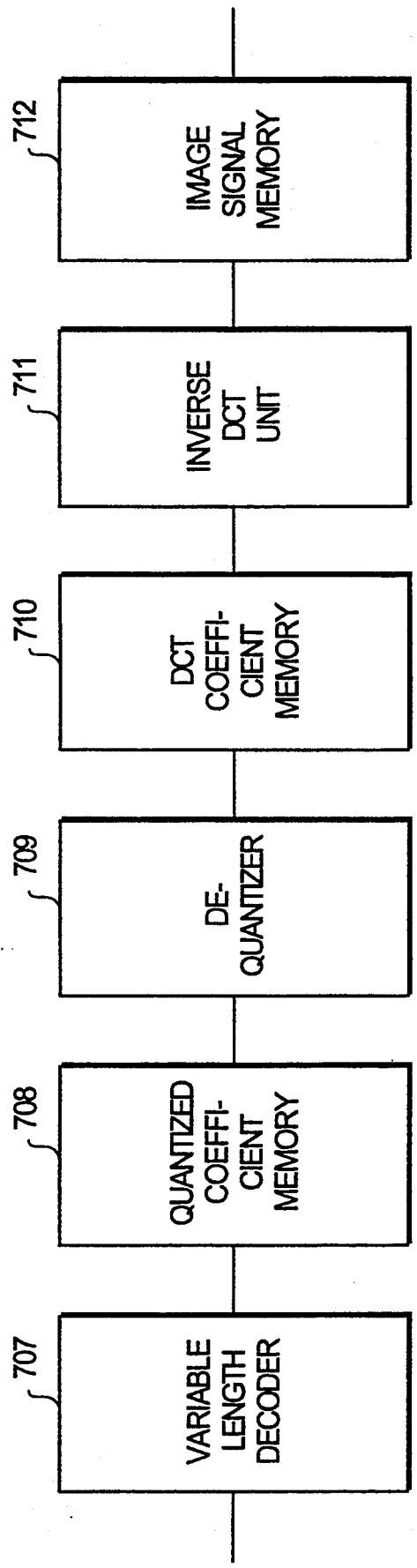
FIG. 36 illustrates the configuration of a decoding circuit in the sixth embodiment of this invention.

FIG. 36 illustrates a configuration of a decoding circuit in the sixth embodiment of this invention.

The sixth embodiment relates to an image data reconstructing apparatus for reconstructing an image from coded data obtained by coding quantized coefficients, which are obtained by quantizing transform coefficients obtained by performing two-dimensional DCTs on the gradient values of the plural picture elements in respective blocks each comprising a plurality (N×N; where N is a positive integer) of picture elements divided from an original image.

A variable length decoder 707 receives and decodes coded data, and outputs quantized coefficients.

A quantized coefficient storing unit 708 retains the quantized coefficients.

A dequantizer 709 dequantizes the quantized coefficients stored in the quantized coefficient storing unit 708 and outputs the dequantized DCT coefficients.

A DCT coefficient storing unit 710 retains the dequantized DCT coefficients.

An inverse DCT unit 711 performs inverse DCTs on dequantized DCT coefficients retained in the DCT coefficient storing unit 710 and outputs image signals.

An image signal storing unit 712 retains the image signals.

Each of the quantized coefficient storing unit 708, the DCT coefficient storing unit 710 and the image signal storing unit 712 may comprise first and second memories for retaining input data, a first selector for selectively outputting the supplied input data to the first and second memories, a second selector for selecting the outputs from the first and second memories, and a controller for having the second selector select the output from the second memory when the first selector outputs input data to the first memory and for having the second selector select the output from the first memory when the first selector outputs input data to the second memory.

The variable length decoder 707 decodes the inputted coded data and supplies them as quantized coefficients to the quantized coefficient storing unit 708.

The quantized coefficient storing unit 708 stores the decoded quantized coefficients in one memory, while outputting the quantized coefficients stored in the other memory to a dequantizer 709.

The dequantizer 709 dequantizes the quantized coefficients to dequantized DCT coefficients.

One memory in the DCT coefficient storing unit 710 stores the dequantized DCT coefficients transformed by the quantized coefficient storing unit 708. The other memory in the DCT coefficient storing unit 710 outputs the dequantized DCT coefficients stored previously to the inverse DCT unit 711.

The inverse DCT unit 711 performs inverse DCTs on the dequantized DCT coefficients received from the DCT coefficient storing unit 710, and outputs the results to the image signal storing unit 712. Upon completing transforms for one block or one original image, the quantized coefficient storing unit 708, the DCT coefficient storing unit 710 and the image signal storing unit 712 switches the first and second memories with each other.

The two-dimensional DCT unit 702, the linear quantizer 704, the variable length coder 706, the variable length decoder 707, the dequantizer 709 and the inverse DCT unit 711 can parallelly perform transforms or inverse transforms in units of a block or an original image, which expedites the processing.

Figure 39:
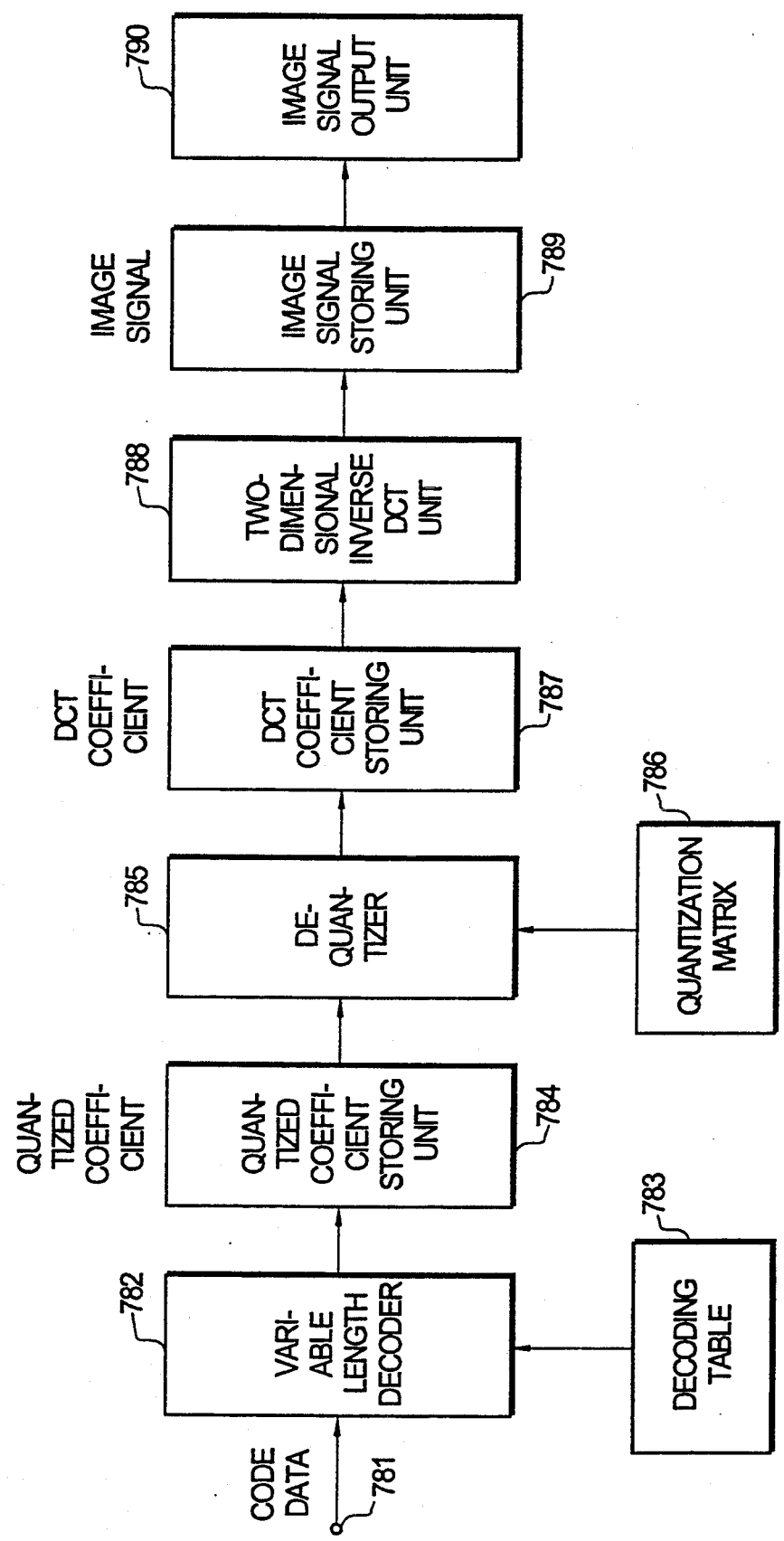
FIG. 39 illustrates the principle of an image reconstruction per the ADCT method in a sixth embodiment of this invention.

FIG. 39 illustrates the principle of an image reconstruction per the ADCT method in a sixth embodiment of this invention.

A variable length decoder 782 receives coded data inputted to a terminal 781, decodes the coded data by a decoding table 783 to fixed length data comprising indices and runs, and then supplies the decoded data to a quantized coefficient storing unit 784, which temporarily stores the decoded quantized coefficients.

A dequantizer 785 dequantizes the quantized coefficients inputted from the quantized coefficient storing unit 784 using a quantization matrix 786, and outputs the result to a DCT coefficient storing unit 787, which temporarily stores the dequantized DCT coefficient.

A two-dimensional inverse DCT unit 788 performs inverse DCTs on dequantized DCT coefficients inputted from the DCT coefficient storing unit 787, thereby orthogonally transforming coefficients having space frequency distributions into image signals, and then outputs the obtained image signals to an image signal storing unit 789, which temporarily stores the image signals.

An original image can be thus reconstructed by outputting a signal read from the image signal storing unit 789 through an image signal output unit 790.

The reconstruction per the ADCT method shown in FIG. 39 is expedited by a configuration identical to that shown in FIG. 38A, i.e. by providing the quantized coefficient storing unit 784, the DCT coefficient storing unit 787 and the image signal storing unit 789 respectively with two sub-storing units for storing two blocks or two images, and by performing inverse DCTs in units of one block or one image.

Figure 40:
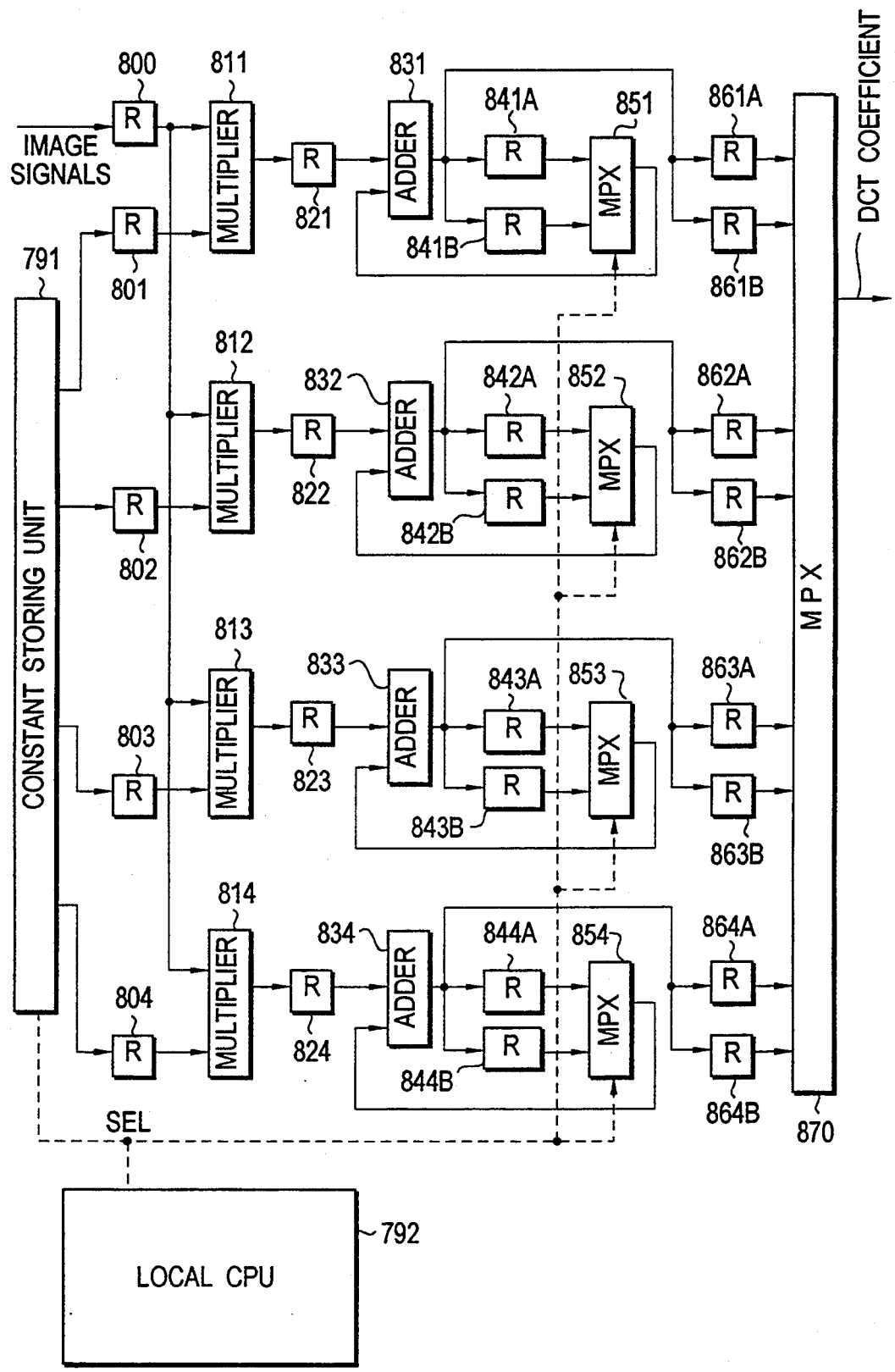
FIG. 40 shows the configuration of a one-dimensional DCT unit in the fifth and sixth embodiments of this invention.

FIG. 40 shows the configuration of a one-dimensional DCT unit in the fifth and sixth embodiments of this invention.

As described in the "Description of the Related Arts", a two-dimensional DCT can be performed by conducting two one-dimensional DCTs, horizontal and vertical, each time. FIG. 40 illustrates how such one-dimensional DCTs are performed.

The one-dimensional DCT unit shown in FIG. 40 comprises a constant storing unit 791, which outputs constants selected by a selection instruction signal (SEL) from a local CPU 792 to registers 801 through 804. A register 800 receives image signals in dots, and outputs them to terminals of multipliers 811 through 814. Meanwhile, registers 801 through 804 supply the constants respectively to the other terminals of the multipliers 811 through 814. Then, the multipliers 811 through 814 multiply the image signals stored in register 800 by constants outputted from the constant storing unit 791 and stored in registers 801 through 804, and then store the products in registers 821 through 824. The one-dimensional DCT unit performs a matrix multiplication by having the multipliers 811 through 814 multiply matrix elements by corresponding ones. Here, columns of an 8×8 product matrix are obtained sequentially by two alternate sets of parallel calculations of four (4) product matrix elements.

Adders 831 through 834 receive the products obtained by the multipliers 811 through 814 stored in and outputted from registers 821 through 824, add the products to the accumulations outputted from selecting circuits (MPX) 851 through 854 per the selection instruction signal (SEL) from the local CPU 792, and output the sums to either registers 841A through 844A or registers 841B through 844B.

The multiplied matrices have eight (8) rows and eight (8) columns, and registers 841A through 844B together store eight (8) sums of product terms obtained in an 8×8 matrix multiplication. Each time register 800 receives an image signal, the constant storing unit 791 outputs two sets of constants and the multipliers 811 through 814 perform two sets of multiplications and the adders 831 through 834 perform two sets of accumulations. Registers 841A through 844A receive one set of accumulations and registers 841B through 844B the other. Selecting circuits (MPX) 851 through 854 select either set.

That is, registers 861A through 864A store four (4) sums obtained respectively as eight (8) accumulations by the adders 831 through 834 of eight (8) product terms obtained by the multipliers 811 through 814, and registers 861B through 864B store other four (4) sums obtained similarly. Thus, four pairs of the adders 831 through 834 and the multipliers 811 through 814 respectively perform eight (8) multiplications and eight (8) accumulations to produce a total of eight (8) sums.

As described above, two sets of four (4) concurrent operations are performed alternately, and registers 861A through 864A and registers 861B through 864B store data selectively. When eight (8) transformed data are obtained in registers 861A through 864B upon respective completion of a total of sixteen (16) operations, comprising eight (8) multiplications and eight (8) additions, a selecting circuit (MPX) 870 selects the eight (8) transformed data outputted from registers 861A through 864B in sequence, and outputs them as DCT coefficients.

Selecting circuits (MPX) 851 through 854 and 870 described later can be formed by demultiplexers or multiplexers, depending on how they are defined as well as whether the one-dimensional DCT unit is used for coding or reconstruction.

An inverse DCTs is similar to DCT in that they both perform matrix operations, so they have the same configuration although different data are transformed. Namely, the configuration shown in FIG. 26, where image signals are reconstructed from DCT coefficients, is the same as that shown in FIG. 40, where image signals are coded to DCT coefficients.

Although a one-dimensional DCT requires longer operating times than other transforming processes, because the one-dimensional DCT unit of this invention shown in FIG. 40 is configured to parallelly calculate alternate two sets of four (4) column elements in an 8×8 product matrix, the time required for the operation can be shortened by performing the coding and reconstruction shown in FIGS. 37 and 39 in pipeline processes.

As described above, this invention enables image reconstruction to be expedited through a significant reduction in the number of inverse DCT operations made possible by detecting zero value dequantized DCT coefficients simultaneously with storing decoded dequantized DCT coefficients and by controlling the number of dequantized DCT coefficients outputted to the inverse DCT unit per the values set in flags indicating the columnar distributions of zero value and non-zero value dequantized DCT coefficients.

In addition, when an inverse DCT unit comprising N sets of multipliers and adders performs pipeline operations and detects zero values in inputted data in units of N/2, by skipping inverse DCTs on N dequantized coefficients in a column when the N input data are all zero, or by skipping inverse DCTs on N/2 dequantized coefficients in a column and controlling the cycles for outputting transform results When the N/2 input data are all zero, this invention enables a two-dimensional inverse DCT unit to be downsized greatly without disturbing its pipeline processes, and an image reconstruction to be expedited.

Furthermore, by causing a partial column containing a significant coefficient to be extracted from a matrix comprising dequantized DCT coefficients and an orthogonal transform to be performed only on such a partial column, this invention reduces the number of calculations in an inverse DCT, thereby permitting a smaller circuit to conduct an inverse DCT at a higher speed, thus downsizing an image data reconstructing device and shortening the time required for a reconstruction.

Besides, this invention divides the coding and reconstructing processes per the ADCT method into different kinds of transforms and inverse transforms, and provides storing units for storing coefficients in respective processing steps, which permits high speed concurrent processes.

Finally, because respective storing units have memory capacities for two blocks or two images, writing to sub-storing units for one block or image and reading from others for the other block or image are performed contemporaneously. Since writing and reading are caused to be flip-flopped by observing the states of respective processing steps, which are performed in multi-stage pipeline processes, this invention expedites coding and reconstruction.

Although only two control flags are used to detect insignificant coefficients being zero in their matrix columns in the above embodiments, as stated earlier, it is possible to use more than two control flags to subdivide columnar coefficients for further eliminating unnecessary operations. This enables hardware sized inversely proportionate to the number of such subdivisions to pipeline-process image data at a faster rate.

What is claimed is:

1. An image data reconstructing method for reconstructing an original image by data encoded from a quantized coefficient which is obtained by dividing said original image into a plurality of blocks comprising a plurality of picture elements (N×N), and by quantizing a transform coefficient which is obtained by performing two-dimensional orthogonal transform on the gradation value of a plurality of said picture elements in each of said blocks; said image data reconstructing method comprising:

a first step of storing N×N decoded orthogonal transform coefficients, a second step of setting flag information indicating the distribution of zero and non-zero coefficients among said N×N transform coefficients, and a third step of reconstructing an input transform coefficient to an image signal by performing inverse orthogonal transform on an input transform coefficient, wherein reading operation of a transform coefficient stored by said first step is controlled.

2. An image data reconstructing operation according to claim 1 comprising a fourth step of determining whether or not a stored and decoded transform coefficient in said first step is zero, wherein said second step sets flag information indicating, according to the result of the determination in said fourth step, the distribution of zero and non-zero coefficients among said N×N transform coefficients.

3. An image data reconstructing method according to claim 1, wherein
said second step comprises the first flag indicating whether or not one column of N transform coefficients are all zero.

4. An image data reconstructing method according to claim 3, wherein
reading operation of said one column of N transform coefficients stored by said first step to said third step is prohibited if said first flag is set in said second step to indicate said one column of N transform coefficients are all zero.

5. An image data reconstructing method according to claim 1, wherein
said second step comprises the second flag indicating whether the last M transform coefficients in one column are all zero.

6. An image data reconstructing method according to claim 5, wherein
said second step comprises the second flag indicating whether the last N/2 transform coefficients in one column are all zero.

7. An image data reconstructing method according to claim 6, wherein
reading operation of said one column of the first N/2 transform coefficients stored by said first step to said third step is permitted if said second flag is set in said second step to indicate said one column of the last N/2 transform coefficients are all zero.

8. An image data reconstructing method according to claim 6, wherein
said second flag indicating whether or not the last N/2 transform coefficients in one column are all zero is valid when said first flag indicating whether or not N transform coefficients in one column are all zero as described in claim 3 indicates "at least one is other than zero"; and additionally when said second flag indicating the last N/2 transform coefficients in one column are all zero is set, reading operation of only the first N/2 transform coefficients in said one column stored in said first step is permitted to said third step.

9. An image data reconstructing apparatus for reconstructing an original image by data encoded from a quantized coefficient which is obtained by dividing said original image into a plurality of blocks comprising a plurality of picture elements (N×N), and by quantizing a transform coefficient which is obtained by performing two-dimensional orthogonal transform on the gradation value of a plurality of said picture elements in each of said blocks; said image data reconstructing comprising:
a transform coefficient storing means for storing decoded transform coefficients,
a zero detecting means for determining whether or not decoded transform coefficients are all zero,
a flag setting means for setting, according to the determination result of said zero detecting means, a flag, set each for a plurality of processes to be processed in parallel, indicating the distribution of zero and non-zero coefficients among N×N transform coefficients,
a transform constant storing means for storing an input transform coefficient which is used to perform inverse orthogonal transform on an input transform coefficient,
an inverse orthogonal transform means for reconstructing a transform coefficient read by said transform coefficient storing means to an image signal by the inverse orthogonal transform, and
a read control means for controlling reading a signal of said transform coefficient storing means and said transform constant storing means, and for controlling to omit a reconstructing operation of said inverse orthogonal transform means when the flag set by said flag setting means indicates zero.

10. An image data reconstructing apparatus according to claim 9, wherein
said zero detecting means works concurrently with said transform coefficient storing means when it stores said transform coefficient.

11. An image data reconstructing apparatus according to claim 9 comprising two blocks of transform coefficient storing area, one transform coefficient storing area being used for writing one block volume of transform coefficients with the other transform coefficient storing area being used for reading out transform coefficients already written thereto, wherein
said transform coefficient storing means and said inverse orthogonal transform means work concurrently.

12. An image data reconstructing apparatus according to claim 9, wherein
said read control means works according to the setting result of said flag setting means.

13. An image data reconstructing apparatus according to claim 9, wherein
said flag setting means comprises a first flag generating means for generating the first flag indicating whether or not N transform coefficients in one column are all zero.

14. An image data reconstructing apparatus according to claim 9, wherein
said flag setting means comprises a second flag generating means for generating the second flag indicating whether or not the last N/2 transform coefficients in one column are all zero.

15. An image data reconstructing apparatus according to claim 9, wherein
said flag setting means comprises a third flag generating means for generating the third flag using a first flag indicating whether or not N number of transform coefficients in one column are all zero and a second flag indicating whether or not the last N/2 number of transform coefficients in one column are all zero, and controls transform coefficient reading operation according to the setting of said third flag.

16. An image data reconstructing apparatus for reconstructing an original image by data encoded from a quantized coefficient which is obtained by dividing an original image into a plurality of blocks comprising a plurality of N×N picture elements, quantizing a transform coefficient which is obtained by performing two-dimensional orthogonal transform on the gradation value of a plurality of said picture elements in each of said blocks; said image data reconstructing apparatus comprising:
a variable length decoding means for receiving encoded data, decoding said encoded data, and outputting quantized coefficients,
a quantized coefficient storing means for storing quantized coefficients,
a dequantizing means for dequantizing a quantized coefficient stored in said quantized coefficient storing means and outputting a transform coefficient, a transform coefficient storing means for storing transform coefficients provided by said dequantizing means, a zero detecting means for determining whether or not said transform coefficient is zero, a transform constant storing means for storing a transform constant which is used for performing inverse orthogonal transform on inputted transform coefficients, an inverse orthogonal transform means for reconstructing an image signal from a transform coefficient read from said transform coefficient storing means and said transform constant, and a control means for skipping the corresponding operation in said inverse orthogonal transforming means when said zero detecting means detects zero in N transform coefficients in one column to be processed in parallel.

17. An image data reconstructing apparatus according to claim 16, wherein said inverse orthogonal transforming means comprises a latch having N units of adders and N accumulation results.

* * * * *